United States Patent
Perlman et al.

(10) Patent No.: US 9,491,955 B2
(45) Date of Patent: *Nov. 15, 2016

(54) BALANCED MYRISTATE- AND LAURATE-CONTAINING EDIBLE OIL

(71) Applicant: Brandeis University, Waltham, MA (US)

(72) Inventors: Daniel Perlman, Arlington, MA (US); Kenneth C. Hayes, Wellesley, MA (US)

(73) Assignee: Brandeis University, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/836,505

(22) Filed: Mar. 15, 2013

(65) Prior Publication Data

US 2013/0260003 A1    Oct. 3, 2013

Related U.S. Application Data

(63) Continuation-in-part of application No. 13/581,074, filed on Nov. 9, 2012, now abandoned, which is a continuation-in-part of application No. 12/985,441, filed on Jan. 6, 2011, now abandoned, which is a continuation-in-part of application No. 12/713,163, filed on Feb. 25, 2010, now abandoned, which is a continuation-in-part of application No. 12/197,542, filed on Aug. 25, 2008, now Pat. No. 8,114,461.

(Continued)

(51) Int. Cl.
*A23D 9/00* (2006.01)
*A23D 7/00* (2006.01)

(52) U.S. Cl.
CPC ............... *A23D 9/00* (2013.01); *A23D 7/001* (2013.01); *A23D 7/003* (2013.01)

(58) Field of Classification Search
CPC ........ A23D 9/00; A23D 7/001; A23D 7/003; A23D 9/013; A23D 9/007; A23D 7/0053; A23D 7/011; A23D 7/0056
See application file for complete search history.

(56) References Cited

U.S. PATENT DOCUMENTS 4,275,011 A    6/1981   Tanaka et al.
5,578,334 A   11/1996   Sundram et al.
(Continued)

FOREIGN PATENT DOCUMENTS

EP    1159877    12/2001
EP    1964554     9/2008
(Continued)

OTHER PUBLICATIONS

Hassan et al. "Simple fractionation through the supercritical carbon dioxide extraction of palm kernel oil", Separation and Purification Technology, 19 (2000) 113-120.*

(Continued)

*Primary Examiner* — Isis Ghali
(74) *Attorney, Agent, or Firm* — Posternak Blankstein & Lund LLP

(57) ABSTRACT

Nutritional fat or oil-based compositions for increasing HDL cholesterol, decreasing total cholesterol (TC), LDL cholesterol and decreasing the LDL/HDL cholesterol ratio in human plasma are described. The compositions can advantageously include at least 10% of myristic acid and/or lauric acid in which at least 3% of said fatty acid composition is myristic acid and at least 3% is lauric acid; in some cases at least 1% by weight myristic acid and/or lauric acid is esterified at the sn-2 position in triglyceride molecules. The compositions also include between 5% and 40% by weight linoleic acid, and typically further include at least 10% by weight monounsaturated fatty acids and between 15% and 55% by weight total saturated fatty acids. The sum of weight percentages for saturated, monounsaturated and polyunsaturated fatty acids equals 100%. In desirable cases, the composition is substantially cholesterol-free. Also described are fat compositions and diets which are adapted to limit increases in blood triglycerides, total cholesterol, LDL, and VLDL, even in the presence of dietary cholesterol.

31 Claims, 2 Drawing Sheets

(56) References Cited

U.S. PATENT DOCUMENTS

| | | | |
|---|---|---|---|
| 5,843,497 A | 12/1998 | Sundram et al. | |
| 6,630,192 B2* | 10/2003 | Sundram et al. | 426/603 |
| 6,808,737 B2* | 10/2004 | Ullanoormadam | 426/603 |
| 7,229,653 B2 | 6/2007 | Sundram et al. | |
| 2006/0241080 A1 | 10/2006 | Dror et al. | |
| 2008/0096816 A1 | 4/2008 | Fogelman et al. | |

FOREIGN PATENT DOCUMENTS

| | | |
|---|---|---|
| WO | WO9631240 | 10/1996 |
| WO | WO2006114791 | 11/2006 |
| WO | WO2007073193 | 6/2007 |
| WO | WO2009047754 | 4/2009 |
| WO | WO2010027258 | 3/2010 |
| WO | WO2010027433 | 3/2010 |

OTHER PUBLICATIONS

Patil et al. "Hypolipidemic activity of seeds of Cassia tora Linn", Journal of Ethnopharmacology, 90 (2004), 249-252.*

Ng et al. "Dietary Palmitic and Oleic Acids Exert Similar Effects on Serum Cholesterol and Lipoprotein Profiles in Normocholesterolemic Men and Women," Journal of the American College of Nutrition, vol. 11, No. 4, pp. 383-390 (1992).

Hayes et al. "Dietary fatty acid thresholds and cholesterolemia," FASEB J., vol. 6, pp. 2600-2607 (1992).

Dabadie et al. "Moderate intake of myristic acid in sn-2 position has beneficial lipidic effects and enhances DHA of cholesteryl esters in an interventional study," Journal of Nutritional Biochemistry, vol. 16, pp. 375-382 (2005).

Dabadie et al. "Variations in daily intakes of myristic and a-linolenic acids in sn-2 position modify lipid profile and red blood cell membrane fluidity," British Journal of Nutrition, vol. 96, pp. 283-289 (2006).

Khosla et al. "Dietary fat saturation in rhesus monkeys affects LDL concentrations by modulating the independent production of LDL apolipoprotein B," Biochimica et Bioph.vsica Acta, vol. 1083, pp. 46-56 (1991).

Karupaiah et al. "Effects of stereospecific positioning of fatty acids in triacylglycerol structures in native and randomized fats: a review of their nutritional implications," Nutrition & Metabolism, vol. 4, No. 16, 17 pages (2007).

Loison et al. "Dietary myristic acid modifies the HDL-cholesterol concentration and liver scavenger receptor BI expression in the hamster," British Journal of Nutrition, vol. 87, pp. 199-210 (2002).

McGandy et al. "Use of Semisynthetic Fats in Determining Effects of Specific Dietary Fatty Acids on Serum Lipids in Man," The American Journal of Clinical Nutrition, vol. 23, No. 10 pp. 1288-1298 (1970).

Mensink "Effects of the individual saturated fatty acids on serum lipids and lipoprotein concentrations," The American Journal of Clinical Nutrition, vol. 57, pp. 711S-714S (1993).

Mukherjee et al. "The Influence of Myristic Acid of Dietary Fats on Serum Cholesterol," Journal of Atherosclerosis Research, vol. 10, pp. 51-54 (1969).

Nelson et al. "Plasma lipoprotein fatty acids are altered by the positional distribution of fatty acids in infant formula triacylglycerols and human milk," The American Journal of Clinical Nutrition, vol. 70, pp. 62-69 (1999).

Pronczuk et al. "Dietary myristic, palmitic, and linoleic acids modulate cholesterolemia in gerbils," The FASEB Journal, vol. 8, pp. 1191-1200 (1994).

Sanders et al. "Influence of triacylglycerol structure on the postprandial response of factor VII to stearic acid-rich fats," The American Journal of Clinical Nutrition, vol. 77, pp. 777-782 (2003).

Snook et al. "Effect of synthetic triglycerides of myristic, palmitic, and stearic acid on serum lipoprotein metabolism," European Journal of Clinical Nutrition, vol. 53, pp. 597-605 (1999).

Sundram et al. "Stearic acid-rich interesterified fat and trans-rich fat raise the LDL/HDL ratio and plasma glucose relative to palm olein in humans," Nutrition & Metabolism, vol. 4, No. 3, 12 pages (2007).

International Search Report and Written Opinion for Application No. PCT/US2011/026203 mailed Jun. 28, 2011.

Dabadie, H. et al., "Moderate intake of myristic acid in sn-2 position has beneficial lipidic effects and enhances DHA of cholesteryl esters in an interventional study," J. Nutr (2005); 16(6); 375-382.

Dabadie, H. et al. "Variations in daily intakes of myristic and a-linolenic acids in sn-2 position modify lipid profile and red blood cell membrane fluidity," Br J Nutr (2006); 96(2): 283-289.

Khosla, et al., "Dietary fat saturation in rhesus monkeys affects LDL concentrations by modulating the independent production of LDL apoliproprotein B," Biochem Biophys Acta (1991):1083: 46-50.

Karupaiah et al., "Effects of sterospecific positioning of fatty acids in triacylglycerol structures in native and randomized fats: a review of their nutritional implications," Nutrition and Metabolism (2007); 4:16.

Loison et al., "Dietary myristic acid modifies the HDL-cholesterol concentration and liver scavenger receptor BI expression in the hamster," Br J Nutr (2002); 87: 199-210.

McGandy et al., "Use of semisynthetic fats in determining effects of specific dietary fatty acids on serum lipids in man," Am J Clin Nutr (1970); 23(1): 1288-1298.

Mensink "Effects of the individual saturated fatty acids on serum lipids and lipoprotein concentrations," Am J Clin Nutr (1993); 57 (suppl): 711S-714S.

Mukherjee et al., "The influence of myristic acid of dietary fats on serum cholesterol," J Atheroscler Res (1969); 10(1): 51-54.

Nelson et al., "Plasma lipoprotein fatty acids are altered by the positional distribution of fatty acids in infant formula triacylglycerols and human milk," Am J Clin Nutr (1999); 70:62-69.

Pronczuk, A. et al., "Dietary myristic, palmitic, and linoleic acids modulate cholesterolemia in gerbils," FASEB J. (1994); 8:1191-1200.

Sanders et al. "Influence of triacylglycerol structure on the postprandial response of factor VII to stearic acid-rich fats," Am J Clin Nutr (2003); 77:777-782.

Snook et al., "Effect of synthetic triglycerides of myristic, palmitic, and stearic acid on serum lipoprotein metabolism," Eur J Clin Nutr (1999); 53: 597-605.

Sundram, K. et al., "Stearic acid-rich interesterified fat and trans-rich fat raise the LDL/HDL ratio and plasma glucose relative to palm olein in humans," Nutr Metab (2007); 4:3.

Maduko, et al., "Modification of Fatty Acid and Sterol Composition of Caprine Milk for use as Infant Formula," International Dairy Journal (2007), vol. 17, pp. 1434-1440.

Heckers, et al., "Trans-isomeric Fatty Acids Present in West German Margarines, Shortenings, Frying and Cooking Fats," The American Journal of Clinical Nutrition (1978), vol. 31, pp. 1041-1049.

Gunstone, et al., The Lipid Handbook (2007), Third Edition, pp. 62,66 and 67.

Mann, et al., Warenkunde für den Fachkaufmann im Diät- und Reformhaus (1987), Second Edition, pp. 203 and 204.

Breckenridge, et al., "Triglyceride Structure of Human Milk Fat," Canadian Journal of Biochemistry (1969), vol. 47, pp. 761-769.

Winter, et al., "Fatty Acid Composition of Human Milk *Triglyceride* Species," Journal of Chromatography (1993), vol. 616, pp. 9-24.

Heckers, et al., "Gaschromatographische Analysen der Fettsäuren von 90 verschiedenen Margarinemarken," Med. Weld 26/Heft 47 (1975), pp. 2115-2124.

Tomarelli, et al., "Effect of Positional Distribution on the Absorption of the Fatty Acids of Human Milk and Infant Formulas,", The Journal of Nutrition (1968), vol. 95, pp. 583-590.

Mensink, et al., "Effects of Dietary Fatty Acids and Carbohydrates on the Ratio of Serum Total to HDL Cholesterol and on Serum Lipids and Apolipoproteins: a meta-analysis of 60 Controlled Trials," The American Journal of Clinical Nutrition (2003), vol. 77, pp. 1146-1155.

Ng, Tony KW, et al. "Nonhypercholesterolemic Effects of a Palm-Oil Diet in Malaysian Volunteers", The American Journal of Clinical Nutrition, (1991), vol. 53, pp. 1015S-1520S.

* cited by examiner

BALANCED MYRISTATE- AND LAURATE-CONTAINING EDIBLE OIL

RELATED APPLICATIONS

This application is a Continuation-in-Part of Ser. No. 13/581,074, filed Nov. 9, 2012, which is a Continuation-in-Part of U.S. application Ser. No. 12/985,441, filed Jan. 6, 2011, which is a Continuation-in-Part of U.S. application Ser. No. 12/713,163, filed Feb. 25, 2010, which is which is a Continuation-in-Part of Ser. No. 12/197,542 filed Aug. 25, 2008. The entire teachings of the referenced applications are incorporated herein by reference.

FIELD OF THE INVENTION

The present invention relates to compositions and methods for increasing the level of HDL cholesterol, reducing LDL cholesterol and the ratio of LDL to HDL in human plasma by supplementing or replacing conventional dietary fats with a particular class of dietary fats and their fatty acids.

BACKGROUND OF THE INVENTION

The following discussion is provided solely to assist the understanding of the reader, and does not constitute an admission that any of the information discussed or references cited constitute prior art to the present invention.

Over the past 50 years clinical research has been reported studying dietary fats and their role in modulating major species of plasma lipoproteins. A number of review articles have been written on the subject of coronary heart disease, controlling plasma cholesterol levels (e.g., Steinberg et al. 1999; JAMA, 282(21): 2043-2050), and specifically on the role of dietary fats in altering plasma lipoprotein levels (e.g., Mensink et al. 2003; Am J Clin Nutr, 77:1146-1155). Other research has studied changes in lipoprotein levels resulting from dietary fats that are rich in various fatty acids. For example, Tholstrup et al. (1994; Am J Nutr, 59:371-377) studied changes in lipoprotein levels resulting from diets rich in different saturated fatty acids including stearic acid (provided by rhea butter), palmitic acid (palm oil) and lauric and myristic acids (provided by palm kernel oil).

For over thirty years researchers have studied and compared different fatty acids for their abilities to raise or lower overall cholesterol levels in human plasma. While there are divergent opinions on many aspects of this subject, most nutritional experts agree that the saturated class of fatty acids (herein abbreviated SFA) raises total cholesterol levels (herein abbreviated TC levels), while polyunsaturated fatty acids (herein abbreviated PUPA) lower them, and monounsaturated fatty acids (MUFA), e.g., oleic acid, are more neutral in their effect.

As a point of clarification and to avoid confusion, fats that contain mostly SFA are termed saturated fats (or SATS) while those fats containing mostly MUFA are termed monounsaturated fats (or MONOS), and those fats containing mostly PUPA are termed polyunsaturated fats (or POLYS). Beyond this simplistic view, it also understood that metabolism of individual fatty acid species within each class, can impact HDL and LDL cholesterol levels to different degrees.

A number of research studies have used regression analysis to suggest that of the more common SPAs including lauric acid (C12:0), myristic acid (C14:0), palmitic acid (C16:0) and stearic acid (C18:0) found in many edible fats and oils, myristic acid with 14 carbon atoms and zero sites of carbon-carbon unsaturation (C14:0) appears to be most potent in elevating total cholesterol (TC) levels in the plasma. Consistent with these findings, some manufacturers of processed foods avoid the use of hardening fats such as coconut oil or palm kernel oil that contain high levels of myristic acid, in favor of palm stearin and regular palm oil that are also hardening fats, but contain high levels of palmitic and stearic acids instead.

Thus, a recently produced commercial margarine known as Smmt Balance® buttery spread (GFA Brands, Inc., Cresskill, N.J.) that combines the beneficial LDL cholesterol-lowering properties of PUPA, e.g., found in soybean oil, with the beneficial oil hardening property and HDL cholesterol-raising property of SFA, incorporates palm oil rather than palm kernel oil to achieve the requisite hardened texture. This margarine and related healthful fat blends are based upon the work of Sundram et al., described in U.S. Pat. No. 5,578,334, U.S. Pat. No. 5,843,497, U.S. Pat. Nos. 6,630,192 and 7,229,653 incorporated herein in their entireties. Sundram et al. describe a cholesterol-free blended fat composition that combines a polyunsaturated fat (with linoleic acid providing between 15% and 40% by weight of the composition), and a cholesterol-free saturated fat providing between 20% and 40% by weight of the composition; preferably a palmitic acid rich SAT is used, though lauric and myristic acids can be included. The effect of the saturated fat, i.e., palm oil, in this margarine is to increase both HDL and LDL cholesterol while the effect of the polyunsaturated vegetable oil is to lower LDL cholesterol. The net effect of regularly consuming such a fat blend composition instead of a typical American dietary fat was shown to be a modest increase in the HDL concentration and an increase in the HDL/LDL concentration ratio in the blood.

With regard to the selection of palm oil as a saturated fat, in U.S. Pat. No. 5,578,334 it has been shown by Khosla and Hayes (Biochem. Biophys. Acta; 1991, 1083: 46-50) that the combination of lauric and myristic acids found in palm kernel oil or coconut oil can produce a larger LDL pool and a poorer (lower) HDL/LDL ratio than palmitic and oleic acids. Similarly, Mensink (Am J Clin Nutr, 1993; 57 (suppl.) 711S-714S) points out that myristic acid is more hypercholesterolemic than palmitic acid. These and other studies have led to the conclusion that dietary 12:0 and 14:0 fatty acids are worse than 16:0 and 18:0 in terms of raising LDL, and it has been reassuring that palm oil rather than palm kernel oil is usually used as hardstock in margarines and in baking and frying shortenings. Consistent with these findings, Sundram et al. in the above-cited series of U.S. patents indicate that palmitic acid (rather than lauric or myristic acid) is the preferred saturated fatty acid to be included in the fat composition (see, for example, claims 11 and 12 in U.S. Pat. No. 7,229,653).

As briefly discussed above, there is a body of research in which SPAs of differing chain length have been studied for their abilities to increase HDL and LDL plasma cholesterol levels. More recently, some research has been reported concerning the positional effect of fatty acids within the triglyceride molecule. That is, the ability of a fatty acid to alter plasma cholesterol levels may depend upon which of the three glyceryl-ester positions, i.e., the sn-1 and sn-3 (end positions), or the sn-2 (middle position) it occupies. This positional effect can be due to the difference in enzymatic cleavage and preferential degradation versus absorption of the fatty acid. For example, the pancreatic lipase enzymes that cleave individual fatty acids from the glycerol backbone of the fat molecule selectively hydrolyze and remove the fatty acids at the sn-1 and sn-3 positions while leaving the sn-2 fatty acid attached to the glycerol backbone to generate a sn-2 monoglyceride. The latter can be absorbed intact into the intestinal cells and reformed as a triglyceride or phospholipids for transport in the bloodstream. Some of these molecules can reach the liver where they may affect cholesterol and triglyceride metabolism in varied and complex ways. It is well known that free fatty acids liberated from TG by the action of various lipases in the gut, peripheral blood vessels, or adipose tissue can be catabolized to provide energy for the body, or may be used in there-synthesis of triglycerides.

For the benefit of the reader, the following is a brief summary describing fat digestion, transport and oxidation. Fatty acids are principally ingested as triglycerides, i.e., fats and oils, that cannot be immediately absorbed by the intestine. Fats are broken down into free fatty acids plus monoglycerides by the pancreatic lipase enzyme that complexes with a protein called colipase, which is necessary for its activity. The complex can only function at a water-fat interface. For enzymatic fat digestion to be efficient, it is essential that fatty acids and fats be emulsified by bile salts from the gall bladder. Fats are absorbed as free fatty acids and 2-monoglycerides, but a small fraction is absorbed as free glycerol and as diglycerides. Once across the intestinal barrier, longer-chained fatty acids (mostly 16C and 18C) can be reformed into triglycerides and phospholipids and packaged into chylomicrons, which are released into the lymphatic system and then into the blood. Most of the 12:0 and a major proportion of 14:0 go directly to the liver via the portal venous system for immediate metabolism by the liver. Some of the chylomicron complexes eventually reach the liver after peripheral catabolism in muscle and adipose, which remove the triglycerides. The phospholipid molecule depends on 18:2 intake, and is incorporated eventually as the major lipid component of HDL and is essential for HDL clearing of the chylomicron remnants back to the liver, reducing the circulating HDL pool.

Fats are either stored or oxidized for energy, and the liver acts as the major organ for fatty acid metabolism after the processing of chylomicron remnants. Liver fatty acids, some from remnants, many from de novo synthesis, can recycle into the various lipoproteins including VLDL and LDL. These liver fatty acids, converted to liver triglycerides, are transported to the blood as VLDL. In peripheral tissues and similar to gut chylomicrons, lipoprotein lipase converts part of the VLDL into LDL and free fatty acids, which are taken up for metabolism by muscle and adipose. Once formed, LDL is taken up via LDL receptors by liver and other tissues. This provides a mechanism for uptake of LDL by the cell, and for its breakdown into free fatty acids, cholesterol, and other components of LDL. This process is highly dependent on dietary linoleic acid.

When blood sugar is low, the hormone, glucagon, signals adipocytes to activate hormone-sensitive lipase to convert triglycerides into free fatty acids. While the fatty acids have very low solubility in the blood (typically about 1 J.1M), the most abundant protein in blood, serum albumin, binds free fatty acids, increasing their effective solubility to ~1 mM, allowing fatty acid transport to organs such as muscle and liver for oxidation when blood sugar is low. Fatty acid catabolism or breakdown that results in the release of energy involves three major steps including activation and transport into the mitochondria, beta oxidation, and electron transport. More specifically, fatty acids enter the mitochondria primarily through carnitine-palmitoyl transferase I (CPT-I). It is believed that activity of this enzyme is the rate limiting step in fatty acid oxidation. Once inside the mitochondrial matrix, fatty acids undergo beta-oxidation. During this process, two carbon molecules (acetyl-CoA) are repeatedly cleaved from the fatty acid. The acetyl-CoA can then enter the Krebs Cycle, producing high energy NADH and FADH, that are subsequently used in the electron transport chain to produce high energy ATP for cellular processes.

SUMMARY OF THE INVENTION

The present invention concerns fat compositions and related methods for improving human serum lipid and sugar parameters, for example, increasing HDL cholesterol and/or reducing the LDL:HDL cholesterol ratio in human serum, increasing the fraction of HDL to total cholesterol, decreasing LDL and/or VLDL, decreasing serum triglycerides, and/or improving (i.e., decreasing) fasting blood glucose levels, and/or reducing the percentage of body fat and controlling weight gain. These are accomplished by creating and using fat compositions that include an appropriate balance of fatty acids. In particular advantageous fat compositions, substantial but not excessive levels of total saturated fatty acids, myristic acid and/or lauric acid, are included with low to moderate levels of linoleic acid together with a variable percentage of monounsaturated fatty acids (generally oleic acid). Beneficially the myristic and lauric acid as well as other saturated fatty acids are present in appropriate balance, providing a range of metabolic rates and mechanisms for lipid transport and metabolism. In certain compositions, effective levels of sn-2 unsaturated fatty acids are included, especially linoleic and/or oleic, and the composition can also include appropriate levels of sn-2 myristate and/or sn-2laurate without excessive sn-2 palmitate or excessive sn-2 stearate, with the appropriate levels of total linoleic acid, total oleic acid, and total saturated fatty acids. Desirably, the balance of fatty acids is achieved using a blend of natural fats/oils, without artificial interesterification or other artificial structural modifications.

In still further advantageous compositions, a beneficial balance of myristic acid and/or lauric acid, total saturated fatty acids, and total unsaturated fatty acids are provided. Notably, it was discovered that the effective level of linoleic acid in an edible fat composition can be quite low (e.g., 5, 6, 7, or 8% by weight or more) when the oil contains sufficiently low levels of components which, if elevated, could promote formation of LDL cholesterol (e.g., trisaturated triglycerides) or otherwise undesirably impact the relative levels of the various lipoprotein classes and/or total triglycerides. However, the effective level of linoleic acid required for balancing saturated fatty acids is higher when the level of trisaturated triglycerides and/or other LDL-promoting components are higher. These compositions are further advantageous in compensating for dietary cholesterol.

Thus, a first aspect of the invention concerns an edible fat composition which includes from 5% to 40% by weight (often preferably 8 to 40% or 9 to 40% or 10% to 40% by weight) of linoleic acid (18:2) or 5 to 45% by weight of polyunsaturated fatty acids, including from 5% to 40% linoleic acid (18:2), and from 15% to 55% by weight saturated fatty acids in toto, with the remainder to make up 100 percent being monounsaturated fatty acids (generally oleic acid, e.g., from 10 to 80%) and, in some cases, minor amounts of other polyunsaturated fatty acids. (That is, the sum of weight percentages for saturated, monounsaturated and polyunsaturated fatty acids equals 100%.) Desirably the fat composition is produced by blending a plurality, e.g., 2, 3, 4, or 5, natural fats or oils (which may be fractions of natural fats or oils). Preferably the fat composition is substantially cholesterol-free.

In certain embodiments, at least 70, 80, 90, 95, 98, or 100% of the triglycerides are from natural oils.

In preferred embodiments and as specified more particularly below, the composition contains substantial levels of a combination of myristic acid and lauric acid e.g., at least 3% by weight of each, but in some cases, the composition contains a substantial level of myristic acid or of lauric acid, but not of both. Thus, preferably the composition contains at least 3% by weight of myristic acid and/or lauric acid, meaning that the composition contains the specified percentage of myristic acid plus lauric acid, or contains the specified percentage of each of myristic acid and lauric acid, or contains the specified percentage of myristic acid or the specified percentage of lauric acid. Preferably the fat composition contains up to 40 or 45% by weight myristic acid plus lauric acid, but in some cases may contain more, e.g., up to 50 or 55% myristic acid plus lauric acid. The composition further contains an appropriate balance of polyunsaturated fatty acids, in particular linoleic acid, usually in a weight ratio of polyunsaturated fatty acids to saturated fatty acids (or linoleic acid to saturated fatty acids) of about 0.3 to 2. Furthermore it is desirable if the levels of palmitic acid and stearic acid are not too high relative to the levels of myristic acid and lauric acid, e.g., with the ratio of myristic acid plus lauric acid to palmitic acid plus stearic acid equal to or greater than 1.0 and commonly greater.

Thus, for some embodiments, the ratio of polyunsaturated fatty acids to saturated fatty acids (P/S) [or of linoleic acid to saturated fatty acids [P(18:2)/S)] is in a range of 0.3 to 2, 0.3 to 1.5, 0.3 to 1, 0.3 to 0.7, 0.3 to 0.5, 0.4 to 2, 0.4 to 1.5, 0.4 to 1, 0.4 to 0.7, 0.5 to 2, 0.5 to 1.5, 0.5 to 1, 0.7 to 2, 0.7 to 1.5, 0.7 to 1.4, 0.7 to 1.3, 0.7 to 1.2, 0.7 to 1.1, 0.7 to 1, 0.8 to 2, 0.8 to 1.5, 0.8 to 1.2, 0.9 to 2, 0.9 to 1.5, 0.9 to 1.4, 0.9 to 1.3, or 0.9 to 1.2; the weight ratio of saturated fatty acids to linoleic acid in the edible fat composition is at least 0.5, 0.6, 0.7 0.8, 0.9, 1.0, 1.1, 1.2, 1.5, 1.7, 2.0, 2.5, 3.0, 3.5, 4.0, 4.5, 5.0, 6.0, 7.0, 8.0, 9.0, or 10.0, or is in a range of 0.5 to 3.0, 0.5 to 2.0, 0.5 to 1.0, 1.0 to 3.0, 1.0 to 2.0, 2.0 to 3.0, 2.0 to 4.0, 2.0 to 5.0, 3.0 to 5.0, 3.0 to 7.0, 3.0 to 10.0, 5.0 to 7.0, 5.0 to 10.0, or 7.0 to 10.0; the weight ratio of sn-2linoleic acid to sn-2 myristic acid and/or sn-2 lauric acid is in a range of 0.1 to 2.0, 0.1 to 1.0, 0.1 to 0.5, 0.2 to 2.0, 0.2 to 1.5, 0.2 to 1.0, 0.2 to 0.7, 0.3 to 2.0, 0.3 to 1.5, 0.3 to 1.2, 0.3 to 1.0, 0.5 to 2.0, 0.5 to 1.7, 0.5 to 1.5, 0.5 to 1.2, 0.5 to 1.0, 0.7 to 2.0, 0.7 to 1.7, 0.7 to 1.5, 0.7 to 1.4, 0.7 to 1.3, 0.7 to 1.2, 0.7 to 1.1, 0.7 to 1.0, 0.9 to 2.0, 0.9 to 1.7, 0.9 to 1.5, 0.9 to 1.2; the weight ratio of sn-2 linoleic acid plus sn-2 oleic acid to sn-2 myristic acid and/or sn-2 lauric acid is in a range of 0.1 to 5.0, 0.1 to 1.0, 0.1 to 0.5, 0.2 to 2.0, 0.2 to 1.5, 0.2 to 1.0, 0.2 to 0.7, 0.3 to 2.0, 0.3 to 1.5, 0.3 to 1.2, 0.3 to 1.0, 0.5 to 2.0, 0.5 to 1.7, 0.5 to 1.5, 0.5 to 1.2, 0.5 to 1.0, 0.7 to 2.0, 0.7 to 1.7, 0.7 to 1.5, 0.7 to 1.4, 0.7 to 1.3, 0.7 to 1.2, 0.7 to 1.1, 0.7 to 1.0, 0.9 to 2.0, 0.9 to 1.7, 0.9 to 1.5, 0.9 to 1.2; the weight ratio of myristic acid and/or lauric acid to palmitic acid (and/or sn-2 myristic acid and/or sn-2lauric acid to sn-2 palmitic acid) is at least 1.0, 1.1, 1.2, 1.3, 1.4, 1.5, 1.7, 2.0, 2.5, 3.0, 3.5, 4.0, 5.0, 6.0, 7.0, 8.0, or 10.0, or is in a range defined by taking any two of the just-specified ratio values as endpoints of the range; the weight ratio of myristic acid and/or lauric acid to stearic acid (and/or of sn-2 myristic and/or sn-2lauric acid to sn-2 stearic acid) is at least 1.0, 1.1, 1.2, 1.3, 1.4, 1.5, 1.7, 2.0, 2.5, 3.0, 3.5, 4.0, 5.0, 6.0, 7.0, 8.0, 10.0, or 20.0, or is in a range defined by taking any two of the just-specified ratio values as endpoints of the range; the weight ratio of myristic acid plus lauric acid to palmitic acid plus stearic acid (and/or of sn-2 myristic plus sn-2lauric acid to sn-2 palmitic acid plus sn-2 stearic acid) is at least 1.0, 1.1, 1.2, 1.3, 1.4, 1.5, 1.7, 2.0, 2.5, 3.0, 3.5, 4.0, 5.0, 6.0, 7.0, 8.0, or 10.0, or is in a range defined by taking any two of the just-specified ratio values as endpoints of the range; lauric and myristic acid together are in a range of 15 to 45% by weight, the weight ratio of lauric acid plus myristic acid to palmitic acid plus stearic acid is at least 2, 3, 4, 5, 6, 7, 8, 9, or 10, and the ratio of linoleic acid to total saturated fatty acids (or sn-2linoleic acid to sn-2 saturated fatty acids) is 0.1 to 2, 0.1 to 1.5, 0.1 to 1, 0.1 to 0.7, 0.1 to 0.5, 0.2 to 0.2 to 1, 0.2 to 0.7, 0.2 to 0.5, or a range with a numerically greater lower range limit ratio as specified herein for other embodiments of this aspect; the weight ratio of myristic acid to lauric acid (and/or of sn-2 myristic acid to sn-2lauric acid) is at least 0.3, 0.4, 0.5, 0.5, 0.6, 0.8, 0.9, 1.0, 1.1, 1.2, 1.3, 1.4, 1.5, 1.7, 2.0, 2.2, 2.5, or 3.0 or is in a range defined by taking any two of the just-specified ratio values as endpoints of the range.

Preferably the fat composition includes no more than 40 or 45% by weight myristic acid or lauric acid or a combination of myristic acid and lauric acid (although in some cases it may contain up to 50 or 55%); preferably, the fat composition includes no more than 20% by weight palmitic acid (e.g., no more than 17, 15, 12, 10, 8, 7, 6, 5, 4 or 3%); preferably the fat composition includes no more than 10% stearic acid (e.g., no more than 8, 7, 6, 5, 4, 3, or 2%).

In certain embodiments, the fat composition includes at least 5, 10, 15, 20, 25, 30, 35, 40, 50, or 60% by weight oleic acid; the fat composition includes 5 to 45% linoleic acid, with, for example, at least 6, 7, 8, 9, 10, 12, 14, 15, 17, 20, 25, 30, 35 or 40% (or in a range defined by taking any two of the just specified values as end points of the range) or with polyunsaturated fatty acids in a range as just specified for linoleic acid in which the ratio of linoleic acid (18:2) to alpha-linolenic acid (18:3) is at least 1.0, 1.5, 2.0, 3.0, 4.0, 5.0, 7.0, or 10.0.

In certain embodiments, the fat composition includes 5 to 40, 5 to 35, 5 to 30, 5 to 25, 5 to 20, 5 to 15, 5 to 14.9, 5 to 10, 5 to 8, 6 to 40, 6 to 35, 6 to 30, 6 to 25, 6 to 20, 6 to 15, 6 to 14.9, 6 to 10, 6 to 8, 7 to 40, 7 to 35, 7 to 30, 7 to 25, 7 to 20, 7 to 15, 7 to 14.9, 7 to 10, 7 to 8, 8 to 35, 8 to 30, 8 to 25, 8 to 20, 8 to 15, 8 to 12, 10 to 35, 10-30, 10-25, 10-20, 10-15, 15-40, 15 to 35, 15-30, or 15-25% linoleic acid, or less than 15% linoleic acid (e.g., 3-5, 3-7, 3-10, 3-12, 3-14.9, 5-7, 5-10, 5-12, 5-14.9, 10-12, 10-14.9, or 12-14.9% linoleic acid) and/or the composition includes no more than 45, 40, 35, 30, 25, or 20%, e.g., 10 to 20, 10 to 30, 10 to 40, 15 to 20, 15 to 25, 15 to 30, 15 to 35, 15 to 40, to 25, 20 to 30, 20 to 35, 20 to 40, 25 to 30, 25 to 35, or 25 to 40% myristic acid, or lauric acid, or a combination of myristic acid and lauric acid; the fat composition includes at least 3, 4, 5, 6, 7, 8, 9, 10, 12, 15, 20 25, 30, 35, or 40% by weight myristic acid or the fat composition contains at least 3, 4, 5, 6, 7, 8, 9, 10, 12, 15, 20, 25, 30, 35, or 40% lauric acid or contains at least the specified percentage of each of myristic acid and lauric acid up to a total of 40, 45, 50, or 55% by weight.

In certain cases, in addition to the specified level of linoleic acid the fat composition contains one or more other polyunsaturated fatty acids taken singly or in any combination (providing a combination of 2, 3, or 4 polyunsaturated fatty acids) selected from the group consisting of alpha-linolenic acid, eicosapentaenoic acid (EPA), and docosahexaenoic acid (DHA), preferably such combination includes 5-7, 5-10, 5-12, 5-14.9, 5-20, 5-30, 5-38, 8-10, 8-12, 8-14.9, 8-20, 8-30, 8-38, 10-12, 10-14.9, 10-20, 10-30, 10-38, 12-14.9, 12-20, 12-30, 12-38, 15-30, or 15-38% linoleic acid, or other fraction of linoleic acid as specified above.

In certain embodiments, specifically including those embodiments specified above, the fat composition includes no more than 55% saturated fatty acids (e.g., from 15 to 55, 15 to 50, 15 to 40, 15 to 30, 20 to 55, 20 to 50, 20 to 45, 20 to 40, 20 to 35, or 20 to 30% by weight saturated fatty acids); palmitic acid (16:0) constitutes no more than 20, 15, 12, 10, 9, 8, 7, 6, or 5% by weight of the total fat composition; stearic acid constitutes no more than 10, 9, 8, 7, 6, 5, 4, or 3% of the fat by weight; palmitic acid plus stearic acid constitutes no more than 20, 17, 15, 12, 10, 9, 8, 7, 6, or 5% of the total fat composition. For the preceding, substantially the remainder of the fatty acids in the fat composition are preferably oleic acid (18:1) and polyunsaturated fatty acids, usually primarily linoleic acid, and/or in addition to the specified level of linoleic acid there is present a combination of polyunsaturated fatty acids as indicated above. Preferably when other polyunsaturated fatty acids are included, the linoleic acid is at least 5, 6, 7, 8, 9, 10, 15, 20, 25, or 30% by weight of the total fat, e.g., 10-14.9% by weight.

In particular embodiments, the edible fat composition includes 8 to 40% by weight linoleic acid or other percentage within this range as specified above, 20 to 40% by weight saturated fatty acids including at least 3, 4, 5, 6, 7, 8, 10, 12, 15, or 20% myristic acid and/or at least 3, 4, 5, 6, 7, 8, 10, 12, 15, or 20% lauric acid, and 20 to 50% by weight oleic acid or a combination of monounsaturated fatty acids which are primarily oleic acid, where the total of the fatty acid weight percentages is 100%.

In certain embodiments, the edible fat composition includes at least 1, 2, 3, 4, 5, 6, 7, 8, or 10% by weight linoleic acid esterified at the sn-2 position and/or contains at least 1, 2, 3, 4, 5, 6, 7, 8, 10, 12, or 15% by weight oleic acid esterified at the sn-2 position; in addition to the sn-2 linoleic acid and/or sn-2 oleic acid at a level as just specified, the fat composition contains no more than 1, 2, 3, 4, 5, 6, 7, 8, 10, 12, or 15% by weight myristic acid and/or lauric acid or a combination of myristic and lauric acid esterified at the sn-2 position in triglyceride molecules, with the total linoleic acid at 5% to 40% by weight (or other percentage as specified herein), total oleic acid at 5% to 65% (or other percentage as specified above) by weight (or a percentage sufficient to total 100% after accounting for the percentages of polyunsaturated and saturated fatty acids), and total saturated fatty acids at 15 to 55% (preferably 15% to 40%) by weight, where the weight ratio of sn-2 myristic acid and/or lauric acid to sn-2 palmitic acid (and/or total myristic acid and/or lauric acid to total palmitic acid, or total myristic acid plus lauric acid to total palmitic acid plus stearic acid) is preferably at least 1:1, 2:1, 3:1, 4:1, 5:1, or 6:1; less than 33, 30, 25, 20, 15, 10, 7, or 5% of the lauric acid and/or myristic acid is esterified at the sn-2 position.

In particular embodiments, consistent ingestion of the edible fat composition (e.g., as part of a daily diet) increases HDL cholesterol, decreases LDL cholesterol, decreases the LDL/HDL cholesterol ratio in human plasma and/or increases the fraction of total cholesterol which is HDL cholesterol and/or decreases the fasting blood glucose concentration and/or decreases serum triglycerides and/or decreases total adipose or abdominal adipose tissue or perirenal adipose tissue deposited. For advantageous embodiments, consistent ingestion of the edible fat composition results in two or more of the just specified effects taken in any combination.

In certain embodiments, at least 20, 30, 40, 50, 60, or 70% of the myristic acid and/or lauric acid esterified at the sn-2 position in triglyceride molecules is produced by chemical or enzymatic interesterification or both; the composition includes at least 3, 4, 5, 6, 7, 8, 9, 10, 12, 15, 17, 20, or 25% but less than 30 or 33%, or is in a range of 3 to 25%, 3 to 20%, 3 to 10%, 3 to 5%, 5 to 25%, 5 to 20%, 5 to 15%, 5 to 10%, 5 to 8%, 8 to 20%, 8 to 17%, 8 to 16%, 8 to 15%, 8 to 12%, 10, to 25%, 10 to 20%, or 10 to 15%, 12 to 20%, 12 to 17%, 12 to 16%, or 12 to 15% by weight myristic acid and/or lauric acid esterified at the sn-2 position in triglyceride molecules; no more than 1, 2, 3, 4, 5, 6, 7, 8, 9, 10, or 12% by weight of the triglyceride molecules which include myristic acid or lauric acid have three myristic acid or lauric acid residues respectively; at least 20, 30, 40, 50, 60, or 70% of the triglyceride molecules which include myristic acid or lauric acid have only two myristic acid or lauric acid residues respectively; at least 20, 30, 40, or 50% of the triglyceride molecules which include myristic acid or lauric acid have only one myristic acid residue or lauric acid residue respectively; the sn-2 myristic acid and/or sn-2lauric acid is esterified in glyceride molecules selected from the group consisting of triglycerides, diglycerides, monoglycerides and combinations thereof; at least 70, 80, 90, 95, or 97% of the sn-2 myristic acid and/or sn-2lauric acid is esterified within triglyceride molecules.

For some embodiments, at least 50, 60, 70, 80, 90, 95, 97, 98, or 99% of the triglyceride molecules having a saturated fatty acid at the sn-2 position (e.g., an sn-2 myristic acid or sn-2lauric acid or sn-2 palmitic acid or sn-2 stearic acid) carry unsaturated fatty acids esterified at either one or both of the sn-1 and sn-3 glyceride positions, e.g., selected from the group consisting of oleic acid, linoleic acid, alpha-linolenic acid, EPA, DHA and combinations thereof; at least 40, 50, 60, 70, 80, 90, 95, 97, 98, or 99% of the triglyceride molecules which include a saturated fatty acid contain an unsaturated fatty acid at the sn-2 position; the composition contains at least 3, 4, 5, 6, 7, 8, 9, or 10% by weight linoleic acid esterified at the sn-2 position.

In certain embodiments, no more than 60, 50, 40, 30, 20, 15, 10, 9, 8, 7, 6, 5, 4, 3, 2, or 1% by weight of the triglyceride molecules containing saturated fatty acids in the blended fat composition are tri-saturated triglycerides; the blended fat composition contains no more than 0.1, 0.2, 0.3, 0.4, 0.5, 0.6, 0.7, 0.8, 0.9, or 1.0 times the level of trisaturated triglycerides present in the fat blend described herein for Diet 704.

In desirable embodiments, the fat composition contains no triglycerides which have been subjected to interesterification or contains no more than 0.1, 0.2, 0.3, 0.5, 0.7, 1, 2, 3, 4, 5, 6, 7, 8, 9, or 10% by weight triglycerides which have been subjected to interesterification; the fat composition contains no more than 0.2, 0.3, 0.5, 0.7, 1, 2, 3, 4, 5, 6, 7, 8, 9, or 10% by weight triglycerides which have been subjected to interesterification with tripalmitin or a tripalmitin-rich triglyceride composition or palmitic acid free fatty acids; the fat composition contains no more than 0.2, 0.3, 0.5, 0.7, 1, 2, 3, 4, 5, 6, 7, 8, 9, or 10% by weight triglycerides which have been subjected to interesterification with tristearin or a tristearin-rich triglyceride composition or stearic acid free fatty acids; the fat composition contains no more than 0.2, 0.3, 0.5, 0.7, 1, 2, 3, 4, 5, 6, 7, 8, 9, or 10% by weight triglycerides which have been subjected to interesterification with a triglyceride composition which is a rich in a combination of any two, three, or four of tripalmitin, tristearin, palmitic acid free fatty acids, and stearic acid free fatty acids (e.g., a mixture of tripalmitin and tristearin); the fat composition does not contain triglycerides which have been subjected to interesterification such that the content of palmitate or stearate in the resulting interesterified mixture of triglycerides is increased or the increase is less than 5, 10, 15, 20, 30, or 50%.

In desirable cases, the edible fat composition is a balanced fat composition in which the pairwise weight ratios between saturated fatty acids, monounsaturated fatty acids, and polyunsaturated fatty acids is not greater than 3, 2.5, 2, 1.9, 1.8, 1.7, 1.6, 1.5, 1.4, 1.3, 1.2, 1.1, 1.0, 0.9, 0.8, 0.7, 0.6, 0.5, or 0.4 or is in a range defined by taking any two of the just-specified values at end points of the range; the dietary fat is an essentially unmodified blend of natural fats; the dietary fat also includes about 2 to 15%, 4 to 15%, 4 to 10%, 6 to 15%, 6 to 12%, 6 to 10%, or 4 to 8% by weight of hard fat having a Mettler drop point higher than palm kernel oil, e.g, about 30, 32, 35, 40, or 45 degrees C.; and/or the hard fat is or includes a high-stearic acid content fat, e.g., shea butter, fully-hydrogenated soybean oil or other fully-hydrogenated vegetable oil, natural high-stearic fat soybean oil from a high-stearic acid soybean variety, or a high palmitic acid content fat, e.g., palm oil and/or palm midfraction and/or palm stearin, or any combination of the just specified fats or oils; the dietary fat includes at least one diglyceride hardening agent, e.g., at least 2, 3, 4, 5, 7, 10, 12, or 15 percent by weight of the dietary fat plus diglyceride mixture; the dietary fat has a Mettler drop point above 29 degrees C., e.g., above 30, 32, 35, 37, or 40 degrees C.

In particular embodiments, the fat composition is an oil blend containing or containing about (within ±5, 10, 20, or 25% of the oil percentages) the oil combination described herein for Diet 694, 697, 698, 699, 701, or 703; the fat composition is an oil blend containing or containing about (within ±5, 10, 20, or 25% of the fatty acid composition percentages) the fatty acid composition described herein for Diet 694, 697, 698, 699, 701, or 703.

In preferred cases, the fat composition is substantially free of animal fat or contains no more than 1, 2, 3, 4, 5, 6, 7, 8, 9, or 10% by weight animal fat (e.g., milkfat, lard, and/or tallow, or a fat fraction thereof). While it is preferable for the fat composition to be substantially cholesterol-free, in view of the ability of the present fat compositions to at least partially compensate for the presence of dietary cholesterol, in certain embodiments, the fat composition includes some cholesterol, e.g., at least 0.01, 0.02, 0.03, 0.04, 0.05, 0.07, 0.10, or 0.15% by weight or is in a range defined by taking any two of the just-specified values as inclusive endpoints of the range.

The edible oils of the present invention can advantageously be used in preparation of any of a variety of different products. Thus, a related aspect of the invention concerns a prepared food product which includes the edible fat composition of the preceding aspect or an embodiment thereof.

In certain embodiments, the prepared food product is a cooking oil, an oil spread (e.g., a margarine), a shortening, a salad dressing; a barbecue or dipping sauce or other condiment, a baked good (e.g., bread, tortilla, pastry, cake, cookie, or pie), or a dairy product (e.g., a milk, yoghurt, or cheese); in certain embodiments, the present edible fat composition is 2 to 10, 5 to 15, 10 to 30, 30 to 50, or 50 to 100% by weight of the prepared food product.

Another related aspect concerns a human diet or diet formulation which is intended for, or which when regularly ingested has the effect of, increasing the concentration of HDL cholesterol, decreasing the LDL cholesterol, increasing the fraction of HDL versus total cholesterol, reducing the triglyceride level, and/or decreasing the LDL/HDL concentration ratio in human plasma, and/or decreasing the fasting blood glucose concentration, in which a substantial amount, e.g., 10 to 100%, 10 to 90%, 10 to 80%, 10 and 75%, 10 to 50%, 20 to 100%, 20 to 80%, 20 to 60%, 30 to 100%, 30 to 80%, 50 to 100%, or 50 to 80% by weight of the daily dietary fat is provided by the edible fat composition of the first aspect, or an embodiment thereof, or is otherwise described herein for the present invention.

In particular embodiments, the human diet formulation is provided in packaged liquid form or in other packaged form (for example, packed in single meal or daily meal plan form), e.g., indicated for weight loss, for nutritional supplementation or replacement, such as for elderly patients or patients with compromised digestive systems, and/or for improvement of a patient's lipoprotein profile.

Likewise, an aspect of the invention provides a method of aiding a person to increase the concentration of HDL cholesterol, increase the percentage of HDL cholesterol as a fraction of total cholesterol, decrease the LDL cholesterol, decrease triglyceride level, and/or decrease the LDL/HDL cholesterol ratio in their plasma, and/or decrease the fasting blood glucose concentration. The method involves providing a dietary fat composition according to the first aspect above or otherwise described herein for the present invention. Preferably the dietary fat composition is substantially cholesterol-free.

Preferably the dietary fat composition is a blend of natural fats and does not contain interesterified oils or other structurally modified oils. Notwithstanding the preceding, in certain embodiments, the dietary fat composition is or includes a structurally modified triglyceride-based dietary fat composition, where the dietary fat composition includes at least 1, 2, 3, 4, 5, 6, 7, 8, 10, 12, or 15% by weight linoleic acid and/or oleic acid esterified at the sn-2 position in triglyceride molecules, and may also contain up to 1, 2, 3, 4, 5, 6, 7, 8, 10, 12, 15, 20, 25, or 30% by weight saturated fatty acids (or myristic acid and/or lauric acid) esterified at the sn-2 position, between 5% and 40% by weight linoleic acid, between 30% and 65% by weight oleic acid, and between 15% and 40% by weight total saturated fatty acids, where the weight ratio of sn-2 myristic acid (and/or sn-2lauric acid) to sn-2 palmitic acid is greater than 1:1 and/or the weight ratio of sn-2 myristic acid (and/or sn-2lauric acid) to sn-2 stearic acid is greater than 1:1 and/or the weight ratio of myristic acid plus lauric acid to palmitic acid plus stearic acid is greater than 1:1, and the sum of weight percentages for saturated, polyunsaturated and monounsaturated fatty acids equals 100%.

In particular embodiments, the edible oil composition is as described for the first aspect above or an embodiment thereof or otherwise described herein for the present invention; the edible oil composition is provided at least in part or primarily in one or more prepared foods or diets or diet formulations (e.g., liquid diet formulations) as specified for an aspect above or an embodiment thereof.

In certain embodiments, the person suffers from high LDL cholesterol and/or from a high LDL/HDL cholesterol ratio, and/or a low percentage of HDL cholesterol as a percentage of total cholesterol in their plasma; the person is clinically obese.

Similarly, another related aspect concerns a method of increasing the concentration or percentage of HDL cholesterol, decreasing the LDL cholesterol, and/or increasing the HDL/LDL cholesterol ratio, decreasing triglycerides, and/or decreasing the fasting blood glucose concentration, in the plasma of a human subject. The method involves consistently ingesting a dietary fat composition of the first aspect above or an embodiment thereof or is otherwise as described herein for the present invention.

A further aspect concerns a method of preparing an edible fat composition by blending an edible oil rich in myristate and/or laurate with at least one other edible oil (e.g, 2, 3, or 4 different oils) in proportions such that a blended edible oil as described for the first aspect above or an embodiment thereof is formed. Preferably the blended edible oil is substantially cholesterol-free.

In certain embodiments, the blended edible oil formed is semi-solid at 25, 27, 30, 32, or 35 degrees C.

In certain embodiments, the edible fat composition includes at least 3, 4, 5, 6, 7, 8, 9, or 10% of myristic acid, lauric acid, or each of myristic acid and lauric acid; less than 33, 30, 25, 20, 15, 10, 5, or 3% of the laurate and/or myristite is esterified at the sn-2 position; the edible fat composition includes at least 3, 4, 5, 6, 7, 8, 10, 15, 20, 25, or 30% by weight linoleic acid esterified at the sn-2 position; the edible fat composition includes at least 1, 2 or 3% by weight myristic acid and/or lauric acid esterified at the sn-2 position in triglyceride molecules (but preferably not exceeding a percentage as specified above for sn-2 esterified myristic acid and/or lauric acid), between 5% and 40% by weight linoleic acid (which may advantageously include linoleic acid esterified at the sn-2 position, e.g, at least 3, 4, 5, 6, 7, 8, or 10% by weight), between 30% and 65% by weight oleic acid, and between 15% and 40% by weight total saturated fatty acids. The ratio of sn-2 myristic acid (and/or sn-2 lauric acid) to sn-2 palmitic acid is preferably greater than 1:1, 2:1, 3:1, 4:1, 5:1 or 6:1, and the sum of weight percentages for saturated, polyunsaturated and monounsaturated fatty acids equals 100%. Preferably the edible oil rich in myristate (and/or laurate), the at least one other edible oil, and/or the edible fat composition are substantially cholesterol-free.

In certain embodiments, the edible oil rich in myristate (and/or laurate) is formed by a method that includes enzymatic or chemical interesterification, generally resulting in an increase in the sn-2 myristate (and/or sn-2laurate) level; the edible fat composition is as specified for the edible oil of the first aspect above or an embodiment thereof or is otherwise as described herein for the present invention.

In some embodiments, the fat composition is formed by blending a high oleic vegetable oil (such as high oleic sunflower oil or high oleic soybean oil) with palm kernel oil or coconut oil or a combination of palm kernel oil and coconut oil.

A further aspect concerns a method for limiting plasma triglycerides (TG), LDL cholesterol, and/or VLDL cholesterol (VLDL or VLDL-C), and involves providing to a human or livestock animal for ingestion a dietary fat with a fatty acid composition which includes 5 to 40% (e.g., 7 to 40% or 8 to 40% or 10 to 40%) by weight linoleic acid (or other percentage as specified above for the first aspect); and 15 to 55% by weight saturated fatty acids, where 10 to 45% by weight of the fatty acid composition is myristic acid (14:0) plus lauric acid (12:0) where the total weight percent of fatty acids in the fatty acid composition is 100%.

In particular embodiments, the weight ratio of myristic acid to lauric acid is less than 3, 2, 1, 0.9, 0.8, 0.7, 0.6, 0.5, or 0.4; the composition includes at least 3, 4, 5, 7, 10, 12, or 15% by weight myristic acid and/or at least 3, 4, 5, 7, 10, 12, or 15% by weight lauric acid; the composition includes at least 3, 4, 5, 6, 7, 8, 9, or 10% by weight linoleic acid esterified at the sn-2 position; less than 33, 30, 25, 20, 15, 10, or 5% of the laurate and/or myristate moieties are esterified at the sn-2 position.

Also in certain embodiments, the fat providing the fatty acid composition and/or the remainder of the diet contains a moderate but not excessive level of dietary cholesterol, e.g., at a level not greater than 0.02, 0.03, 0.04, 0.05, 0.6, 0.08, or 0.09% by dry weight or in a range of 0.02 to 0.04, 0.03 to 0.06, or 0.04 to 0.08, or 0.05 to 0.09 percent by dry weight of the diet; or the level of the dietary cholesterol is not greater than 0.05, 0.06, 0.07, 0.08, 0.09, 0.10, 0.15, 0.20, or 0.30% by weight of the dietary fat or is in a range of 0.05 to 0.10, 0.07 to 0.15, 0.10 to 0.20, 0.10 to 0.30, or 0.20 to 0.30% by weight of the dietary fat.

In further embodiments, at least 7, 8, 9, 10, 12, 15, 20, 25, 30, 35, or 40% by weight of the fatty acid composition is monounsaturated fatty acids; and/or the fatty acid composition contains 7 to 14.9%, 7 to 15%, 7 to 20%, 8 to 15%, 8 to 20%, 8 to 25%, 10 to 25%, 10 to 30% 10 to 35%, 10 to 40%, 15 to 35%, 15 to 40%, 20 to 40%, 25 to 40% or 30 to 40% by weight linoleic acid.

Desirably, the amount of tri-saturated triglycerides in the fatty acid composition is limited; thus, in certain embodiments, no more than 60, 50, 40, 30, 20, 15, 12, 10, 9, 8, 7, 6, 5, 4, 3, or 2% of the triglyceride molecules containing saturated fatty acids are tri-saturated triglycerides; the amount of tri-saturated triglycerides in the fatty acid composition is no more than 0.1, 0.2, 0.3, 0.4, 0.5, or 0.6 times the level of tri-saturated triglycerides found in the fat blend described for Diet 704 herein.

For some advantageous embodiments, the ratio of polyunsaturated fatty acids to saturated fatty acids in the fatty acid composition is from 0.3 to 2, 0.3 to 1.5, 0.3 to 1.2, 0.3 to 1, 0.5 to 2, 0.5 to 1.5, 0.5 to 1.2, 0.5 to 1, 0.7 to 2, 0.7 to 1.5, 0.7 to 1.4, 0.7 to 1.3, 0.7 to 1.2, 0.9 to 2, 0.9 to 1.5, 0.9 to 1.4, 0.9 to 1.3, 0.9 to 1.2, 1 to 2, or 1 to 1.5; the saturated fatty acids in the fatty acid composition are primarily provided by palm kernel oil, or about 50 to 60, 50 to 70, 50 to 80, 50 to 90, 60 to 80, 60 to 90, or 70 to 90% by weight of the saturated fatty acids in the fatty acid composition are provided by palm kernel oil; and/or no more than 1, 2, 3, 5, 10, 15, 20, 25, or 30% by weight are provided by coconut oil; the saturated fatty acids in the fatty acid composition are primarily provided by coconut oil, or about 50 to 60, 50 to 70, 50 to 80, 50 to 90, 60 to 80, 60 to 90, or 70 to 90% by weight of the saturated fatty acids in the fatty acid composition are provided by coconut oil.

Also in certain embodiments, the weight ratio of (12:0+14:0) to (palmitic acid (16:0)+stearic acid (18:0)) fatty acids in the fatty acid composition is at least 0.2, 0.5, 1.0, 2.0, 3.0, 4.0, 5.0, 7.0, or 10.0.

In some embodiments, the dietary fat provides from 10 to 50%, 10 to 40%, 10 to 30%, 20 to 50%, 20 to 40%, 20 to 35%, 20 to 30%, 25 to 50%, 25 to 40%, 30 to 50%, 30 to 40%, or 35 to 45% of the total dietary calories in the diet; regular ingestion of the dietary fat reduces plasma LDL without significantly reducing HDL; regular ingestion of the dietary fat reduces plasma VLDL without significantly reducing HDL; regular ingestion of the dietary fat reduces plasma total cholesterol (TC) without significantly reducing HDL; regular ingestion of the dietary fat reduces plasma triglycerides (TG) without significantly reducing HDL; regular ingestion of the dietary fat significantly reduces VLDL and TC without significantly reducing HDL; regular ingestion of the dietary fat reduces the LDUHDL ratio; and/or the specified reductions occur in the presence of dietary cholesterol, e.g., at levels as specified above.

In particular embodiments, regular ingestion of the dietary fat composition by a human can produce an increase in percentage of lean body mass (or in the case of livestock animals, produces increased lean carcass mass and/or muscle mass and/or increased carcass weight) as a percentage of total body weight. For example, in young growing animals, regular ingestion of the dietary fat produces increased carcass mass and/or muscle mass. In mature animals, this can produce increased retention of carcass mass and or muscle mass and/or increased carcass as a percentage of total body weight; regular ingestion of the dietary fat composition by an animal produces decreased adipose tissue or reduced perirenal adipose tissue with maintained or increased carcass mass; in some cases the animal is a bovine, porcine (e.g., domestic pig), equine, ovine (e.g., domestic sheep), caprine (e.g., domestic goat), avian (e.g., chicken, turkey, duck), picine (e.g. salmon, catfish, and tilapia), feline (e.g., domestic cat), canine (e.g., domestic dog), or human animal. In the case of livestock, carcass mass or carcass weight refers to the weight of an animal after slaughter and removal of most internal organs, head, and skin with associated fat.

In desirable cases, the dietary fat is a balanced fat composition in which the pairwise weight ratios between saturated fatty acids, monounsaturated fatty acids, and polyunsaturated fatty acids is not greater than 2, 1.9, 1.8, 1.7, 1.6, 1.5, 1.4, 1.3; the dietary fat is an essentially unmodified blend of natural fats; the dietary fat also includes about 2 to 15%, 4 to 15%, 4 to 10%, 6 to 15%, 6 to 12%, 6 to 10%, or 4 to 8% by weight of hard fat having a Mettler drop point higher than palm kernel oil, e.g., about 30, 32, 35, 40, or 45 degrees C.; and/or the hard fat is or includes a high-stearic acid content fat, e.g., shea butter, fully-hydrogenated soybean oil, natural high-stearic fat, soybean oil from a high-stearic acid soybean variety, or a high palmitic acid content fat, e.g., palm oil and/or palm stearin, or any combination of the just specified fats or oils; the dietary fat has a Mettler drop point above 29 degrees C., e.g., above 30, 32, 35, 37, or 40 degrees C.

In some embodiments, the dietary fat is in the form of a margarine, a spread, a shortening, or a frying oil composition; the dietary fat is included in a prepared food, e.g, baked goods, filled milk, mayonnaise, salad dressing, or filled yoghurt, or is included in a complete diet composition.

A related aspect concerns a method of limiting (which may be reducing) the concentration of LDL and/or VLDL in the plasma of a human subject consuming a diet containing cholesterol, by consistently ingesting a dietary fat as specified for one of the preceding aspects, where the dietary fat provides 20 to 50 percent of the total dietary calories of the subject (or other percentage of the dietary calories as specified for an aspect above).

In particular embodiments, the dietary fat is as specified for an embodiment of the preceding aspect; the dietary fat is provide in one or more prepared foods; the dietary fat is provided in a complete diet composition; the dietary fat provides 25 to 40%, 30 to 50%, or 35 to 45% of the dietary calories of the subject; the dietary fat is a blend of at least two, three, or four fats and/or oils.

In another related aspect, the invention concerns a method of increasing carcass mass (or muscle growth or muscle retention or reduces the percentage of body weight which is adipose tissue or perirenal adipose tissue) in a human or livestock animal, where the animal regularly ingests a diet containing a dietary fat as specified in the preceding two aspects, where the dietary fat provides 20 to 50%, 25 to 40%, 30 to 50%, or 35 to 45% of the dietary calories for the animal (or other percentage of the dietary calories as specified for an aspect above).

In particular embodiments, the dietary fat is as specified for an embodiment of a preceding aspect; the dietary fat is provided in one or more prepared foods; the dietary fat is provided in a complete diet composition; the dietary fat provides 25 to 50%, 25 to 40%, 30 to 50%, or 35 to 45% of the dietary calories of the subject; the dietary fat is a blend of at least two, three, or four fats and/or oils.

Also in particular embodiments, the animal is a mammal, a livestock animal such as an avian (e.g., a chicken, turkey, or duck), a porcine, a bovine (typically cattle), an ovine (such as domestic sheep), a caprine (such as domestic goat), an equine, a picine (such as salmon or tilapia), a canine (such as a domestic dog), a feline (such as a domestic cat), or a human.

In a related aspect, the invention further concerns a blended fat composition (i.e., a blend of at least two fats and/or oils) as described in the first aspect or otherwise described herein for this invention.

In some embodiments, the blended fat composition contains at least 5, 6, 7 8, 10, or 12 but less than 15% by weight linoleic acid; 15 to 55% (preferably 15 to 40%) by weight saturated fatty acids, where 10 to 45% by weight of the blended fat composition is myristic acid and/or lauric acid, and where the sum of weight percentages for saturated, polyunsaturated and monounsaturated fatty acids equals 100%. In some embodiments, the weight ratio of myristic acid to lauric acid is less than 3; the fat composition contains at least 3% by weight of myristic acid, or lauric acid, or each of myristic acid and lauric acid, or a combination of myristic acid and lauric acid. Preferably the fat composition is substantially cholesterol-free.

In certain embodiments, no more than 60, 50, 40, 30, 20, or 10% of the triglyceride molecules containing saturated fatty acids in the blended fat composition are tri-saturated triglycerides; the blended fat composition contains no more than 0.1, 0.2, 0.3, 0.4, 0.5, 0.6, 0.7, 0.8, 0.9, or 1.0 times the level of trisaturated triglycerides present in the fat blend described herein for Diet 704. In particular embodiments, the blended fat composition is as described for an embodiment of a preceding aspect which matches the requirements of this aspect.

As the present dietary fats can be incorporated in a human diet, e.g, in a complete diet composition, the invention also concerns a human diet for limiting the concentration of LDL and/or VLDL cholesterol and/or increasing the HDL/LDL ratio and/or increasing the percentage of HDL as a fraction of total cholesterol and/or reducing total triglycerides in human plasma, where at least 10, 15, 20, 25, or 30% of the daily dietary fat in the diet is provided by the dietary fat of any of the preceding aspects.

In certain embodiments, the diet contains cholesterol, e.g., at a level as specified in any of the preceding four aspects; the dietary fat of the present invention provides 10 to 50%, 10 to 40%, 10 to 30%, 20 to 50%, 20 to 40%, 20 to 30%, 25 to 50%, 25 to 40%, 30 to 50%, or 35 to 45% of the dietary calories in the diet.

Likewise, the invention concerns a prepared food product which includes a dietary fat as specified in any of the preceding aspects; the prepared food product may contain cholesterol, e.g., at level as specified in an aspect above.

In certain embodiments, the prepared food product is a baked good, a filled milk, a mayonnaise, a salad dressing, or a filled yoghurt.

Yet another aspect concerns a method of preparing a dietary fat, involving blending an edible fat or oil rich in myristate and/or laurate with at least one other edible fat or oil, thereby forming a blended dietary fat as described for an aspect above or otherwise described herein for the present invention.

In certain embodiments, the blended dietary fat has a fatty acid composition which includes 5 to 40, 6 to 40, 7 to 40, 8 to 40, 9 to 40, or 10 to 40% linoleic acid; and 15 to 50% by weight saturated fatty acids, where 10 to 40% by weight of the fatty acid composition is myristic acid plus lauric acid (e.g., in a weight ratio of myristic acid to lauric acid of less than 3 or in a range of from 3 to ⅓), and where the sum of weight percentages for saturated, polyunsaturated and monounsaturated fatty acids in the fatty acid composition equals 100%.

In certain embodiments, the dietary fat is as specified for an embodiment of any of the preceding aspects.

In particular embodiments, the saturated fatty acids in the blended dietary fat are primarily provided by palm kernel oil or about 50 to 60, 50 to 70, 50 to 80, 50 to 90, 60 to 80, 60 to 90, or 70 to 90% by weight of the saturated fatty acids in the fatty acid composition are provided by palm kernel oil; and/or no more than 1, 2, 3, 5, 10, 20, or 30% by weight are provided by coconut oil; the blended dietary fat is a chemically unmodified blend of natural fats and/or oils; the blended dietary fat also includes about 4 to 10% by weight of high stearic acid content fat or other percentage as specified for an aspect above; the saturated fatty acids in the blended dietary fat are primarily provided by coconut oil or about 50 to 60, 50 to 70, 50 to 80, 50 to 90, 60 to 80, 60 to 90, or 70 to 90% by weight of the saturated fatty acids in the fatty acid composition are provided by coconut oil.

Additional embodiments will be apparent from the Detailed Description and from the claims.

DETAILED DESCRIPTION OF THE PREFERRED EMBODIMENTS

A. Overview

Figure 1:
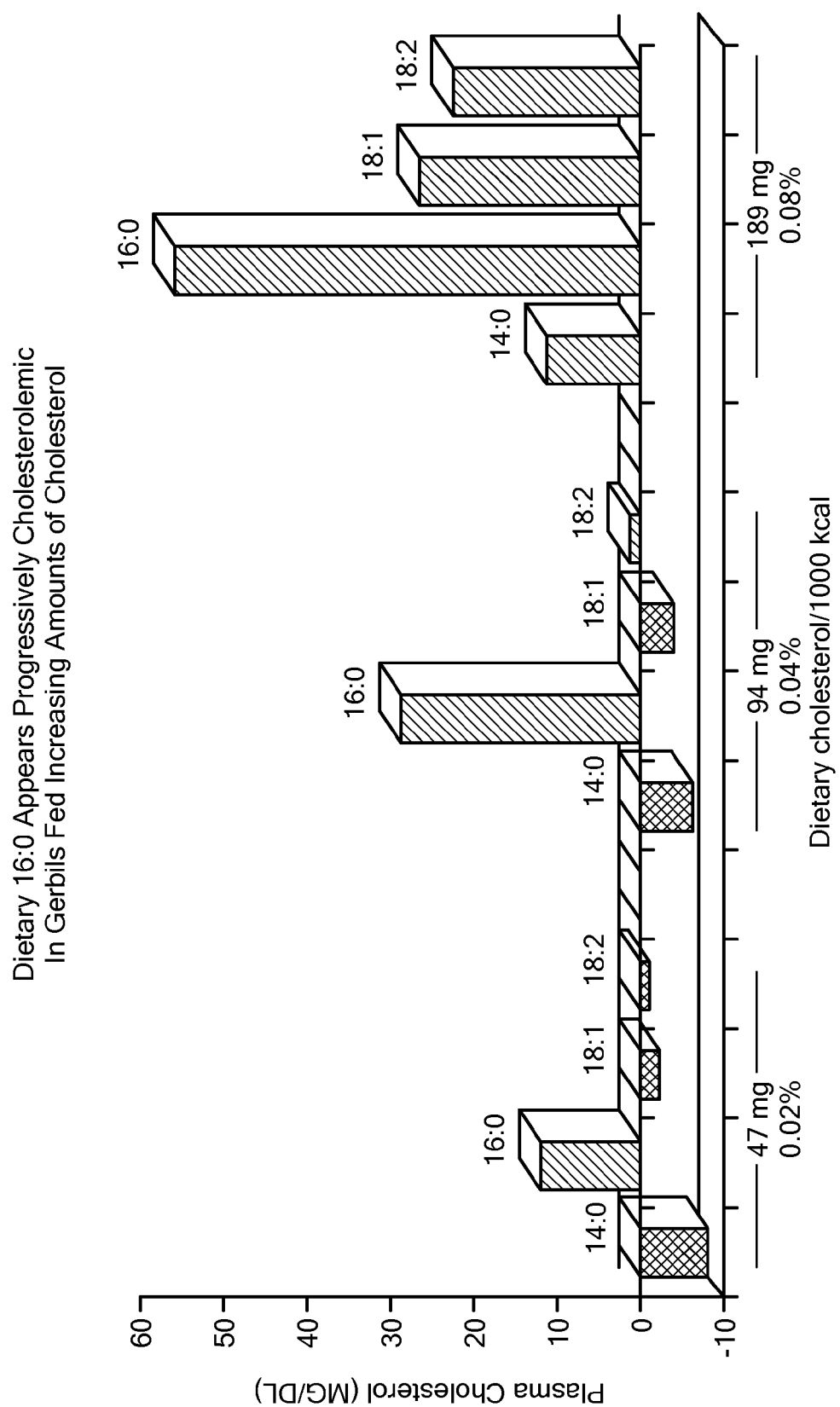
FIG. 1 is a graph showing the plasma cholesterol levels in gerbils for different levels of dietary cholesterol with several different fatty acids providing fat in the diet. This figure depicts the relative increment of plasma cholesterol increase in male gerbils over their TC value when fed the given fat alone without cholesterol. The different fats are represented by their key fatty acids as 14:0 for coconut oil, 16:0 for palm stearin, 18:1 for olive oil, and 18:2 for safflower oil.

The present invention focuses on subtle differences in the mammalian (e.g., human) body's lipoprotein regulatory response to dietary fats, which can include dietary fats that contain a number of different saturated fatty acid molecules that are esterified either at the same or at different glyceryl carbons (sn-1, sn-2 or sn-3 structural isomer locations) within the triglyceride molecule (and/or mono- or di-glyceride molecule). Because human clinical studies involving large numbers of subjects and differing diets are very costly and labor-intensive, and because there are so many experimental variables of interest, there is a limited amount of experimental data relating to the effect on lipoprotein metabolism of dietary saturated fatty acids of differing molecular weights (i.e., 10, 12, 14, 16, and 18 carbons per fatty acid). There is also minimal clinical research data in which differing sn-1, sn-2 and sn-3 triglyceride structural isomers of dietary triglycerides have been constructed and fed to human subjects over a period of time, in which these isomers contain fixed amounts of specified saturated fatty acids located at different glyceryl carbons. Therefore, mammalian animal models such as the gerbil, that have proven to be predictive of the human metabolic response to dietary fats, can be invaluable in studying lipoprotein metabolism and predicting changes in the plasma levels of various forms of cholesterol as well as changes in plasma triglyceride levels, the glycemic response, weight gain, and adipose tissue deposition patterns.

It has been found in this invention that ingestion of certain types of fatty acid combinations unexpectedly result in beneficial improvements in the LDL/HDL cholesterol ratios as well as other parameters. Without being bound to a particular theory, it has been observed that saturated fatty acids result in increased blood levels of both HDL and LDL. As a result, ingestion of a diet excessively rich in saturated fatty acids undesirably elevates total serum cholesterol without providing a desirable LDL/HDL ratio. However, if a moderate proportion of saturated fatty acids is ingested together with a sufficient but not excessive amount of polyunsaturated fatty acids, primarily linoleic acid (18:2), the level of LDL is reduced, resulting in a desirably lower LDL/HDL ratio. Excessive levels of linoleic acid tend to excessively depress the levels of both HDL and LDL, again resulting in undesirable LDL/HDL ratios as well as lipoprotein and/or phospholipid levels which are potentially too low.

Surprisingly, it was found that the reduction of LDL, when sufficient but not excessive linoleic acid is ingested in the combination of fatty acids, is more effective when a significant amount of the saturated fatty acids are lauric acid (12:0) and/or myristic acid (14:0) rather than palmitic acid (16:0) and/or stearic acid (18:0). This is illustrated, for example, in the dietary study results shown in Table 10 with the comparison of lipid profiles for a diet containing a high linoleic acid and high myristic acid diet (Diet 703) with a diet containing high linoleic acid and high palmitic acid (Diet 702). Diet 703 resulted in notably better HDL-C and LDL-C levels, and better LDL-C/HDL-C ratio. While the mechanism is not currently understood, lauric acid and usually about 1;2 of myristic acid is absorbed and transported to the liver via the portal system, while palmitic acid and stearic acid are largely taken up and absorbed via chylomicrons and transported to muscle and other tissues. As a result, when lauric and myristic acids predominate over palmitic and stearic acids, the fatty acids are predominantly metabolized in the liver, so there is less chance for them to be incorporated into LDL. In contrast, palmitic and stearic acids packaged in chylomicrons are processed in a manner which results in higher levels of LDL formation as well as catabolism of HDL in clearing chylomicron fragments, potentially partially depleting the HDL pool. These differences in transport mechanisms and tissues also correlate with oxidation rates, where lauric and myristic acid have been shown to be oxidized faster than palmitic and stearic acids.

The surprising discovery that, when a significant fraction of the saturated fatty acids are provided by lauric and/or myristic acids rather than palmitic and/or stearic acids, and other cholesterolemic components are not excessive, relatively low levels of linoleic acid are effective for controlling LDL levels. This allows relatively low ratios of polyunsaturated fatty acids (primarily linoleic acid) to saturated fatty acids to be effective. For example, P/S ratios [or P(18:2)/ ratios] of about 0.3 to 2 are quite effective for providing good compensation by linoleic acid for the lipoprotein-elevating effects of the saturated fatty acids.

The animal model data, including reproducible plasma lipoprotein data, which have now been obtained and carefully evaluated, leads to conclusions that differ from the prior art. Others have used small increments of milkfat in dietary fat blends and observed altered lipoprotein profiles in human and other mammalian plasmas without suitable explanation. From the collective data, it now appears that most benefit is achieved if two processes occur simultaneously: 1) using 12:0+14:0 to replace 16:0+18:0 lowers the fat meltpoint, particularly when there is sufficient UFA in the fat [either by interesterification (IE) or by blending with an UFA oil] and 2) adding a critical mass of UFA favors/improves phospholipid formation, which enhances metabolism of the more rapidly melting/digested fat. A low meltpoint based on 12:0+14:0 also indicates that these shorter fatty acids (FA) will go directly to the liver via the portal vein, resulting in less chylomicron formation and ultimately an increased circulating HDL.

Additional observations that help in an improved understanding of lipoprotein metabolism involve interesterification (IE) experiments described herein. First, when IE is used to insert MUFA and PUFA at sn-2 triglyceride locations, (thereby replacing sn-2-SFAs, as in the PKO studies in gerbils described herein), this IE process favors BOTH phospholipid formation AND a lower meltpoint for the fat. Together these changes improve lipoprotein metabolism, improvement that is most apparent when both phospholipid synthesis and meltpoint lowering aspects are satisfied by the same fat. Conversely, when a natural triglyceride (TG) composition (especially a high palmitic acid-containing oil like palm oil) is interesterified, and a substantial amount of SFA is placed in the sn-2 position where UFA had previously been present, the lipoprotein metabolism becomes impaired. Until now, no one has reconciled these complex and interconnected elements of lipid and lipoprotein metabolism.

Accordingly, it would appear that a phospholipid derived from a sn-2-SFA monoglyceride has the inherent ability to raise plasma cholesterol levels, especially LDL cholesterol. Consistent with this observation, it is now apparent to Applicant (including from the recalculated data of McGandy et al. discussed below) that saturated fatty acids, especially palmitic acid (16:0), inserted at the sn-2 position of triglyceride molecules (present in milkfat), undesirably reduce the HDL-C level and increase the LDL-C/HDL-C ratio. Thus milkfat, in which most of the sn-2 positions (approximately 80%) are occupied by SPA, is the wrong choice for an advantageous "healthy fat" for adults principally because it lacks sufficient PUFA, i.e., linoleic acid, at the sn-2 position. Applicant concludes that for a specific dietary fat to be effective in improving human lipoprotein profiles and/or glucose metabolism over a broad population, it must supply adequate sn-2 UFA, especially sn-2 linoleic acid.

In addition to the inclusion of significant levels of lauric and myristic acids in preference to palmitic and stearic acids, in most cases, it is desirable to have no more than a low level of tri-saturated triglycerides. As a result, it is beneficial for a large percentage of the triglycerides containing one or more saturated fatty acids to also contain at least one unsaturated fatty acid (abbreviated as UFA), preferably including at the sn-2 position as is typically found in natural oils. For example, a triglyceride may have myristate at the sn-1,3 positions and linoleate or oleate at the sn-2 position. The presence of significant levels of sn-2 UFA's is further beneficial for synthesis of phospholipids. It has further been found that these desirable combinations of fatty acids can be provided using natural fats/oil, without requiring interesterification which generally results in non-natural distributions of fatty acids in the respective glyceryl positions. While it may be preferable for most of the triglycerides to have unsaturated fatty acids at the sn-2 position, it can also be beneficial for some of the triglycerides to have lauric or myristic acid at the sn-2 position, preferably with lower levels of sn-2 palmitic and sn-2 stearic acids.

Certain beneficial fat compositions contain sufficient saturated fatty acids, preferably predominantly lauric acid and myristic acid rather than palmitic acid and stearic acid, to maintain lipoprotein levels at appropriate levels. In advantageous cases, the composition contains at most a low or very low level of tri-saturated triglycerides. The composition also contains a sufficient level of PUPA (primarily linoleic acid) to reduce the LDL level. Applicant believes linoleic acid located in the sn-2 position is most active in this regard, and therefore it is desirable if a sufficient fraction of the linoleic acid is located at the sn-2 position. Some of the lauric and/or myristic acid may be located at the sn-2 position, but preferably not at a level which prevents the LDL-lowering effect of the linoleic acid. Small amounts of other PUFA's and SPA's may also be present. Substantially the remainder of the fat composition is MUPA's, primarily oleic acid.

Thus, this invention further concerns compositions and methods for selectively increasing or maintaining the plasma level of HDL "good" cholesterol (HDL-C), decreasing the level of LDL "bad cholesterol (LDL-C), reducing the LDL/HDL ratio, reducing total blood triglycerides, reducing fasting blood glucose, and/or reducing adipose tissue (or perirenal or abdominal adipose tissue) relative to lean body tissue by consuming a substantially cholesterol-free nutritional fat or oil-based composition which contains an appropriate balance of linoleic acid, oleic acid, and saturated fatty acids, especially myristic acid and lauric acid. In advantageous cases, the fat composition contains an appropriate amount of unsaturated fatty acids at the sn-2 position, e.g., linoleic acid and oleic acid. The sn-2 unsaturated fatty acids appear particularly beneficial in this position while also disrupting tri-saturated triglycerides. In some cases, the composition can advantageously contain an appropriate amount of sn-2 myristic acid (and/or sn-2 lauric acid), preferably with low sn-2 palmitate and sn-2 stearate.

A number of researchers have prepared dietary fats enriched with milkfat in which much of its 10% by weight myristic acid is located, by nature, at the sn-2 position of the triglyceride molecule. However, milkfat also contains approximately 26% by weight palmitic acid (16 carbon saturated fatty acid) that is also preferentially located at the sn-2 position. While sn-2 palmitic acid in breast milk may be beneficial to newborns by raising LDL, its benefit to adults is questionable. Accordingly, in experiments described herein (see, e.g, diets 684 and 685), gerbils have been fed parallel diets in which saturated fats have been provided via interesterified fats produced by interesterifying either trimyristin or tripalmitin with high oleic sunflower oil. In the interesterification, positioning of the respective fatty acids on the glycerol backbone is expected to be substantially random. This results in a significant fraction of the triglycerides having sn-2 UFA (primarily oleic with a lower level of linoleic), and also a significant fraction having sn-2 SPA (myristic or palmitic respectively) along with triglycerides which have sn-1 and/or 3 SPA. In each of these diets, myristic acid or palmitic acid (including sn-2 myristic acid or sn-2 palmitic acid) have been provided in equal amounts.

It is clear that the lipoprotein profile of animals fed a myiistic acid-containing balanced fat (containing approximately 8% by weight linoleic acid and 46% by weight of myristic acid) is far superior to that of animals fed a homologous fat containing palmitic acid.

In cases where sn-2 myristic acid is desired, as an alternative to using milkfat as a source of sn-2 myristic acid, triglyceride structural isomers with sn-2 myristate can also be produced using the free fatty acid of myristate in interesterification reactions with natural and/or synthetic fats. Structural rearrangement of natural and synthetic triglycerides that contain myristic acid at the sn-1 and sn-3 positions can also be used to move some of the myristate to the sn-2 position. For example, interesterification can be used to randomize the distribution of myristic acid over the three positions of the triglyceride molecule. Researchers have proposed that regular dietary intake of fats containing sn-2 myristate may allow the human lipoprotein regulatory system to respond by beneficially increasing plasma HDL cholesterol levels. While some nutritional experiments have explored the use of different levels of sn-2 myristic acid in dietary fats, few investigators have systematically adjusted the level of other dietary fatty acids (saturated, monounsaturated and polyunsaturated) in concert with sn-2 myristic acid so as to further improve the dietary fat, and further increase the HDL cholesterol level and the HDL/LDL ratio (i.e., decrease the LDL/HDL ratio), and none have recognized the advantageous balance characterizing the present invention.

In addition and quite surprisingly in view of the prior understanding that fats containing myristic and lauric acids are highly cholesterolemic, it has been found that blends of natural oils that have not been subjected to interesterification, and that contain substantial levels of myristic and/or lauric acids (which can include some at the sn-2 triglyceride position) can be formed and can result in advantageous LDL/HDL ratios and other physiological effects when sufficient but not excessive amounts of linoleic acid are also present in fat molecules. Advantageously, a significant fraction of the linoleic can be at the sn-2 position. When incorporating myristic and lauric acid, it is beneficial to balance the levels of these fatty acids with linoleic acid and preferably with each other in a manner which reflects the relative levels at which they occur in natural sources, such as palm kernel oil, milk fat, and coconut oil.

The invention also concerns fat compositions which assist individuals in limiting total serum triglycerides and/or serum cholesterol and especially LDL and/or VLDL, and/or limiting the LDL/HDL cholesterol ratio. These fat compositions can be used in the preparation of foods, as part of prepared foods, and/or as part of a diet.

B. Clinical/Nutritional Studies

Obstacles in carrying out dietary experiments include the requirement for substantial amounts of synthetic dietary fats that contain specific fatty acids integrated into the fat molecule at specific positions, as well as stringent control over the subjects' intake of dietary fats. Nevertheless, in one such study, Sanders et al. (Am J Clin Nutr 2003; 77:777-782) provided two similar meals to 17 healthy adult males (meals at least 1 week apart) containing 50 g of fat consisting of either unrandomized (normal) cocoa butter (abbreviated N-cbutter) or randomized (interesterified) cocoa butter (abbreviated IE-cbutter). These two fats were produced from a single batch of cocoa butter, therefore providing the same fatty acid composition but different structural isomers exhibiting different melting points (35° C. for N- and 50° C. for IE-cbutter). While almost all the palmitic and stearic saturated fatty acids in N-cbutter are located at the sn-1 and sn-3 positions, the interesterification process randomized the locations of fatty acids such that 22% of the resulting triglyceride molecules contained palmitic acid (10%) and stearic acid (12%) at the sn-2 position, thereby increasing the melting point of the fat. This nutritional study compared only the short term changes (3 and 6 hour postprandial) in the plasma levels of lipoproteins and fats. Remarkably, in the 6 hour period following each meal there were no measurable changes in TC and HDL cholesterol levels, but within 3 hours following the meals the increments in plasma palmitic, stearic and oleic acids (mmol/L) were as much as three-fold greater for N-cbutter than for IE-cbutter. This observation suggests that enzymatic digestion and absorption work much more efficiently on natural cocoa butter than interesterified cocoa butter with its higher melting point that is significantly above body temperature. The study also suggests that meaningful dietary-related changes in TC and HDL cholesterol levels cannot be expected after single meals. Indeed, four week dietary regimens are typically recommended for establishing steady state lipoprotein levels in the plasma.

In another nutritional study examining the lipoprotein response to a saturated fatty acid located at different positions in the triglyceride molecule, Nelson et al. (Am J Clin Nutr 1999; 70:62-69) studied full term infants that were fed formula from birth to 120 days, where the formula contained 25-27% palmitic acid (16:0) in which either 6% of the 16:0 (standard fat formula) or 39% of the 16:0 (synthesized fat formula) was esterified at the sn-2 glyceryl carbon. The standard fat formula was made from a blend of natural fats including palm olein, soybean, sunflower and coconut whereas the synthesized, interesterified fat formula (having a fatty acid composition nearly identical to the standard fat) was termed "Betapol-2" (manufactured by Loders Croklaan, Inc., The Netherlands). Betapol-2 was made from interesterified palm oil in which a considerable portion of the 16:0 had been moved to the sn-2 glyceryl carbon. Other infants were breast-fed, in which the breast milk contained 23% 16:0 of which 81% by weight was naturally esterified at the sn-2 position. Blood samples were obtained at 30 and 120 days, and plasma lipoproteins fractionated and assayed. The triacylglycerol-rich lipoproteins/chylomicrons were fractionated by ultracentrifugation and the lipid again assayed for percentage of 16:0 in the sn-2 position of the triglyceride from natural fat-fed, synthesized fat-fed and breast milk-fed infants. Accordingly, from the blood samples, 8.3%, 15.8% and 28.0% of the 16:0 was recovered in the sn-2 position for natural fat formula, interesterified fat formula and breast milk respectively. The authors suggest that about 50% of the original dietary 16:0 fatty acid located at the sn-2 position is conserved through the process of sn-1, sn-3 pancreatic lipase hydrolysis, intestinal absorption of the sn-2 monoglyceride and triglyceride reassembly. More interestingly, plasma cholesterol, triglycerides, fatty acids, as well as apoA-1 and apo B were measured. Infants fed the interesterified Betapol-2 showed a significantly poorer lipoprotein profile with lower plasma HDL cholesterol and apo A-1 as well as higher apo B levels associated with LDL cholesterol, while infants fed the natural fat formula showed similar total cholesterol levels but beneficially higher HDL levels after 120 days (1.6 vs. 1.2 mmo/L) and higher apo A-1 levels (127 vs. 100 mg/L). The data raise potential concerns over the use of interesterified fats for adults, as compared with most natural saturated fats where the sn-2 fatty acid is typically unsaturated.

An extensive current review by Karupaiah et al. (Nutrition and Metabolism; 2007, 4:16, entitled "Effects of stereospecific positioning of fatty acids in triacylglycerol structures in native and randomized fats: a review of their nutritional implications" discusses a large body of research relating to nutrition and the modulation of lipoprotein metabolism resulting from alterations in the positioning of fatty acids in triglycerides, and is relevant in understanding the context of the present invention. It is incorporated herein by reference in its entirety.

Applicant has found a small number of animal and human nutritional studies that have investigated changes in plasma HDL and LDL cholesterol levels when dietary fats are provided that contain at least a portion of the myristic acid (14:0) at the sn-2 glyceryl carbon of the triglyceride molecule. For example, Temme et al. (1. Lipid Res. 1997; 38:1746-1754) describe a human clinical study with 60 subjects consuming test fats (40% of the dietary energy) for 6 weeks following a run-in period. During this run-in, the subjects consumed a diet enriched with a high oleic acid margarine containing 24% saturated fat (essentially free of myristate), 70% oleic acid and 6% linoleic acid. Duling the study, 63% of the dietary fat (25% of energy) was replaced by either the high oleic margarine or a synthetic fat made by interesterifying 34% palm stearin, 17% high oleic sunflower oil, 9% sunflower oil and 40% tiimyiistin to provide a fat containing 64% saturated fatty acids, 26% monounsaturates (oleic acid) and only 9% polyunsaturates (linoleic acid). Accordingly, the myristic acid accounted for 40%×25% energy=10% energy, while the sn-2 myristic acid statistically accounted for 113 or 3.3% energy or 113×40%× 63%=8% of the dietary fat. With 34% palm stearin present along with the 40% trimyristin in the interesterification mixture, a substantial proportion of the sn-2 fatty acids were palmitic acid along with myristic acid. Subjects' lipids and lipoprotein levels were measured, and showed an average net increase in TC (10.6%), HDL (8.6%) and LDL (14.7%) cholesterol. Unfortunately, both the LDL/TC cholesterol ratio and the LDL/HDL ratio increased; the former increased from 0.608 to 0.622 while the latter increased from 2.06 to 2.18 with the interesterified margarine, indicating once again that insertion of excessive SFA, and especially 16:0, at the triglyceride sn-2location is detrimental.

In a separate human study by Dabadie et al. (J. Nutr. Biochem. 2005; 16(6): 375-382)25 healthy monks were fed two diets for 5 weeks each respectively providing 30% and 34% of the calories from fat, in which 8% and 11% of these calories came from saturated fatty acids with 0.6% and 1.2% coming from myristic acid representing 2.5% and 3.5% by weight of the fat. PUPAs (as linoleic acid) accounted for 6.3% of the calories representing approximately 20% by weight of the fat for both diets. While no increase in HDL was reported, other beneficial effects were noted including a decrease in TC, LDL cholesterol and triglycerides, and a beneficial increase in the apo A-1/apo B ratio.

In another human study by Dabadie et al. (Br. J. Nutr. 2006; 96(2): 283-289) 29 healthy monks were fed two diets (33% and 36% of the dietary calories from fat) for 3 months in which myristic acid provided 1.2% and 1.8% of calories, alpha-linolenic acid provided 0.9%, and linoleic acid provided 4.5% of calories (approximately 14% by weight of the dietary fat). In the baseline diet, myristic acid provided 1.2% of calories, alpha-linolenic acid provided 0.4% of calories, and linoleic acid provided 5.5% of calories. Much of the myristic and alpha-linolenic acids were reported to be in the sn-2 triglyceride position. Diet 1 (with 3.7% by weight myristic acid) produced a small decrease in TC, LDL-C, HDL-C, TG and the TC/HDL-C ratio, while diet 2 (with 4.7% by weight myristic acid) produced no decrease in TC or LDL-C, but a small decrease in TG and the TC/HDL-C ratio, and a modest increase (6%) in HDL-C.

Both of the above studies by Dabadie et al. employed milkfat as the source of myristic acid and palmitic acid. In the first study the weight ratio of saturated fat:monounsaturated fat:polyunsaturated fat (abbreviated S:M:P) in the test fats was maintained at approximately 30%:45%:25%, and in the second study approximately 34%:41%:25% with linoleic acid (18:2) representing approximately 15%-20% of the fat. Unfortunately the 2%-5% by weight levels of myristic acid in these dietary fats are small when compared to the 12%-17% by weight palmitic acid in these same fats, in which the palmitic acid, like the myristic acid, is preferentially located at the sn-2 position in the triglycerides. Accordingly, it is not possible to interpret what lipoprotein changes measured were being caused by which of the fatty acids located at any of the sn-1,2,3 positions.

Similarly, in a hamster study by Loison et al. (Br. J. Nutr. 2002; 87:199-210), as much as 2.4% of the total dietary energy for the rodents was provided by myristic acid from milkfat in which much of the myristic acid would have been located in the triglyceride sn-2 position, and/or lard with palmitic and stearic acids. As the investigators increased the level of myristic acid stepwise from 2% to 4% to 6.5% and to 8.5% of the dietary fat, the levels of monounsaturated fatty acids (as oleic acid) and polyunsaturates (predominantly as linoleic acid) were maintained approximately constant at 40-45% and 9-10% by weight of the fat, respectively. Only the levels of saturated fatty acids varied appreciably where, as the level of myristic acid was increased stepwise from 2% to 8.5% by weight, the level of stearic acid decreased from 14% to approximately 6% by weight. In this hamster study, the authors demonstrated substantial increases in both the HDL cholesterol levels and the ratios of HDL to non-HDL cholesterol when myristic acid was partially replacing stearic and palmitic acids. Interestingly, the levels of the non-HDL cholesterol (representing LDL-C+VLDL-C) remained relatively constant as the dietary level of myristic acid level was increased. Unfortunately, no consideration of specific fatty acid distribution on sn-2 or sn-1,3 positions was presented.

While the above results are interesting, the fatty acid compositions provided by Loison et al. cannot be used for constructing the presently invented fat compositions for several reasons. The dietary fats of Loison et al. contain a variety of other saturated fatty acids (including saturated fatty acids located at the sn-2 position) besides myristic acid, including palmitic and lauric acids, at levels that are significantly higher than myristic acid, and the investigators did not investigate the degree to which these impacted the plasma cholesterol profile. Also, their fats incorporated milkfat and lard, two animal fats containing substantial levels of cholesterol that would have negatively impacted the plasma cholesterol profile. Furthermore, the investigators failed to consider adjusting the level of polyunsaturated fatty acids, for example, while maintaining a constant level of myristate or of total saturated fatty acids. Applicant believes that testing these important variables would have significantly affected their resulting lipoprotein profiles.

As discussed above, a number of studies suggest that sn-2 saturated fatty acids may undesirably alter the level of cholesterol-containing lipoproteins including LDL, VLDL and HDL cholesterol. However, it is not clear from these studies whether only the sn-2 SPA level in a dietary fat is critical, whether sn-2 laurate, myristate, palmitate, and stearate differ in their effects, and what role other saturated, monounsaturated and polyunsaturated fatty acids play in altering the HDL-C level and/or the LDL-C/HDL-C ratio. For example, in a somewhat different system, Sundram et al. in U.S. Pat. No. 5,578,334, U.S. Pat. No. 5,843,497, U.S. Pat. No. 6,630,192 and U.S. Pat. No. 7,229,653 (each of which is incorporated herein by reference in its entirety) showed that linoleic acid (18:2)-containing fat could be added to a saturated fat (palm oil) that contained high levels of palmitic acid located in the sn-1 and sn-3 positions of the triglyceride molecules to beneficially decrease LDL-C. At the same time, the palm oil-related increase in HDL-C would persist if the level of linoleic acid was not excessive, i.e., if it remained within the range of 15% to 40% by weight of the dietary fatty acids while the saturated fatty acids remained within the range of 20% to 40%. However, the above-cited patents of Sundram et al. do not suggest replacing palmitic acid in any of their compositions with myristic acid and/or lauric acid. Those patents also do not consider saturated or unsaturated fatty acids at any stereoisomer position including the sn-2 position, and do not suggest or predict what would happen if their cholesterol-free diets with substantial unsaturated fatty acids (typically sn-2) in palm oil and saturated fatty acids (typically provided as sn-1 and sn-3 palmitic acid) are replaced by fats having different proportions of fatty acids at the respective positions or by fats having altered amounts of sn-2 myristic acid and/or sn-2 lauric acid and/or sn-2 palmitic acid from interesterified fats.

Notwithstanding recent lipoprotein research involving myristic acid, Applicant has discovered an extensive body of much earlier clinical data published in 1970 by McGandy and Hegsted (Am J Clin Nutr, 23 (10), 1288-1298, 1970) before the importance of HDL cholesterol was recognized and measured. Within the context of the present invention, Applicant has reanalyzed these data using an equation that allows the calculation of VLDL cholesterol, then HDL cholesterol and the ratio of LDL/HDL cholesterol. Surprising and unanticipated results beyond those originally described and understood by McGandy et al. and beyond the subsequent understanding by others skilled in the field have emerged from the recalculation of their data, leading to a better understanding of the role of sn-2 saturated fatty acids and the role of other dietary fatty acids in regulating the HDL cholesterol level and the ratio of HDL to LDL cholesterol.

C. Saturated Fatty Acid Selection and Triglyceride Location

As taught by Khosla and Hayes (Biochem. Biophys. Acta, 1083: 46-50, 1991) and by Sundram et al. (see above), among the various saturated fatty acids present in single fats and fat blends that include palm oil, coconut oil and/or palm kernel oil, it is palmitic acid that has been preferred over lauric and myristic acid (see, for example, claims 11 and 12 in U.S. Pat. No. 7,229,653) for providing a favorable human plasma lipoprotein profile. In fact, palmitic acid is present at a level of over 40% by weight in palm oil, and the selection of natural fats and oils according to the teaching of Sundram et al. to increase plasma HDL and the HDL/LDL ratio does not suggest placing myristic acid (14:0) and/or lauric acid (12:0) at the sn-2 or any other position in triglyceride molecules, or that inclusion of substantial amounts of dietary lauric and/or myristic acid at any of the sn-1, 2, or 3 positions (preferably at the expense of palmitic acid and/or stearic acid) can provide beneficial effects. With the exception of milkfat (containing about 11% myristic acid of which approximately half is located at the sn-2 position), natural fats and oils that contain substantial levels of myristic acid carry most of the myristic acid either at the sn-1 position or the sn-3 position rather than at the sn-2 position; if a modified fat such as an interesterified vegetable fat were prepared as briefly mentioned in Sundram et al., those patents make no suggestion to interesterify a specific fat or fats according to any particular procedure that would place myristic acid or lauric acid or an unsaturated fatty acid such as linoleic acid or oleic acid at any particular sn-position of triglyceride molecules.

For a human dietary fat, it is intriguing to consider the possibility that the glyceryl ester location of a saturated or an unsaturated fatty acid among the sn-1, sn-2 and sn-3 positions within the triglyceride molecule may affect the HDL and LDL levels in different ways and to different extents, with differing health consequences. It is also intriguing to consider the possibility that substituting one saturated fatty acid for another saturated fatty acid of differing carbon chain length (such as C14 myristate for C16 palmitate) or for an unsaturated fatty acid at any one of the three glyceryl ester locations may also affect HDL and/or LDL levels in different ways and to different extents. There have been a number of research studies in which a dietary fat rich in one saturated fatty acid has been replaced by a dietary fat rich in another saturated fatty acid (e.g., replacing coconut fat rich in lauric and myristic acids by palm oil rich in palmitic acid).

However, in the context of the present invention, there have been only a small number of human dietary studies in which HDL and LDL cholesterol levels have been monitored, comparing two (or more) similar dietary fat compositions in which a defined level of one saturated fatty acid with a defined triglyceride structure is replaced by a second saturated fatty acid with a similar triglyceride structure. For example, a dietary study that compares the lipoprotein profile of people consuming natural palm oil and then interesterified palm oil would be comparing diets containing the same fatty acids in differing triglyceride structures. Thus, oleic acid (18:1) that predominates at the sn-2 position in natural palm oil would be partially displaced during interesterification by palmitic acid that originally predominates at the sn-1 and sn-3 positions in natural palm oil.

However, in 1970 McGandy and Hegsted (Am J Clin Nutr, 23 (10), 1288-1298, 1970) published an elegant clinical study with 19 human subjects who were followed for 1.5 years, in which normal dietary fats were replaced by semisynthetic triglycerides providing 38% of the total daily calories. Each fat-containing diet was fed to subjects for a 4 week period in a random sequence of 30 dietary fat formulations. These semisynthetic fats were produced by interesterifying 25% by weight of individual saturated fatty acids (in the form of a series of trisaturated triglycerides C12 through C18) with 75% by weight natural vegetable oils low in saturated fatty acids (either olive or safflower oil).

In some other fat-containing diets, 60% by weight C10 saturated fatty acid (as trisaturated C10 medium chain triglycerides, aka, "MCT oil") was first interesterified with 40% by weight of the longer chain saturated fatty acids (as trisaturated triglycerides C14 through C18) to form "60-40 interesterified C10-SFA" products. Subsequently, either 50% or 80% by weight of these "60-40 interesterified C10-SFA" products were blended with the balance (i.e., either 50% or 20% by weight) of vegetable oil (either olive or safflower oil).

Serum samples were obtained from the subjects on days 24 and 28 for assay of total cholesterol (abbreviated TC), beta-lipoprotein cholesterol, lipid phosphorous, and triglyceride levels (abbreviated TO). For each subject and each assay, an average value (based upon two samples) was calculated. For each subject, changes in these average values were calculated for each dietary fat, and then mean changes from the baseline "Average American Diet" (A.A. Diet) was calculated for the whole group of subjects.

At the time of the 1970 publication by McGandy et al., while beta-lipoprotein was understood as "bad" cholesterol (now known as LDL cholesterol), the concept of HDL as "good" cholesterol was unknown and only elucidated in 1974 by Mahley et al. (Circ. Res. 35:713-721, 1974). The estimation of VLDL cholesterol from the Friedwald equation described in 1972 was also unknown at the time. Applicant is unaware of any attempts to reanalyze the data of McGandy et al. However, based upon the hunch that these data held valuable but undetected information, Applicant calculated the values of VLDL and HDL cholesterol and the LDL/HDL ratios for all dietary groups of subjects using these exceptionally controlled diets and the original data tables of McGandy et al. The calculations are based upon the following equation:

HDL-C=TC-(LDL-C+VLDL-C) where VLDL=TG/5
(Friedwald estimate)

The new data estimates derived from McGandy et al. are provided in Tables 1 and 2. These data include VLDL-C, LDL-C, HDL-C and LDL/HDL cholesterol ratios. Using this information together with knowledge of lipoprotein metabolism from other sources, it was discovered that novel dietary fats can be assembled that are more effective than those fats described by McGandy et al. in beneficially increasing or at least maintaining plasma HDL-C while decreasing the LDL-C/HDL-C ratio. It was also discovered that these novel fats are more effective than those previously described in Sundram et al. in U.S. Pat. No. 5,578,334, U.S. Pat. No. 5,843,497 and U.S. Pat. No. 6,630,192.

The Key to Tables 1 and 2 is as follows:

S:M:P represents the relative proportions of the total dietary energy (in kilocalories, with 38% of the energy provided by fat-abbreviated 38% en), provided by the different categories of fatty acids, saturates (S), monounsaturated (M) and polyunsaturates (P).

PIS represents the weight ratio of polyunsaturated to saturated fatty acids provided in the dietary fat; TC total cholesterol; LDL-C low density lipoprotein associated cholesterol; VLDL very low density lipoprotein associated cholesterol; HDL-C high density lipoprotein associated cholesterol; LDL-C/HDL-C represents the weight ratio of LDL-C to HDL-C.

MCT (10:0) refers to a medium chain triglyceride carrying three saturated fatty acids, each ten carbons in length.

Interesterified MCT+14 (60:40) refers to a fat made by interesterifying 60 parts by weight MCT(10:0) and 40 parts myristic acid (14:0). Similarly Interesterified MCT+16 and MCT+18 refer to the use of palmitic and stearic acids in place of myristic acid.

Interesterified Olive+12 (75:25) refers to a fat made by interesterifying 75 parts by weight olive oil and 25 parts lauric acid (12:0). Similarly, Interesterified Olive+14 (75:25) refers to a fat made by interesterifying 75 parts by weight olive oil and 25 parts myristic acid (14:0). Similarly, Interesterified Safflower+12 (75:25) refers to a fat made by interesterifying 75 parts by weight safflower oil and 25 parts lauric acid (12:0).

Blends (MCT+14): Safflower (80:20) refers to a fat blend made by mixing 80% by weight of the interesterified MCT+14 product described above, with 20% by weight safflower oil.

By analogy, Blends (MCT+16): Olive (50:50) refers to a fat blend made by mixing 50% by weight of the interesterified MCT+16 product described above, with 50% by weight olive oil.

Results from Table 1 and Table 2.

In the uppermost panel of Table 1 it is apparent that as the PIS ratio for edible dietary fats increased, the level of HDL increased and the ratio of LDL to HDL cholesterol decreased for these 19 subjects consuming 38% of their calories from these fats. This lipoprotein improvement is not surprising, considering safflower oil compared to butter.

In the second panel of Table 1, it is apparent that 14:0 and 16:0 fatty acids rather than 18:0, when interesterified with MCT (10:0) produce healthier interesterified fat products based upon the higher HDL and lower LDL/HDL ratios for these subjects. The 14:0 interesterified fat is also healthier than the original 100% MCT triglyceride based on these same criteria. Since interestification of MCT with tri14:0 seemed to improve HDL, it suggests that inserting 14:0 into a tri10:0 molecule was an improvement, and that 14:0 may benefit HDL levels. Also, since sn-1 and sn-3 fatty acids are cleaved during digestion, it appears likely that the remaining sn-2 monoglyceride with its 14:0 is healthier than the sn-2 monoglyceride containing 10:0. This result only became apparent with the calculation of HDL herein.

The third panel of Table 1 presents results in which the dietary fat is 75% by weight olive oil interesterified with 25% by weight of various saturated fatty acids ranging from 12:0 to 18:0. Although Applicant believes that the proportion of polyunsaturated fatty acids (9% by weight) in the dietary fat is inadequate for effectively lowering TC and LDL-C in the context of these particular fat combinations, it is interesting that the HDL-C level was highest for the 14:0 product, and the LDL/HDL ratio was lowest. This result again suggests that myristic acid has the greatest potential in formulating a dietary fat that can provide maximum levels of HDL-C and the best ratio of good to bad cholesterol, and that inclusion of some sn-2 myristic acid (rather than palmitic acid or stearic acid) may be beneficial.

The fourth panel results in Table 1 are much like the third panel except that 75% by weight safflower oil containing a large proportion of linoleic acid (68% by weight) was substituted for 75% olive oil in the interesterification reaction to produce the dietary fat that contained approximately 50% polyunsaturated fatty acids. As a result, most of the absolute values of LDL-C and HDL-C are lower than the corresponding values with olive oil because high levels of linoleic acid can depress both LDL-C and HDL-C levels. The LDL-C/HDL-C ratios are also somewhat compromised (undesirably higher than those with olive oil) suggesting that the 50% level of linoleic acid in the interesterified products is excessive. This compares with the 9% level with olive oil (see above). From these data it is apparent that the level of linoleic acid in a dietary fat that will maximize HDL-C while minimizing the ratio of LDL-C/HDL-C lies somewhere between 10% and 50%, and probably closer to 15%-20% by weight of the dietary fat for the described fat combinations. The unusually low LDL-C level for the interesterified 18:0-safflower oil product (129 mg/dL) is also remarkable. This suggests an atypical response associated with high 18:0 interesterification that awaits further investigation.

The data presented in Table 2 are more difficult to interpret. Panel 1 repeats the data provided in Table 1 to provide a baseline cholesterol and lipoprotein response of subjects to interesterified trisaturated triglycerides [e.g., MCT+14 (60:40), representing 60 parts of 10:0 interesterified with 40 parts of 14:0]. Panels 2 and 3 provide the corresponding responses of subjects consuming these same interesterified trisaturates but blended either 80:20 or 50:50 with safflower oil (68% 18:2linoleic acid) in Panel2, and olive oil in Panel3 (olive oil: 11% 18:2linoleic acid+70% monounsaturated oleic acid).

Comparing data in Panel 2 line by line with that in Panel 1, it is clear that the IE incorporation of polyunsaturated vegetable oil to a trisaturated fat-rich diet decreases LDL-C and VLDL-C while increasing HDL-C. Consequently, the resulting LDL/HDL cholesterol ratios decreased.

It is difficult to see a comparable pattern when similarly comparing the data in Panel3 with Panel 1. It is evident that adding an oleic acid-rich vegetable oil (olive) to a diet rich in trisaturated fat does not offset the cholesterolemic properties or improve the lipoprotein profile of the diet to the same degree as a polyunsaturated vegetable oil (safflower) i.e., MONOS do not work well by themselves against SATS. On the other hand, the 50:50 blends with olive oil show a substantial improvement in lipoprotein profile over the blends containing only 20% olive oil. Applicant notes that the 50:50 blends contain 6% linoleic acid while the 80:20 blends contain only 2%. It is likely that the higher 18:2 level is substantially more effective in reducing LDL and increasing HDL cholesterol, implying that a critical mass of linoleic acid is necessary to make any calculated lipoprotein improvement a reality.

In summary, the data in Tables 1 and 2 derived from McGandy et al. show both original and newly calculated lipoprotein levels in human subjects, and show changes in these levels for subjects whose diets include changes from one dietary fat to another, from highly saturated MCTs, to MONOS, to highly unsaturated POLYS (by moving from one line of data to the next in Tables 1 and 2). Unlike any of the other prior art studies, these data are particularly valuable because they show lipoprotein changes brought about by a change from one saturated fatty acid to another in otherwise identical dietary fats, where an unsaturated fatty acid is also being esterified into the sn-2 position of tri-SFA triglyceride molecules. McGandy et al. thought they were exclusively testing the simple addition of specific SFAs into set amounts of SFA, MUFA or PUFA, and did not anticipate that their study design would also encompass the issue of triglyceride molecular structure. By focusing on their unique modulation of individual saturated fatty acids, it is possible to conclude that trimyristin interrupted by intesterification with olive oil was the most effective saturated fatty acid in the described tests for beneficially and maximally increasing HDL-C in most situations and/or that the residual sn-2 myristic acid was either beneficial or was most readily compensated for by UFAs (primarily oleic acid and linoleic acid), especially sn-2 UFAs including those resulting from the interesterification reaction. At the same time, Applicant finds that myristic acid-rich fat significantly reduces LDL-C, depending upon the reference diet that is being considered. For example, in panel 3 of Table 1, the LDL-C value of 149 mg/dL for the interesterified dietary fat "Olive+14" is identical to that for simple olive oil, but when compared to the other interesterified fats in the same group (that differ only in the saturated fatty acid chain length) was beneficially and significantly lower even as the associated HDL-C was remarkably higher.

As discussed above, the newly calculated lipoprotein data after McGandy et al. in conjunction with other data lead to distinctively new conclusions, including that the most benefit is achieved when two processes occur simultaneously: 1) using 12:0+14:0 to replace 16:0+18:0 lowers the fat melt-point, particularly when there is sufficient UFA in the fat [either by interesterification (IE) or by blending with an UFA oil] or 2) adding a critical mass of UFA favors/improves phospholipid formation which enhances metabolism of the more rapidly melting/digested fat. This is demonstrated by IE experiments in which IE is used to insert MUFA and PUPA at sn-2 triglyceride locations replacing sn-2-SFAs. The resulting changes favor both phospholipid formation and a lower meltpoint for the fat, allowing an improved metabolism to occur. Conversely, when a natural TG (especially a high palmitic acid-containing oil like palm oil) is interesterified, and a substantial amount of SFA is placed in the sn-2 position where UFA once existed, the lipoprotein metabolism becomes impaired. Accordingly, it appears that a phospholipid derived from a sn-2-SFA monoglyceride has the inherent ability to raise plasma cholesterol, especially LDL. Further, the re-analysis of the McGandy et al. data reveals that saturated fatty acids, especially palmitic acid (16:0), in the sn-2 position of triglyceride molecules (present in milkfat), undesirably reduce the HDL-C level and increase the LDL-C/HDL-C ratio; similarly stearic acid inserted by IE as demonstrated by Sundram et al 2007 produces similar results. This leads to the conclusion that milkfat, in which nearly all the sn-2 positions are occupied by SFA, is the wrong choice for a "healthy fat" principally because it lacks sufficient PUPA, especially linoleic acid, at the sn-2 position. Applicant concludes that for a specific dietary fat to be effective in improving human lipoprotein profiles and/or glucose metabolism over a broad population, the fat should contain adequate sn-2 UFA, especially sn-2linoleic acid.

Moreover, milkfat is also problematic because it contains a substantial level of cholesterol (at least 0.25% by weight) that boosts plasma LDL-C while diminishing HDL-C. Stripping milkfat of its cholesterol would be helpful in this regard, but that would not reduce the level of palmitic acid, including sn-2 palmitic acid. On the other hand, considering the saturated commercial vegetable fats, none of these contain appreciable amounts of linoleic acid in the sn-2 position. Those that contain significant levels of myristic acid (coconut oil and palm kernel oil) also contain lauric acid at levels nearly three-fold greater than myristic, and neither contain adequate linoleic acid. Therefore, in this case, isomeric randomization by same fat-interesterification is not a good option either.

Considering the limited options with currently available technology, Applicant has concluded that interesterification that combines myristic acid and/or trimyristin on the one hand, and either oleic acid/triolein or at least one oleic acid-rich vegetable oil (e.g., varieties of canola, soybean or sunflower oil with medium to high levels of oleic acid preferably containing adequate linoleic acid) on the other hand, is a viable option for producing sn-2 UFA and myristate-containing triglycerides.

TABLE 1

Cholesterol Response in Humans to Fats of Different Saturation

| Fat | S:M:P (%) (38% en) | P/S | TC mg/dl | LDL-C mg/dl | VLDL-C mg/dl | HDL-C Mg/dl | LDL-C/ HDL-C |
|---|---|---|---|---|---|---|---|
| Butter | 24:13:02 | 0.08 | 254 | 196 | 16 | 43 | 4.6 |
| A.A. Diet | 19:13:06 | 0.32 | 221 | 154 | 16 | 51 | 3.0 |
| Olive | 7:27:04 | 0.57 | 217 | 149 | 13 | 55 | 2.7 |
| Safflower | 5:07:26 | 5.2 | 178 | 116 | 12 | 50 | 2.3 |
| MCT (10:0) | 34:03:01 | 0.03 | 214 | 148 | 24 | 41 | 3.6 |
| Interesterified | | | | | | | |
| MCT + 14 (60:40) | 34:03:01 | 0.03 | 253 | 181 | 18 | 54 | 3.4 |
| MCT + 16 (60:40) | 34:03:01 | 0.03 | 267 | 193 | 19 | 55 | 3.5 |
| MCT + 18 (60:40) | 34:03:01 | 0.03 | 226 | 162 | 19 | 45 | 3.6 |
| Olive | 7:27:04 | 0.57 | 217 | 149 | 13 | 55 | 2.7 |
| Interesterified | | | | | | | |
| Olive + 12 (75:25) | 15:19:04 | 0.24 | 230 | 157 | 12 | 61 | 2.6 |
| Olive + 14 (75:25) | 15:20:04 | 0.25 | 234 | 150 | 17 | 67 | 2.2 |
| Olive + 16 (75:25) | 14:20:04 | 0.26 | 233 | 165 | 13 | 55 | 3 |
| Olive + 18 (75:25) | 14:21:04 | 0.26 | 233 | 160 | 16 | 58 | 2.8 |
| Safflower | 5:07:26 | 5.2 | 178 | 116 | 12 | 50 | 2.3 |
| Interesterified | | | | | | | |
| Safflower + 12 (75:25) | 13:06:19 | 1.5 | 192 | 135 | 11 | 46 | 2.9 |
| Safflower + 14 (75:25) | 13:06:19 | 1.5 | 201 | 132 | 16 | 53 | 2.5 |
| Safflower + 16 (75:25) | 13:06:19 | 1.5 | 206 | 149 | 11 | 46 | 3.3 |
| Safflower + 18 (75:25) | 12:07:19 | 1.5 | 202 | 130 | 15 | 57 | 2.3 |

TABLE 2

Cholesterol Response in Humans to Fats of Different Saturation

| Fat | S:M:P (%) (38% en) | P/S | TC mg/dl | LDL-C mg/dl | VLDL-C mg/dl | HDL-C Mg/dl | LDL-C/ HDL-C |
|---|---|---|---|---|---|---|---|
| Interesterified | | | | | | | |
| MCT + 14 (60:40) | 34:03:01 | 0.03 | 253 | 181 | 18 | 54 | 3.4 |
| MCT + 16 (60:40) | 34:03:01 | 0.03 | 267 | 193 | 19 | 56 | 3.5 |
| MCT + 18 (60:40) | 34:03:01 | 0.03 | 226 | 162 | 19 | 45 | 3.6 |
| Blends | | | | | | | |
| Safflower:MCT + 14) | | | | | | | |
| (20:80) | 28:04:06 | 0.21 | 252 | 175 | 15 | 62 | 2.8 |
| (50:50) | 20:05:13 | 0.68 | 207 | 147 | 14 | 46 | 3.2 |
| Safflower:(MCT + 16) (20:80) | 28:04:06 | 0.22 | 242 | 159 | 14 | 69 | 2.3 |
| Safflower:(MCT + 18) | | | | | | | |
| (20:80) | 28:04:06 | 0.22 | 235 | 170 | 19 | 46 | 3.7 |
| (50:50) | 19:05:14 | 0.70 | 208 | 144 | 15 | 49 | 2.9 |
| Blends | | | | | | | |
| Olive:(MCT + 14) | | | | | | | |
| (20:80) | 29:08:02 | 0.06 | 252 | 186 | 15 | 51 | 3.6 |
| (50:50) | 21:15:03 | 0.13 | 234 | 159 | 15 | 60 | 2.6 |
| Olive:(MCT + 16) (20:80) | 28:08:02 | 0.06 | 242 | 168 | 15 | 59 | 2.8 |

TABLE 2-continued

Cholesterol Response in Humans to Fats of Different Saturation

| Fat | S:M:P (%) (38% en) | P/S | TC mg/dl | LDL-C mg/dl | VLDL-C mg/dl | HDL-C Mg/dl | LDL-C/ HDL-C |
|---|---|---|---|---|---|---|---|
| Olive:(MCT + 18) | | | | | | | |
| (20:80) | 28:08:02 | 0.06 | 240 | 177 | 19 | 44 | 4 |
| (50:50) | 20:15:03 | 0.13 | 227 | 147 | 15 | 65 | 2.3 |

D. Advantageous Fat Compositions

Thus, in view of the discussion above, preferably the fat composition contains substantial myristic and/or lauric acid, some of which may be in the sn-2 position, while the amount of sn-2 palmitate is minimized. The composition also includes sufficient linoleic acid to reduce LDL-C without significantly reducing HDL-C, e.g., preferably between 5 and 40%, 7 and 40%, 8 and 40%, 9 and 40%, or 10% and 40% by weight linoleic acid, between 15% and 40% by weight total saturated fatty acids, and between 30% and 65% by weight oleic acid. Oleic acid is considered an essentially "neutral" fatty acid. The ratio of myristic acid to palmitic is desirably greater than 1:1 (and/or sn-2 myristic acid to sn-2 palmitic acid is greater than 1:1). In some cases, the ratio of sn-2 myristic acid to sn-2lauric acid is also greater than 1:1. The sum of weight percentages for saturated, monounsaturated and polyunsaturated fatty acids equals 100%.

The rationale for utilizing the above triglyceride composition as a component or replacement for a significant portion of a dietary fat is as follows:
1. There is an extensive body of clinical evidence that dietary intervention with edible fats and oils that increase plasma levels of HDL cholesterol, while decreasing the LDL-C, VLDL-C levels, and the ratio of LDL-C to HDL-C all provide substantial health benefits in terms of reducing the risk of coronary heart disease and other health problems.
2. Applicant has found new evidence that intake of dietary fat providing between approximately 3% and 20% of the total fat as myristic acid (and/or lauric acid) is beneficial, in spite of variable and sometimes contradictory increases and decreases in HDL-C, LDL-C and LDL/HDL ratios (e.g., see Dabadie et al. and Temme et al.) with myristate (and laurate) relative to control diets. It is hypothesized these inconsistencies are caused by variable intake of non-myristate (and/or non-laurate) saturated fatty acids (especially palmitate) as well as variable intake of polyunsaturated fatty acids (18:2) and tri-saturated triglycerides.

Applicant has calculated HDL-C data from early 1970 clinical experiments of McGandy et al. when HDL "good" cholesterol was unknown, in which essentially all dietary saturated and unsaturated fatty acid intake was controlled. It has become evident herein, for the first time (see Tables 1 and 2 herein), that with an otherwise invariant fatty acid-containing diet, myristate/laurate in the presence of adequate UFA (and especially adequate PUPA) can more predictably boost HDL-C and reduce the LDL-C/HDL-C ratio than other saturated fatty acids, which typically degrade or diminish these lipoprotein indices. The myristic (and likely lauric) acid effect on the lipoprotein profile appears most relevant when many or most of the neighboring fatty acids in sn-2 of the triglyceride molecules are oleic acid or linoleic acid. These particular results were obtained by McGandy et al., when 75 parts olive oil were interesterified with 25 parts myristate. When compared with an olive oil-rich diet alone, the diet with semi-synthetic interesterified myristic acid-olive oil surprisingly did not alter plasma LDL-C levels (149 versus 150 mg/dL) even though it increased HDL-C from 55 to 67 mg/dL.

3. Together with the novel findings calculated from McGandy et al., Applicant re-evaluated other animal and human clinical data, and determined that trisaturated triglycerides, especially tripalmitin and to a somewhat lesser degree trimyristin, are cholesterolemic in elevating TC and LDL-C (Snook et al., Eur. J. Clin. Nutr. 1999, 53: 597-605) and should be minimized in the diet (also see Mukherjee et al. J. Atheroscler. Res. 1969, 10(1): 51-54). The waxy high melting point tristearin triglyceride molecule appears to be an exception, even potentially lowering all plasma cholesterol fractions, in part because it appears to be poorly digested.

Accordingly, it has been deduced that the stoichiometric ratios of fatty acids (including myristic acid/trimyristin) combined in interesterification reactions should be chosen to minimize the formation of trisaturated triglycerides, while also preferably providing sufficient total and/or sn-2 linoleic acid. (Also trisaturated tryglycerides are preferably minimized or at least reduced in the selections of oils for the present oil blends except when enhanced weight gain is desired) This can be accomplished for example by including a sufficient amount of oleic acid in the reaction to act as diluent molecules along with sufficient linoleic acid. It is suggested that triglycerides with either one or two saturated fatty acids (but not three) can be produced by interesterification, and are suitable for increasing myristic acid (and/or lauric acid) levels in dietary fats. Therefore, the stoichiometric ratio of oleic acid (or ratio of oleic acid plus linoleic acid) to myristic acid residues (and/or lauric acid residues) should approach 1:1, and preferably be somewhat greater than 1.011.0 to keep trimyristin (or trilauric or a trisaturated combination of myristin and lauric acid) triglyceride concentrations below 10% by weight. For example, in a 1:1 interesterification mixture of oleic (O) and myristic acid (M) residues, approximately ⅛ of the molecules are trimyristin (MMM) if the eight (sn-1-sn-2-sn-3) triglycerides are randomly constituted as OMM, MOM, MMO, MOO, OMO, OOM, OOO, and MMM.

4. The proportion of polyunsaturated fatty acids, i.e., linoleic acid, to be used in a dietary fat composition is also an important consideration. The concept of balanced fatty acids between polyunsaturated and saturated fatty acids is described by Sundram et al. in a series of U.S. patents cited above, with the proportion of linoleic acid being set between 15% and 40% by weight and the total saturates being set between 20% and 40% by weight. Considering the information herein from the re-analysis of McGandy et al. and from study results described below, it is believed that the range of linoleic acid in a dietary fat can be modestly expanded to between 5 and 40%, 6 and 40%, 7 and 40%, 8 and 40%, 9 and 40%, or 10 and 40% by weight. This is based in part upon the observation that adding less than 8% by weight linoleic acid (provided by 75% by weight olive oil) to an interesterified fat that contained 25% by weight myristic acid, substantially increased HDL-C while decreasing LDL-C, as compared to the components alone (see "olive oil" and "MCT+14" in Table 1), even though this preparation contained less sn-2 linoleic acid than is desirable and essentially no lauric acid, the presence of which is also desirable.

It is suggested that 10% to 20% linoleic acid is the preferred range of linoleic acid (but in some cases as high as 30 or 40%) for balancing between 15% and 55% (or in particular cases, 15 to 40%) by weight of total saturated fatty acids in the dietary fat. The lower levels of linoleic acid are more effective when the level of trisaturated triglycerides is also limited (e.g., significantly lower than in a fat blend which contains 20% or more coconut oil or another oil or combination of oils containing approximately the same or greater levels of trisaturated triglycerides, and the total sn-2 SATS and sn-2 palmitic acid are low. That is, a lesser amount of linoleic acid can be effective when present in a low trisaturated triglyceride environment, which is also preferably a low sn-2 SAT and/or low sn-2 palmitate environment.

Surprisingly, and contrary to conventional nutritional teaching, indefinitely higher levels of polyunsaturates are not better. That is, when the level of polyunsaturated fatty acids is increased above that level required for achieving "balance", the lipoprotein profile becomes less desirable. This is evident in Table 1 for example, comparing homologous interesterified fats all made with 25% saturated fat and either 75% olive oil (8% final linoleic acid in panel 3) or alternatively 75% safflower oil (51% final linoleic acid in panel4). It is apparent that three out of the four olive oil-containing interesterified fats provided superior lipoprotein profiles based on higher HDL-C and lower LDL-C/HDL-C ratios than those with safflower oil.

The proportion of saturated fatty acids in the dietary fat is also a matter to be considered for a balanced oil. Clearly, the level of myristic acid (and/or lauric acid as shown by additional studies) and the proportions of myristate and/or laurate residues (including in the bioactive sn-2 position of the triglyceride molecule) are important. But it is an open question as to the degree to which the overall proportion of saturated fatty acids in the diet is critical (excluding myristate and/or laurate). In the top panel of Table 1 without considering the butter diet, it is apparent that as the saturated fatty acids substantially increase (and the PIS ratio decreases 16-fold from 5.2 to 0.57 to 0.32), the lipoprotein profile is only moderately degraded. That is, the LDL-C to HDL-C ratio increases from 2.3 to 2.7 to 3.0 but the HDL-C levels remain substantially constant (50-55 mg/dL). On the other hand, with the butter diet, the HDL-C value drops dramatically (to 41 mg/dL) and LDL-C increases dramatically (to approximately 200 mg/dL from 150 mg/dL), believed to be in large part because PUPA becomes limiting and also potentially due to the substantial amount of palmitate in the sn-2 position or of total sn-2 SPA.

These data also suggest that dietary cholesterol may be a substantial problem when fed with substantial saturated fatty acids in degrading a healthy lipoprotein profile. However, because saturated animal fats in meats and butter are widely consumed and contain substantial levels of cholesterol, and because cholesterol-free saturated vegetable fats (e.g., palm oil) are less common in the American diet, there is a common misconception that all saturated fat is harmful. In fact, in light of the HDL-C and LDL-C/HDL-C data presented in Table 1, it is suggested that the range of total saturated fatty acids in a dietary fat can safely vary between 15% and 40% or even 50% by weight in the substantial absence of dietary cholesterol and in the presence of adequate UFA, especially PUPA.

5. The proportion of monounsaturated fatty acids, i.e., MUFA or oleic acid, in the dietary fat represents the remaining content of primarily neutral fatty acids after considering the more biologically active polyunsaturated and saturated fatty acids. As explained above for interesterification, if the proportion of linoleic acid is added to oleic acid, then the calculated ratio of (oleic acid+linoleic acid) to total saturated fatty acids in the interesterification reaction should approach 1.0:1.0, and preferably exceed 1:1, so as to minimize the presence of trisaturated triglycerides. Accordingly, the dietary fat should preferably contain between 5% and 65% by weight oleic acid depending upon the level of saturated fatty acids in the reaction. In most cases, the level of oleic acid will be in a range of about 10% to 65%, 15% to 65%, 20% to 65%, 25% to 65%, or 30% to 65%.

6. The cholesterol concentration in a dietary fat should be minimized to avoid degrading the lipoprotein profile (see problematic butter, panel 1, Table 1). It is preferable that dietary cholesterol not exceed 2 mg per serving as this is the maximum permissible cholesterol level allowed under U.S. FDA regulations for a product to be labeled as cholesterol-free. For a 14 g serving of table spread, this level represents 0.014% by weight cholesterol. By comparison, a low cholesterol food may contain up to 20 mg (0.14% by weight) cholesterol per serving, while butter typically contains 0.22% by weight cholesterol (16-fold higher than a cholesterol-free product). In advantageous cases, the fat composition contains no more than 0.014, 0.010, 0.007, 0.005, 0.003, 0.002, or 0.001% by weight cholesterol.

E. Interesterification Ratios

While Applicants prefer to avoid use of interesterified fats, such fats may still be used in the present invention, and examples of recipes are provided for making interesterified fats that not only contain myristic acid and/or lauric acid (which may include sn-2 myristic acid and/or sn-2 lauric acid), but also provide other fatty acids that will improve the human lipoprotein profile. Considerations in such recipes not only include the choice of ingredients but also their concentrations that affect the yield of various triglyceride products and the physical properties of the resulting fat such as melting point and crystallization tendency, e.g. beta prime versus beta crystals). Since interesterification involves a relatively random rearrangement process for fatty acids in the triglyceride molecule, the practical percentage yield of sn-2 myristate (and/or sn-2 laurate), based upon input weight of two principal ingredients can vary over approximately a two-fold range. Thus, a 3:1 mixture of trimyristate to trioleate will obviously produce a much greater yield (% by weight) of triglycerides containing an sn-2 myristate than a 1:3 mixture of the same materials. However, the melting point of triglycerides containing a substantial proportion of trimyristate rather than dimyristate and monomyristate is undesirably elevated. Consequently, Applicant favors a stoichiometry in which one part of myristic acid and/or trimyristin is interesterified with between 1 and 3 parts of an oleic acid-rich vegetable oil (or alternatively oleic acid/triolein). McGandy et al. utilized a 75:25 or 3:1 ratio of olive oil to saturated fat in synthesizing the "olive+14" dietary fat in Table 1.

There are particular advantages in selecting other interesterification ratios, i.e., stoichiometries, in combining two or more different fats and/or fatty acids. This is illustrated herein by example, when a 1:1 molecular ratio of myristic acid to oleic acid is selected. Such a 1:1 mixture in an interesterified fat can be constituted from trimyristin triglyceride and a high oleic acid vegetable oil such as sunflower oil containing 82% by weight oleic acid currently available from Cargill Inc. (Minneapolis, Minn.). The resulting triglyceride structures produced, for example, from 12 Myristic (M) fatty acids and 12 Oleic (O) fatty acids (where the fatty acids are randomly arranged along the sn-1, sn-2 and sn-3 positions to form 8 different stereoisomer structures, 7 of which contain myristic acid) are as follows: MMM, MMO, MOM, OMM, MOO, OMO, OOM, OOO. Since two and three saturated fatty acids per molecule will produce a "hard fat," i.e., one that has a solid consistency at refrigerator temperature, this interesterification produces approximately 50% hard fat that can be very beneficial in producing margarines and solid shortenings. By contrast, the 75:25 ratio of olive oil and saturated fatty acid, e.g., myristic acid used in the interesterifications described by McGandy et al. produces myristic acid-containing triglycerides that are almost exclusively monosaturated, i.e., OOM, OMO, MOO, and these triglycerides do not function to harden vegetable oils.

The important contribution of McGandy et al. in the production and clinical study of the dietary fats including "olive+14" and "safflower+14" is recognized. However, based upon Applicant's current re-analysis of their data (and present studies), it is believed that a dietary fat should not only contain substantial myristate and/or laurate, but should also contain more (preferably at least two-fold more) myristiate than palmitate (and/or more, preferably at least two-fold more sn-2 myristate than sn-2 palmitate). This is because palmitate, especially sn-2 palmitate, appears to negatively affect (increase) the LDL-C/HDL-C ratio (see "Olive+16" and "Safflower+16"). It can also be preferable for the dietary fat to also contain more myristate than laurate (and/or more sn-2 myristate than sn-2laurate), to maximize the benefits of the present invention. Applicant also finds that for interesterified oils, the dietary fat compositions provided by McGandy et al. contain either too little linoleic acid (8% with 75:25 "olive+14") or too much linoleic acid (51% with 75:25 "safflower+14") for achieving the objectives described herein, i.e., to maximize the level of HDL-C while minimizing the LDL-C/HDL-C ratio in human plasma, as it appears that for the interesterified oil, too little sn-2 linoleate is present, and also there is essentially no laurate present.

Accordingly, for many dietary fat compositions and especially for fat compositions resulting from interesterification or incorporating interesterified oils, Applicant has increased the level of linoleic acid above 8% by weight, preferably to a level of linoleic acid between 10% and 40% by weight of the dietary fat. Likewise, Applicant finds that some of the dietary fat compositions of McGandy et al. contain too little oleic acid and too much linoleic acid (14% 18:1 with 75:25 "safflower+14") or plenty of oleic acid but too little linoleic acid (53% 18:1 with 75:25 "olive+14") for achieving an improved lipoprotein profile, or too little sn-2linoleic acid, or essentially no beneficial combination of myristic and lauric acids. For many advantageous dietary fats, a higher oleic acid level is used herein, in which the final level of oleic acid in the dietary fat composition is between 30% and 65% by weight so as to maximize the level of HDL-C while minimizing the LDL-C/HDL-C ratio in human plasma.

The studies of Dabadie et al. and Loison et al. discussed earlier are also noted, but both of these groups utilized milkfat in their studies. With milkfat providing many tri-SFA and sn-2-SFA molecules, and more sn-2 palmitic acid than sn-2 myristic acid, and also containing cholesterol, their dietary fats are not compatible with the present invention and lipoprotein profiles cannot be optimized. Similarly, the dietary fats of Temme et al. discussed earlier that involved interesterifying high levels of palm stearin, myristin, and very low levels of linoleic acid are not compatible with the requirements of the present invention because substantial levels of sn-2 palmitic acid are produced that offset the effects of any sn-2 linoleic acid or sn-2 myristic acid, making the level of linoleic acid in the dietary fat inadequate. Thus, any beneficial effect of sn-2 myristic acid in lost due to the high palmitic acid and low linoleic acid.

While the studies of McGandy et al. provide interesterified fats that are somewhat closer to the requirements of the present invention, the levels of polyunsaturated fatty acids specified by the present invention to reduce LDL cholesterol in the context of interesterified fats are not met. Furthermore, McGandy et al. does not explore what role interesterification stoichiometry plays in improving the lipoprotein profile. That is, by varying the ratio of oleic acid and linoleic acid to myristic acid and lauric acid used for interesterification, it is anticipated that the lipoprotein profile can be altered. More specifically, McGandy et al. used a fixed 1:3 ratio of trisaturated fat to olive oil (70% oleic acid) or safflower oil (68% linoleic acid) to produce interesterified triglycerides containing sn-2 saturated fatty acids (e.g., sn-2 myristate). This stoichiometry produces a predominance of triglycerides containing a single saturated fatty acid. Applicant herein substantially varies this stoichiometric ratio, e.g., upward to approximately 1:1, so as to introduce additional saturated fatty acids into the synthetic/semisynthetic dietary fat during interesterification. This has important consequences when interesterifying a trisaturated triglyceride or a simple saturated fatty acid with either a monounsaturated fatty acid-rich, or a polyunsaturated fatty acid-rich fat. This change produces interesterified triglyceride molecules containing much more disaturated triglycerides. In the case of myristic acid interesterified with a high oleate or high linoleate vegetable oil, two out of the three disaturated triglycerides (with two myristates and one oleate or linoleate) will contain the bioactive sn-2 myristate.

The interesterified dimyristate triglycerides may also serve a second function. As a hard fat, the disaturate triglycerides possess a significantly higher melting point than the monosaturated triglycerides formed by McGandy et al. (with two oleic or linoleic acids and one myristate). The melting point however, remains well below the temperature of the human mouth so that the fat has an excellent mouth feel. This is particularly applicable for making margarine spreads and shortenings for example. Thus, depending upon how the lipoprotein profile is affected by the presence of disaturates, the ratio of myristate to oleate and linoleate can be changed in the interesterification reaction.

While interesterification with trimyristin and/or tri-lauric acid can be beneficial, results indicate interesterification with tri-palmitin and/or tri-stearin is not. Studies suggest ingestion of fat compositions interesterified with tri-palmitin and/or tri-stearin results in increased LDL/HDL ratios and/or increased blood glucose levels, and may have other undesirable physiological effects. (See, e.g., Nelson & Innis, 1999, Am J Clin Nutr 7:62-69; Judd et al., 2002, Lipids 37:123-131; Sundram et al., 2007, Nur & Metab 4:3; Hayes & Pronczuk, 2010, J Am Coll Nutr 29:253 S-284S.) As a result, it is desirable in the present fat compositions for which interesterification is used to limit both the total levels of palmitin and/or stearin present in the composition, and further to limit the levels of palmitic acid and/or stearic acid introduced and used in interesterification.

F. Fat Compositions Containing Low Levels of Linoleic Acid

Additional studies with experimental fat compositions were performed with gerbils, using both natural oil blends and blends containing interesterified oils. When considering these results it is important to note that the gerbil is the most sensitive among all species, and provides the best animal model for identifying the effect of dietary fatty acids on the serum lipoprotein response (Pronczuk, A., P. Khosla, K. C. Hayes. Dietary myristic, palmitic, and linoleic acids modulate cholesterolemia in gerbils. FASEB J. 8:1191-1200, 1994.), especially for revealing the importance of linoleic acid in lowering plasma cholesterol and LDL-C. The gerbil also appears to be useful for assessing the blood glucose response to dietary fatty acids in a manner previously witnessed in humans. (Sundram K, Karupaiah T, Hayes K C. Stearic acid-rich interesterified fat and trans-rich fat raise the LDL/HDL ratio and plasma glucose relative to palm olein in humans. Nutr Metab 4:3, 2007.) In that human study, an IE fat made by interesterifying tri-18:0 with soybean oil, was the cause of elevated blood glucose and a rise in the LDL/HDL ratio after only 1 month on diet.

In accordance with the results of these studies, the invention also includes the additional discovery that in the proper balanced fat blend, levels of polyunsaturated fatty acids (especially linoleic acid) that are lower than previously believed effective can induce an advantageous LDL/HDL ratio when ingested. In particular, the lower levels of polyunsaturated fatty acids are effective in decreasing the LDL/HDL ratio in combination with suitable levels of monounsaturated fatty acids (generally oleic acid) and saturated fatty acids including sufficient but not excessive levels of myristic acid, lamie acid, or a combination of myristic acid and lauric acid. Much of the literature concerning fatty acids suggests that the greater the level of polyunsaturated fatty acids in the dietary fats, the better, because ingestion of unsaturated fatty acids, and in particular linoleic acid, is understood to decrease total cholesterol in the blood. However, consumption of dietary fats containing high levels of linoleic acid decreases both LDL and HDL, but does not lead to the most beneficial reduction of the LDL/HDL ratio. As previously described in U.S. Pat. Nos. 5,578,334; 5,843,497; 6,630,192; and 7,229,653, it was found by the present inventors that the combination of between 15% and 40% by weight linoleic acid together with appropriate levels of saturated fatty acids (especially palmitic acid, 16:0) and monounsaturated fatty acids (especially oleic acid, 18:1) is advantageous to achieve a beneficial cholesterol lipoprotein ratio.

Thus, recent experiments by the present inventors indicate that the level and proportion of polyunsaturated fatty acids as linoleic acid (18:2) in the fat portion of the mammalian diet is important in altering the plasma LDL/HDL cholesterol ratio. Very surprisingly, an unexpectedly low level of linoleic acid in the overall fat composition of the diet appears sufficient for decreasing LDL to nearly its lowest level, when fed in the presence of a substantial but not excessive level of myristic acid (14:0), lauric acid 12:0), or the combination of lauric acid (12:0) and myristic acid (14:0) fatty acids, especially when the levels of trisaturated triglycerides are low, and preferably also the levels of palmitic acid (16:0) and stearic acid (18:0) are low. At the same time, this low level of linoleic acid appears important in allowing the beneficial HDL cholesterol level to remain high when fed with a fat combination rich in 14:0, 12:0, or a 12:0+14:0 combination. These results indicate that of the 100% total of fatty acids (by weight) contained in a fat, less than 15% by weight (e.g., about 10-14.9% or even as little as about 9, 8, 7, 6, 5, 4, or 3%) of linoleic acid can be sufficient or even optimal when combined with a diet containing the appropriate levels of myristic, lauric, or lauric+myristic fatty acid combination to minimize the LDL/HDL cholesterol ratio.

As a result, even though the invention includes edible fat compositions which include 15 to 40% linoleic acid, surprisingly advantageous dietary fat compositions (and food containing such fat compositions) can be prepared such that the fat composition contains less than 15% linoleic acid (e.g., 3-5, 3-7, 3-10, 3-12, 3-14.9, 5-7, 5-10, 5-12, 5-14.9, 7-10, 7-12, 7-14.9, 8-12, 8-14.9, 9-12, 9-14.9, 10-12, 10-14.9, or 12-14.9%). Such fat compositions also contain from 15 to 50, 15 to 40, 15 to 30, 20 to 50, 20 to 45, 20 to 40, 20 to 35, or 20 to 30% by weight saturated fatty acids. Myristic acid (14:0) (and/or laude acid (12:0) preferably provide no more than 40% of the total fat by weight, more preferably no more than 35, 30, 25, or 20%, e.g., 10 to 20, 10 to 30, 10 to 40, 15 to 20, to 25, 15 to 30, 15 to 35, 15 to 40, 20 to 25, 20 to 30, 20 to 35, 20 to 40, 25 to 30, 25 to 35, or 25 to 40%. Preferably the total level of saturated fatty acids does not exceed the just stated levels. Also preferably, palmitic acid (16:0) constitutes no more than 20% of total fat, more preferably no more than 15%, and still more preferably no more than 12, 10, 9, 8, 7, 6, or 5% of the total fat. Stearic acid preferably constitutes no more than 10%, more preferably no more than 9, 8, 7, 6, 5, 4, or 3% of the fatty acids by weight. Substantially the remainder of the fatty acids in the fat composition are preferably oleic acid (18:1) and can also include minor amounts of other saturated and/or polyunsaturated fatty acids.

As discussed above, advantageously the fat composition can include triglycerides with a substantial percentage of myristic and/or lauric fatty acids, some of which may be esterified at the sn-2 position. Thus, in some cases the fat composition includes up to 10, 0, 8, 7, 6, 5, 4, 3, 2, or 1% by weight myristic acid and/or lauric acid located at the sn-2 position of the triglyceride molecule. Preferably the weight ratio of myristic acid and/or lauric acid to palmitic (and often of sn-2 myristic acid and/or lauric acid to sn-2 palmitic acid) is greater than 1:1 and the sum of weight percentages for saturated, monounsaturated and polyunsaturated fatty acids equals 100%. In certain cases, the specified level of linoleic acid is replaced with a combination of at least 2, 3, or 4 polyunsaturated fatty acids taken in any combination selected from the group consisting of linoleic acid, alpha-linolenic acid, eicosapentaenoic acid (EPA), and docosahexaenoic acid (DHA), but preferably at least 3, 4, 5, 6, 7, 8, 9, or 10% by weight is linoleic acid. Highly preferably the fat composition is substantially cholesterol-free.

Certain highly desirable fat compositions can be prepared by blending different fats having appropriate fatty acid profiles. For example, palm kernel oil can be used to provide substantial amounts of myristic and lauric acid. Advantageously, most of the triglyceride molecules in palm kernel oil are sn-2 UFA molecules, some of which have linoleate at the sn-2 position. While coconut oil can also be used, in many cases inclusion of substantial levels of coconut oil is less desirable, which is believed to be due to the greater level of trisaturated triglycerides in coconut oil as compared to palm kernel oil. Based upon 100% by weight of the fatty acids contained in a fat, palm kernel oil commonly contains about 49% lauric acid (12:0), about 17% myristic acid (14:0), about 8% palmitic acid (16:0), about 12% oleic acid (18:1), and about 2-3% linoleic acid (18:2), along with about 2-4% each of other saturated fatty acids (stearic 18:0, capric 10:0, and caprylic 8:0). Oleic acid can be provided, for example, by blending in high oleic sunflower oil such as that from Cargill Inc., Minneapolis or the high oleic soybean oil from DuPont. The Cargill high oleic sunflower oil contains approximately 82% oleic acid, 8-9% linoleic acid and 8-9% saturated fatty acids, while the DuPont high oleic soybean oil contains approximately 84% oleic acid, 3% linoleic acid, and 13% saturated fatty acids. If desired, additional linoleic acid can be contributed by adding any of a variety of vegetable oils containing substantial amounts of linoleic acid, e.g., standard or commodity soybean, safflower, sunflower, and/or corn oils.

In addition to the blends of oils just indicated, blends can also include interesterified oils as described herein having increased myristic acid and/or lauric acid, which can include increased myristic acid and/or lauric acid in the sn-2 position. Preferably the oil blend does not include interesterified oils which have increased palmitic and/or stearic acids, including at the sn-2 position (or excessive sn-2 lauric and/or myristic acids).

The tables below present gerbil study results for a range of test diets.

TABLE 3

(Gerbil Study 1 Table 1)

| (PUFA % en} | Diet | | | | |
|---|---|---|---|---|---|
| | #682 AHA (13.5} | #683 PO (4.5} | #684 tri14:0/HOSun 50/50 (3} | #685 tri16:0/ HOSun 50/50 (3} | #686 tri18:0/ HOSun 50/50 (3} |
| | Fatty acid % | | | | |
| 8:0 + 10:0 | 0.0 | 0 | 0.0 | 0.0 | 0.0 |
| 12:0 | 0.0 | 0.3 | 0.0 | 0.0 | 0.0 |
| 14:0 | 0.6 | 1.1 | 45.8 | 0.0 | 0.2 |
| 16:0 | 28.2 | 42.9 | 2.0 | 42.7 | 1.7 |
| 18:0 | 7.2 | 4.6 | 1.8 | 3.0 | 44.1 |
| 18:1 | 33.5 | 39.3 | 42.0 | 44.6 | 43.7 |
| 18:2 | 29.0 | 10.7 | 7.7 | 7.8 | 7.6 |
| 18:3 | 3.5 | 0.4 | 0.0 | 0.0 | 0.0 |

TABLE 4

(Gerbil Study 1 Table 2)
Body and organ weights, blood glucose and plasma lipids of gerbils fed control or IE fats for 4 weeks (Gerbil1)

| INGREDIENT | Diet | | | | |
|---|---|---|---|---|---|
| | #682 AHA Control-1 | #683 SFA Control-2 | #684 tri14:0/HOSun 50/50 | #685 tri16:0/HOSun 50/50 | #686 tri18:0/HOSun 50/50 |
| CHO:Fat:Protein (% en} | 41:41:18 | 41:41:18 | 41:41:18 | 41:41:18 | 41:41:18 |
| Kcal/g | 4.3 | 4.3 | 4.3 | 4.3 | 4.3 |
| Body weight (g) | | | | | |
| Initial | 48 ± 2 | 48 ± 2 | 48 ± 2 | 48 ± 1 | 48 ± 1 |
| Final | 67 ± 7 | 67 ± 5 | 66 ± 6 | 65 ± 5 | 66 ± 5 |
| Food intake (g/d} | 9.0 ± 0.6$^3$ | 9.6 ± 0.7b | 9.3 ± 0.9c | 9.4 ± 0.5d | 10.3 ± 0.4a, b, c, d |
| (Kcal!d} | 39 ± 3a | 41 ± 3b | 40 ± 4c | 40 ± 2d | 44 ± 2a, b, c, d |
| Fast blood gluc, 4 wk (mg/dl} | 85 ± 10 | 83 ± 6 | 72 ± 8a, b | | 100 ± 15b |
| Small Intestine length (em} | 34.4 ± 2.2a | 35.2 ± 2.1 | 33.9 ± 2.6b | 35.2 ± 0.8 | 36.9 ± 2.3a, b |
| Plasma | | | | | |
| TC (mg/dl} | 131 ± 48a, b, c | 211 ± 65a | 175 ± 52 | 203 ± 37b | 199 ± 54c |
| VLDL-C (mg/dl} | 34 ± 5 | 44 ± 17 | 51 ± 29 | 52 ± 14 | 68 ± 16 |
| LDL-C (mg/dl} | 25 ± 3a, b | 42 ± 8a | 33 ± 6c | 50 ± 11b, c | 37 ± 6 |
| HDL-C (mg/dl} | 68 ± 5a, b, c, d | 109 ± 13a | 104 ± 1b | 106 ± 1oc | 102 ± 4d |
| LDL-C/HDL-C ratio | 0.37 ± 0.04 | 0.38 ± 0.03 | 0.32 ± 0.06a | 0.48 ± 0.15a | 0.36 ± 0.07 |
| TG (mg/dl} | 130 ± 152 | 112 ± 57 | 88 ± 68 | 72 ± 38 | 102 ± 84 |

Mean ± SD (n = 7-8, except lipoproteins obtained from combined 2-4 individual rat plasmas, n = 2-3)

a, b, c, d . . . Means in a row sharing a common superscript are significantly different (p < 0.05} using one-way ANOVA and Fisher's PLSD test

TABLE 5A

Study 2 Table 1A. Diet composition for gerbils study of interesterified fats (IE Study 2)

| | Diet (gram er 1.0 kilo) | | | |
|---|---|---|---|---|
| INGREDIENT | #687 PKO Control | #688 PKO/HOSun 50/50 blend | #689 PKO/HOSun 60/40 IE | #690 tri12:0/HOSun 50/50 IE |
| CHO:Fat:Protein (% en) | 41:41:18 | 41:41:18 | 41:41:18 | 41:41:18 |
| Kcaljg | 4.3 | 4.3 | 4.3 | 4.3 |
| Casein | 100 | 100 | 100 | 100 |
| Lactalbumin | 100 | 100 | 100 | 100 |
| Dextrose | 200 | 200 | 200 | 200 |
| Cornstarch | 174 (+60/gel) | 174 (+60/gel) | 174 (+60/gel) | 174 (+60/gel) |
| Cellulose | 100 | 100 | 100 | 100 |
| Fat | | | | |
| (SFA:MUFA:PUFA en %) | (31:7:3) | (21:17:3) | (20:18:3) | (21:17:3) |
| (P/S ratio) | (0.09) | (0.14) | (0.15) | (0.16) |
| PKO | 188 | 96 | | |
| HOSun | | 96 | | |
| IE PKO/HOSun 60/40 | | | 192 | |
| IE: tri12/HOSun 50/50 | | | | 188 |
| IE: tri14/HOSun 50/50 | | | | |
| IE: tri14/HOSun 40/60 | | | | |
| IE: tri14/HOSun 25/75 | | | | |
| IE PKS/HOSun 60/40 | | | | |
| Hi 18:2 Safflower oil | 12 | 8 | 8 | 12 |
| Mineral mix (Ausman-Hayes) | 50 | 50 | 50 | 50 |
| Vitamin mix (Hayes-Cathcart) | 12 | 12 | 12 | 12 |
| Choline chloride | 3 | 3 | 3 | 3 |
| Cholesterol | 0.8 | 0.8 | 0.8 | 0.8 |

Take 60 g cornstarch + 800 ml water to make gel (1.0 kg diet).

TABLE 5B

Study 2 Table 1B. Diet composition for gerbils study of interesterified fats (IE Study 2)

| | Diet | | | |
|---|---|---|---|---|
| INGREDIENT | #684 tri14:0/HOSun 50/50 IE | #691 tri14:0/HOSun 40/60 IE | #692 tri14:0/HOSun 25/75 IE | #693 PKS/HOSun 60/40 IE |
| CHO:Fat:Protein (% en) | 41:41:18 | 41:41:18 | 41:41:18 | 41:41:18 |
| Kcaljg | 4.3 | 4.3 | 4.3 | 4.3 |
| Casein | 100 | 100 | 100 | 100 |
| Lactalbumin | 100 | 100 | 100 | 100 |
| Dextrose | 200 | 200 | 200 | 200 |
| Cornstarch | 174 (+60/gel) | 174 (+60/gel) | 174 (+60/gel) | 174 (+60/gel) |
| Cellulose | 100 | 100 | 100 | 100 |
| Fat | | | | |
| (SFA:MUFA:PUFA en %) | (21:17:3) | (17:21:3) | (11:26:3) | (22:16:3) |
| (P/S ratio) | (0.16) | (0.18) | (0.27) | (0.14) |
| PKO | | | | |
| HOSun | | | | |
| IE PKO/HOSun 60/40 | | | | |
| IE: tri12/HOSun 50/50 | | | | |
| IE: tri14/HOSun 50/50 | 188 | | | |
| IE: tri14/HOSun 40/60 | | 191 | | |
| IE: tri14/HOSun 25/75 | | | 193 | |
| IE PKS/HOSun 60/40 | | | | 189 |
| Hi 18:2 Safflower oil | 12 | 9 | 7 | 11 |
| Mineral mix (Ausman-Hayes) | 50 | 50 | 50 | 50 |
| Vitamin mix (Hayes-Cathcart) | 12 | 12 | 12 | 12 |
| Choline chloride | 3 | 3 | 3 | 3 |
| Cholesterol | 0.8 | 0.8 | 0.8 | 0.8 |

Take 60 g cornstarch + 800 ml water to make gel (1.0 kg diet).

TABLE 6A

Study 2 Table 2A. Fatty acid profile of dietary fat (Gerbils Study 2)

| | Diet | | | |
|---|---|---|---|---|
| | #687 PKO Control | #688 PKO/HOSun 50/50 blend | #689 PKO/HOSun 60/40 IE | #690 tri12:0/HOSun 50/50 IE |
| | Fatty acid % | | | |
| 8:0 + 10:0 | 5.6 | 2.9 | 3.4 | 0.0 |
| 12:0 | 44.5 | 22.7 | 26.3 | 44.6 |
| 14:0 | 15.0 | 7.7 | 9.3 | 0.2 |
| 16:0 | 8.8 | 6.3 | 6.7 | 1.8 |
| 18:0 | 2.3 | 3.8 | 3.0 | 1.8 |
| 18:1 | 16.6 | 47.6 | 44.2 | 42.7 |
| 18:2 | 7.2 | 8.7 | 7.0 | 7.6 |
| 18:3 | 0 | 0.0 | 0.0 | 0.0 |
| Total Sats | 76.2 | 43.4 | 48.7 | 48.4 |
| Total\Monos | 16.6 | 47.6 | 44.2 | 42.7 |
| Total Polys | 7.2 | 8.7 | 7.0 | 7.6 |
| PIS | 0.09 | 0.20 | 0.15 | 0.16 |
| S:M:P in diet | 31:7:3 | 18:20:3 | 20:18:3 | 14:13:13 |
| PUFA % diet en | 3 | 3.6 | 3.0 | 3.1 |
| Diet: (CHO/Fat/Prot 41:41:18) | | | | |

TABLE 6B

Study 2 Table 28. Fatty acid profile of dietary fat (Gerbils Study 2)

| | Diet | | | |
|---|---|---|---|---|
| | #684 tri14:0/HOSun 50/50 IE | #691 tri14:0/HOSun 40/60 IE | #692 tri14:0/HOSun 25/75 IE | #693 PKS/HOSun 60/40 IE |
| | Fatty acid % | | | |
| 8:0 + 10:0 | 0.0 | 0.0 | 0.0 | 2.3 |
| 12:0 | 0.0 | 0.0 | 0.0 | 28.2 |
| 14:0 | 45.8 | 36.5 | 21.3 | 12.0 |
| 16:0 | 2.0 | 2.2 | 2.6 | 6.7 |
| 18:0 | 1.8 | 2.1 | 2.8 | 3.2 |
| 18:1 | 42.0 | 51.0 | 64.5 | 40.2 |
| 18:2 | 7.7 | 7.2 | 7.1 | 7.4 |
| 18:3 | 0.0 | 0.0 | 0.0 | 0.0 |
| Total Sats | 49.6 | 40.8 | 26.7 | 52.4 |
| Total Monos | 42.0 | 51.0 | 64.5 | 40.2 |
| Total Polys | 7.7 | 7.2 | 7.1 | 7.4 |
| PIS | 0.16 | 0.18 | 0.27 | 0.14 |
| S:M:P in diet | 21:17:3 | 17:21:3 | 11:26:3 | 22:16:3 |
| PUFA % diet en | 3.2 | 3.0 | 3.0 | 3.1 |
| Diet: (CHO/Fat/Prot 41:41:18) | | | | |

TABLE 7A

Study 2 Table3A. Body and organ weights, blood glucose and plasma lipids of gerbils fed control or experimental diets for 4 weeks (IE Study 2)

| | Diet | | | |
|---|---|---|---|---|
| INGREDIENT | #687 PKO Control | #688 PKOIHOSun 50150 blend | #689 PKOIHOSun 60/40 IE | #690 tri 12:0/HOSun 50150 IE |
| CHO:Fat:Protein (% en) | 41:41:18 | 41:41:18 | 41:41:18 | 41:41:18 |
| Kcal/g | 4.3 | 4.3 | 4.3 | 4.3 |
| Body weight (g) | | | | |
| Initial | 50 ± 4 | 50 ± 4 | 50 ± 4 | 50 ± 4 |
| Final | 70 ± 4a | 67 ± 7 | 65 ± 7 | 69 ± 13b |
| Gain (g/d) | 0.62 ± 0.12a | 0.53 ± 0.18 | 0.48 ± 0.3 | 0.61 ± 0.38b |
| Food intake (g/d) | 10.8 ± 0.8 | 9.9 ± 0.7 | 10.0 ± 0.8 | 10.5 ± 1.5 |
| (Kcal/d) | 27 ± 2a | 25 ± 2a | 25 ± 2 | 26 ± 4 |
| (Kcal/d/kg BW) | 386 ± 29 | 373 ± 30 | 385 ± 31 | 377 ± 58 |
| Water intake (ml/d) | 4.2 ± 1.3 | 4.1 ± .1S | 4.2 ± 0.9 | 4.4 ± 1.6 |
| Fast Blood glu. 4 wk (mg/dL) | 87 ± 18 | 98 ± 21 | 82 ± 9a | 102 ± 21a, b, c, d |
| Plasma | | | | |
| TC (mg/dL) | 218 ± 52a, b, c, d, e | 170 ± 21a, f | 185 ± 20b | 191 ± 12 |
| VLDL-C (mg/dL) | 31 + 10a | 42 ± 10b | 38 ± 5c | 25 ± 7d |
| LDL-C (mg/dL) | 70 ± 1oa, b, c, d, e. f, g, h | 35 ± 2a | 37 ± 3b | 50 ± 3c, h |
| HDL-C (mg/dL) | 124 ± 25a. b, c. d, e, f | 98 ± 12a | 102 ± 11b | 117 ± 4g |
| (HDL % of total) | (57) | (58) | (55) | (61) |
| LDL-CffiDL-C ratio | 0.58 ± 0.09a, b, c, d | 0.36 ± 0.02a | 0.37 ± 0.06b | 0.42 ± 0.03c |
| TG (mg/dL) | 66 ± 33 | 42 ± 17 | 47 ± 24 | 69 ± 42 |

Values are mean ± SD (n = 8, except for lipoproteins which was obtained from combined 2-3 individual plasmas, n = 3)

a, b, c, d.. Means in a row sharing a common superscript are significantly different ($p < 0.05$) using one-way ANOVA and Fisher's PLSD test

TABLE 7B

Table2-3B. Body and organ weights, blood glucose and plasma lipids of gerbils fed control or experimental diets for 4 weeks (IE Study 2)

| INGREDIENT | Diet | | | |
|---|---|---|---|---|
| | #684 Tri 14:0/HOSun 50150 IE | #691 tri 14:0/HOSun 40/60 IE | #692 tri 14:0/HOSun 25/75 IE | #693 PKS/HOSun 60/40 IE |
| CHO:Fat:Protein (% en) | 41:41:18 | 41:41:18 | 41:41:18 | 41:41:18 |
| Kcal/ | 4.3 | 4.3 | 4.3 | 4.3 |
| Body weight (g) | | | | |
| Initial | 50 ± 4 | 50 ± 4 | 50 ± 4 | 51 ± 1 |
| Final | 65 ± 4 | 65 ± 5 | 68 ± 6 | 62 ± 2a, b |
| Gain (g/d) | 0.48 ± 0.16 | 0.47 ± 0.2 | 0.56 ± 0.24c | 0.33 ± 0.08a, b, c |
| Food intake | | | | |
| (g/d) | 10.3 ± 0.5 | 10.0 ± 0.7 | 10.4 ± 0.7 | 10.2 ± 0.5 |
| (Kcal/d) | 26 ± 1 | 25 ± 2 | 26 ± 2 | 26 ± 1 |
| (Kcal/d/kg BW) | 400 ± 15 | 385 ± 31 | 382 ± 29 | 419 ± 16 |
| Water intake (ml/d) | 5.0 ± 1.3 | 4.0 ± 0.8b | 5.5 + 1.4a, b | 5.1 ± 1.4 |
| Fast Blood glu. 4 wk (mg/dL) | 82 ± 10b | 93 ± 17 | 84 ± 17c | 85 ± 19d |
| Plasma | | | | |
| TC (mg/dL) | 185 ± 23c | 178 ± 28d, g | 178 ± 44e, h | 214 ± 37Lgh |
| VLDL-C (mg/dL) | 33 ± 4e | 39 ± 8f | 44 ± 17g | 69 ± 27a, b, c, d, e, f, g |
| LDL-C (mg/dL) | 48 ± 12f.I | 40 ± 7e. | 29 ± 1or.h, i, j | 47 ± 12g . . . j |
| HDL-C (mg/dL) | 97 ± 8° | 101 ± 8d.g | 103 ± 2e | 102 ± 0f |
| (HDL % of total) | (52) | (57) | (58) | (48) |
| LDL-C/HDL-C ratio | 0.49 ± 0.10f | 0.41 ± 0.10d | 0.28 ± 0.1oe, f, g | 0.47 ± 0.12g |
| TG (mg/dL) | 54 ± 22 | 45 ± 13 | 61 ± 42 | 29 ± 12 |

Values are mean ± SD (n = 8, except for lipoproteins which was obtained from combined 2-3 individual plasmas, n = 3)
a, b, c, d. . . Means in a row sharing a common superscript are significantly different (p < 0.05) using one-way ANOVA and Fisher's PLSD test Tables 7A and 7B (Tables 4-1 and 4-2) above show the effects of feeding interesterified (IE) dietary fats to gerbils, including changes in plasma lipoproteins, triglycerides and blood glucose levels. Table 3 lists the fatty acid profiles for the diets in the study corresponding to Table 4, while Table 6 lists the fatty acid profiles for the diets in the study corresponding to Table 7.

Table 4 provides the results obtained from feeding five different dietary fats to gerbils. These fats include a blend representing an AHA (American Heart Association) fat blend (control) providing a balance of saturated, monounsaturated, and polyunsaturated fatty acids in approximately equal amounts (#682); a second control fat representing a saturated fat based on palm oil (#683); a third fat with tri-14:0 (tri-myristic acid) interesterified with hi-oleic sunflower oil (HOSUN) at a 50/50 ratio (#684); a fourth fat similarly interesterified using tri-16:0 (tri-palmitic acid) interesterified with hi-oleic sunflower oil at a 50/50 ratio; and finally a fifth fat similarly interesterified using tri-18 (tri-stearic acid) interesterified with hi-oleic sunflower oil at a 50/50 ratio.

Results in Table 4 show that all gerbils grew at the same rate, but those fed tri-18:0 had to consume more food than all the other fat groups in order to grow normally. This suggests that when stearic acid is interesterified into a normal oil at high concentration, the resulting IE fat is not metabolized efficiently, hampering growth. The tri-18:0 fat also raised the blood glucose level relative to tri-14:0. In fact, the tri-14:0 IE fat induced the lowest fasting blood glucose level (72 mg/dL) and the lowest LDL/HDL ratio (0.32) among the fats tested. It was apparent that tri-14:0 produced the best metabolic response in terms of energy dynamics, as reflected in markers of fasting blood glucose and lipoprotein metabolism.

Tables 5-7 extends the comparison of effects of different dietary fats on gerbil metabolism. The comparison now includes (palm kernel oil-PKO), a natural vegetable oil rich in both lauric acid (12:0) and myristic acid (14:0). Also included are natural vegetable oil blends and IE fat products made by combining PKO with HOSUN. This experiment was intended to compare and further elucidate the functional efficacy of interesterifying vegetable oils as compared to the simple blending of two natural oils to achieve the desired fatty acid composition characteristics. In addition, myristic acid (tri-14:0) and HOSUN oil were combined at different ratios using interesterification. Finally, lauric acid (tri-12:0) was interesterified with HOSUN oil using a 50/50 ratio of the oils.

As in Table 4, different IE fat compositions influenced blood glucose levels to different extents. An elevated fasting glucose level (102 mg/dL) was measured with dietary fat in which tri-12:0 was interesterified 50/50 with HOSUN (diet #690). By comparison, the IE fat produced from tri-14:0 and HOSUN using a 50/50 ratio again improved the fasting blood glucose level (82 mg/dL, diet #684), as did the IE fat produced using a 60/40 ratio of PKO and HOSUN (82 mg/dL, diet #689). The IE fat produced by interesterifying tri-14:0 and HOSUN, but using a reduced ratio of 25175 for tri-14:0 and HOSUN (diet #692) resulted in a particularly favorable ratio of LDL/HDL cholesterol (0.28) as well as a favorable fasting glucose level of 84 mg/dL). In the same series of experiments, it is interesting to observe that natural PKO alone (diet #687) produced the worst ratio of LDL/HDL cholesterol. Collectively, these data suggest that interesterification that combines myristic acid (tri-14:0) and oleic acid (e.g., HOSUN oil), or the blending of PKO (providing both myristic and lauric acids (14:0 and 12:0) together with a high oleic acid-containing oil (e.g., HOSUN) can be particularly advantageous.

G. VLDL-Reducing, LDL-Reducing, HDL Fraction-Improving, and LDL/HDL Ratio-Improving Fat Compositions In addition to the fat compositions described above, it was discovered that celtain fat compositions were surprisingly advantageous in limiting serum VLDL, serum LDL, total serum cholesterol, and total serum triglycerides, even in the presence of dietary cholesterol. Given the extensive body of lipoprotein research involving nutrition and dietary fats, there is a general consensus that coronary heart disease, and both vascular and general health in humans and other animals can be improved if the plasma levels of TC (total cholesterol) and LDL are reduced, while the ratio of LDL to HDL is also reduced and the level of HDL is increased. There is also a general consensus, that a low level of plasma triglycerides (TG) is beneficial, and that if the level of very low density lipoprotein (VLDL) can be also reduced, then the TG level and lipoprotein levels are beneficially regulated because HDL is generated, in part, during catabolism of VLDL. A study was carried out analyzing the effects of certain types of saturated fats on the plasma lipoprotein profile and TG levels in animals ingesting diets in which the fats provided about 40% of the dietary calories.

In this study, gerbils were fed diets (see Table 8) in which saturated fat was provided in the form of either palm oil (PO, diets 700 and 702) or palm kernel oil (PKO, 701 and 703) while polyunsaturated fat (as linoleic acid, 18:2n6) was controlled at two different energy levels (4.5% and 13% of the dietary calories corresponding to 11% and 33% by weight of the fat composition) in diets that provided 40% energy as fat. In diets 702 and 703 saturated, polyunsaturated and monounsaturated fatty acids are each maintained at essentially the same 13% dietary energy level, each corresponding to 113 by weight of the fat composition to achieve a so-called "balanced fat composition." The fatty acid composition for each of diets 700-703 is shown in Table 9.

TABLE 8

Study 4 Table I (4-1). Diet composition for gerbil study (PO vs PKO)

| | Diet | | | |
|---|---|---|---|---|
| INGREDIENT | 700 PO (lo-PUFA)† | 701 PKO (lo-PUFA)† † | 702 PO (Hi-PUFA)* | 703 PKO (Hi-PUFA)** |
| CHO:Fat:Protein (% E) | 41:41:18 | 41:41:18 | 41:41:18 | 41:41:18 |
| Kcal/g | 4.3 | 4.3 | 4.3 | 4.3 |
| | g/kg | | | |
| Casein | 100 | 100 | 100 | 100 |
| Lactalbumin | 100 | 100 | 100 | 100 |
| Dextrose | 200 | 200 | 200 | 200 |
| Cornstarch | 174 + 60(w/gel) | 174 + 60(w/gel) | 174 + 60(w/gel) | 174 + 60(w/gel) |
| Cellulose | 100 | 100 | 100 | 100 |
| Fat: | | | | |
| (SFA:MUFA:PUFA % E) | (20:16:4.5) | (20:16:4.5) | (13:14:13) | (13:14:13) |
| (P/S) | (0.23) | (0.23) | (1.00) | (1.00) |
| Palm Oil (PO) | 200 | 0 | 116 | 0 |
| Soybean Oil (SBO) | 0 | 0 | 84 | 66 |
| Canola Oil (CO) | 0 | 0 | 0 | 72 |
| Palm Kernel Oil (PKO) | 0 | 178 | 0 | 62 |
| Hi 18:2 Safflower Oil (SAF) | 0 | 22 | 0 | 0 |
| Mineral mix (Ausman-Hayes) | 50 | 50 | 50 | 50 |
| Vitamin mix (Hayes-Cathcart) | 12 | 12 | 12 | 12 |
| Choline chloride | 3 | 3 | 3 | 3 |
| Cholesterol | 0.8 | 0.8 | 0.8 | 0.8 |

Combine 60 g cornstarch with 800 mL water to produce gel that is added to the remaining dry ingredients
†Composition: PO only
††Composition: 56% PKO + 36% HOSun + 8% SAF
*Experimental spread with PO, composition: 58% Palm Oil + 42% Soybean Oil
**Experimental spread with PKO, composition: 31% PKO + 33% Soybean Oil + 36% Canola Oil

TABLE 9

Study 4 Table 2(4-2). Fatty acid profile of dietary fat (Gerbils Study PO vs PKO)

| | Diet | | | |
|---|---|---|---|---|
| | 700 PO (lo-UFA)† | 701 PKO (lo-PUFA)† † | 702 PO (Hi-PUFA)* | 703 PKO (Hi-PUFA)** |
| | Fatty acid % | | | |
| 8:0 + 10:0 | 0.0 | 3.3 | 0.0 | 1.9 |
| 12:0 | 0.3 | 26.5 | 0.1 | 14.7 |
| 14:0 | 1.1 | 8.9 | 0.6 | 5.0 |
| 16:0 | 42.9 | 6.9 | 27.5 | 7.7 |
| 18:0 | 4.6 | 3.4 | 4.2 | 2.6 |
| 18:1 | 39.3 | 39.7 | 34.4 | 34.8 |
| 18:2 | 10.7 | 11.0 | 29.1 | 26.1 |
| 18:3 | 0.4 | 0.1 | 3.3 | 5.7 |
| Total Sats | 48.9 | 49.0 | 32.4 | 31.9 |
| Total Monos | 39.3 | 39.7 | 34.4 | 34.8 |
| Total Polys | 11.1 | 11.1 | 32.4 | 31.8 |
| P/S | 0.23 | 0.23 | 1.00 | 1.00 |
| S:M:P in diet | 20:16:4.5 | 20:16:4.5 | 13:14:13 | 13:14:13 |
| PUFA % E/diet | 4.6 | 4.6 | 13.3 | 13.0 |

Diet: (CHO/Fat/Prot % E 41:41:18)
†Composition: PO only
† †Composition: 56% PKO + 36% HOSun + 8% SAF
*Experimental spread with PO, composition: 58% Palm Oil + 42% Soybean Oil
**Experimental spread with PKO, composition: 31% PKO + 33% Soybean Oil + 36% Canola Oil Results of the study on body and organ weights, and blood and plasma measures of lipids are shown in Table 10.

TABLE 10

Study 4 Table 3 (4-3). Body and organ weights, blood glucose and plasma lipids of gerbils fed PO and PKO diets for 3 weeks.

| INGREDIENT | 700 PO (lo-PUFA) | 701 PKO (lo-PUFA) | 702 PO (Hi-PUFA) | 703 PKO (Hi-PUFA) |
|---|---|---|---|---|
| CHO:Fat:Protein (% E) | 41:41:18 | 41:41:18 | 41:41:18 | 41:41:18 |
| kcal/g | 4.3 | 4.3 | 4.3 | 4.3 |
| Body weight (g) | | | | |
| Initial | 50 ± 2 | 50 ± 2 | 50 ± 2 | 50 ± 1 |
| Final (after 3 wk) | 63 ± 3 | 62 ± 2 | 64 ± 2 | 64 ± 5 |
| Gain (g/d) | 0.61 ± 0.18 | 0.56 ± 0.06 | 0.69 ± 0.14 | 0.69 ± 0.23 |
| Food Intake | | | | |
| (g/d) | 5.6 ± 0.5 | 5.4 ± 0.1 | 5.4 ± 0.3 | 5.5 ± 0.5 |
| (kcal/d) | 24 ± 2 | 23 ± 1 | 23 ± 1 | 23 ± 2 |
| Water Intake (mL/d) | 5.1 ± 1.1 | 5.2 ± 1.4 | 6.3 ± 0.8 | 5.9 ± 1.4 |
| F. Blood Glucose at 3 wk(mg/dL) | 86 ± 18 | 94 ± 21 | 95 ± 14 | 97 ± 18 |
| Organ weight (% BW) | | | | |
| Liver | 3.52 ± 0.41 | 3.52 ± 0.24 | 3.48 ± 0.28 | 3.46 ± 0.22 |
| Kidney | 0.79 ± 0.07a | 0.82 ± 0.04 | 0.81 ± 0.02 | 0.84 ± 0.04a |
| Cecum | 2.39 ± 0.37 | 2.28 ± 0.34 | 2.46 ± 0.38 | 2.44 ± 0.39 |
| Adipose | | | | |
| Perirenal | 1.21 ± 0.24 | 1.05 ± 0.34 | 1.26 ± 0.23 | 1.06 ± 0.41 |
| Epididymal | 1.85 ± 0.36 | 1.76 ± 0.36 | 1.79 ± 0.38 | 1.73 ± 0.49 |
| Brown fat | 0.64 ± 0.25 | 0.68 ± 0.16 | 0.71 ± 0.13 | 0.64 ± 0.18 |
| Total adipose | 3.70 ± 0.65 | 3.48 ± 0.77 | 3.77 ± 0.66 | 3.43 ± 1.02 |
| Carcass | 73 ± 2a | 75 ± 1 | 74 ± 1b | 76 ± 1a,b |
| Plasma | | | | |
| TC (mg/dL) | 251 ± 40a, b, c | 210 ± 27a, d, e | 148 ± 24b, d, f | 116 ± 16c, e.f |
| VLDL-C (mg/dL) | 73 ± r.b.c | 34 ± 6a | 33 ± 13b | 20 ± 1c |
| LDL-C (mg/dL) | 66 ± 3a.b | 59 ± 4c, d | 42 ± 7a, c, e | 27 ± 6b, d, e |
| HDL-C (mg/dL) | 111 ± 4a, b | 108 ± 6c, d | 74 ± 4a, c | 70 ± 7b, d |
| LDL-C/HDL-C ratio | 0.58 ± 0.04a | 0.54 ± 0.07b | 0.57 ± 0.08c | 0.38 ± 0.04a, b, c |
| HDL-C (% of total) | 44 ± 1a, b, c | 54 ± 3.a, d | 50 ± 4b, e | 60 ± 1c, d, e |
| TG (mg/dL) | 194 ± 102a, b, c | 72 ± 32a | 68 ± 28b | 43 ± 13c |

Values are mean ± SD (n = 8-10, except for lipoproteins obtained by ultracentrifugation of 3 samples, each representing combined plasma from 2-3 gerbils)
a, b, c, d. . . Means in a row sharing a common superscript are significantly different (p < 0.05) using one-way A.'JOVA and Fisher's PLSD test Results for the study (Study 4) described immediately above led to the conduct of an additional study (Study 5) involving diet compositions similar to the previous study but also including a diet (Diet 704) containing a different high SFA oil, coconut oil, with added PUPA. The study also included a diet (702A) similar to diet 702 but which does not contain palm olein. The diets for this study are shown in Table 11, with the respective fatty acid profiles shown in Table 12. As is discussed below, Studies 4 and 5 together allowed comparison of results for diets containing PO with diets containing PKO.

TABLE 11

Study 5 Table 1 (5-1). Diet composition for gerbil study (PO vs PKO and COCO)

| INGREDIENT | 702A PO (Hi-PUFA)* | 702 PO (Hi-PUFA)** | 703 PKO (Hi-PUFA)† | 704 COCO (Hi-PUFA)† † |
|---|---|---|---|---|
| CHO:Fat:Protein (% E) | 41:41:18 | 41:41:18 | 41:41:18 | 41:41:18 |
| Kcal/g | 4.3 | 4.3 | 4.3 | 4.3 |
| | | g/kg | | |
| Casein | 100 | 100 | 100 | 100 |
| Lactalbumin | 100 | 100 | 100 | 100 |
| Dextrose | 200 | 200 | 200 | 200 |
| Cornstarch | 174 + 60(w/gel) | 174 + 60(w/gel) | 174 + 60(w/gel) | 174 + 60(w/gel) |
| Cellulose | 100 | 100 | 100 | 100 |
| Fat: | | | | |
| (SFA:MUFA:PUFA en %) | (13:13:15) | (13:14:13) | (13:14:13) | (14:13:13) |
| (PIS) | (1.18) | (1.00) | (1.00) | (0.90) |
| Palm Oil (PO) | 48 | 116 | 0 | 0 |
| Palm Olein | 52 | 0 | 0 | 0 |
| Soybean Oil (SBO) | 100 | 84 | 66 | 66 |
| Canola Oil (CO) | 0 | 0 | 72 | 72 |
| Palm Kernel Oil (PKO) | 0 | 0 | 62 | 0 |
| Coconut Oil (COCO) | 0 | 0 | 0 | 62 |
| Mineral mix (Ausman-Hayes) | 50 | 50 | 50 | 50 |
| Vitamin mix (Hayes-Cathcart) | 12 | 12 | 12 | 12 |
| Choline chloride | 3 | 3 | 3 | 3 |
| Cholesterol | 0.8 | 0.8 | 0.8 | 0.8 |

Combine 60 g cornstarch with 800 mL water to produce gel that is added to the remaining dry ingredients
*Current market spread with PO, composition: 50% Soybean Oil + 26% Palm Olein + 24% Palm Oil
**Experimental spread with PO, composition: 58% Palm Oil + 42% Soybean Oil
†Experimental spread with PKO, composition: 31% PKO + 33% Soybean Oil + 36% Canola Oil
† † Experimental spread with COCO, composition: 31% COCO + 33% Soybean Oil + 36% Canola Oil

TABLE 12

Study 5 Table 2 (5-2). Fatty acid profile of dietary fat (Gerbils Study PO vs PKO and COCO)

| | 702A PO (Hi-PUFA)* | 702 PO (Hi-PUFA)** | 703 PKO (Hi-PUFA)† | 704 COCO (Hi-PUFA)† † |
|---|---|---|---|---|
| | | Fatty acid % | | |
| 8:0 + 10:0 | 0 | 0.0 | 1.9 | 4.2 |
| 12:0 | 0.1 | 0.1 | 14.7 | 14.6 |
| 14:0 | 0.6 | 0.6 | 5.0 | 5.8 |
| 16:0 | 25.9 | 27.5 | 7.7 | 7.8 |
| 18:0 | 4.2 | 4.2 | 2.8 | 2.8 |
| 18:1 | 32.1 | 34.4 | 34.8 | 31.7 |
| 18:2 | 32.3 | 29.1 | 26.1 | 25.9 |
| 18:3 | 3.9 | 3.3 | 5.7 | 5.7 |

TABLE 12-continued

Study 5 Table 2 (5-2). Fatty acid profile of dietary fat
(Gerbils Study PO vs PKO and COCO)

| | Diet | | | |
|---|---|---|---|---|
| | 702A PO (HI-PUFA)* | 702 PO (HI-PlJFA)** | 703 PKO (Hi-PUFA)† | 704 COCO (Hi-PUFA)† † |
| | Fatty acid % | | | |
| Total Sats | 30.8 | 32.4 | 31.9 | 35.2 |
| Total Monos | 32.1 | 34.4 | 34.8 | 31.7 |
| Total Polys | 36.2 | 32.4 | 31.8 | 31.6 |
| PIS | 1.18 | 1.00 | 1.00 | 0.90 |
| S:M:P in diet | 13:13:15 | 13:14:13 | 13:14:13 | 14:13:13 |
| PUFA % diet en | 14.8 | 13.3 | 13.0 | 13.0 |

*Current market spread with PO, composition: 50% Soybean Oil + 26% Palm Olein + 24% Palm Oil
**Experimental spread with PO, composition: 58% Palm Oil + 42% Soybean Oil
†Experimental spread with PKO, composition: 31% PKO + 33% Soybean Oil + 36% Canola Oil
† †Experimental spread with COCO, composition: 31% COCO + 33% Soybean Oil + 36% Canola Oil Table 13 shows the results for body and organ weights and blood and plasma parameters of the respective Study 5 diets.

TABLE 13

Study 5 Table 3 (5-3). Body and organ weights, blood glucose and plasma lipids of gerbils fed PO and PKO diets for 3 weeks.

| | Diet | | | |
|---|---|---|---|---|
| INGREDIENT | 702A PO (Hi-PUFA) | 702 PO (Hi-PUFA) | 703 PKO (Hi-PUFA) | 704 COCO (Hi-PUFA) |
| CHO:Fat:Protein (% E) | 41:41:18 | 41:41:18 | 41:41:18 | 41:41:18 |
| kcal/g | 4.3 | 4.3 | 4.3 | 4.3 |
| Body weight (g) | | | | |
| Initial | 49 ± 2 | 49 ± 2 | 49 ± 2 | 49 ± 1 |
| Final (after 3 wk) | 63 ± 3a, b | 66 ± 6 | 63 ± 3c, d | 70 ± 4a, c |
| Gain (g/d) | 0.68 ± 0.19a, b | 0.79 ± 0.31 | 0.60 ± 0.18c, d | 0.98 ± 0.20a, c |
| Food Intake | | | | |
| (g/d) | 5.1 ± 0.3a, b, c | 5.6 ± 0.4a | 5.1 ± 0.4d, e | 5.6 ± 0.3b, d |
| (kcal/d) | 22 ± 1a, b, c | 24 ± 2a | 22 ± 2d, e | 24 ± 1b, d |
| Growth efficiency (kcal/g gain/d) | 34 ± 6 | 36 ± 13 | 40 ± 10a | 25.5 ± 5a |
| Water Intake (mL/d) | 6.1 ± 2.0 | 5.9 ± o.r | 5.9 ± 1.1b | 6.7 ± 1.3 |
| F. Blood Glucose at 3 wk(mg/dL) | 82 ± 15 | 88 ± 26 | 78 ± 14 | 91 ± 16 |
| Organ weight (% BW) | | | | |
| Liver | 3.21 ± 0.22 | 3.48 ± 0.46a | 3.11 ± 0.30a, b | 3.47 ± 0.28b |
| Kidney | 0.78 ± 0.04 | 0.82 ± 0.05 | 0.79 ± 0.04 | 0.76 ± 0.13 |
| Cecum | 2.28 ± 0.33 | 2.21 ± 0.36 | 2.36 ± 0.27 | 2.17 ± 0.18 |
| Adipose | | | | |
| Perirenal | 1.23 ± 0.28 | 1.32 ± 0.16 | 1.13 ± 0.25 | 1.41 ± 0.31 |
| Epididymal | 2.09 ± 0.37 | 2.02 ± 0.55 | 1.72 ± 0.32 | 2.14 ± 0.31 |
| Brown fat | 0.66 ± 0.15 | 0.71 ± 0.21 | 0.62 ± 0.14 | 0.77 ± 0.20 |
| Total adipose | 3.98 ± 0.73 | 4.05 ± 0.80 | 3.48 ± 0.50a | 4.32 ± 0.41a |
| Carcass | 75 ± 1 | 75 ± 1 | 76 ± 1a | 75 ± 1 |
| Plasma | | | | |
| TC (mg/dL) | 140 ± 21a | 145 ± 31 | 130 ± 16b | 135 ± 16c |
| VLDL-C (mg/dL) | 34 ± 17a | 33 ± 4 | 27 ± 8 | 18 ± 3a |
| LDL-C (mg/dL) | 39 ± 6 | 45 ± 14 | 33 ± 8 | 37 ± 10 |
| HDL-C (mg/dL) | 67 ± 8a | 67 ± 12b | 70 ± 6c | 82 ± 12 |
| LDL-ClHDL-C ratio | 0.60 ± 0.12 | 0.67 ± 0.09a, b, c | 0.47 ± 0.12a | 0.45 ± 0.06b |
| HDL-C (% of total) | 49 ± 8a | 46 ± 1b, c, d | 54 ± 7b | 60 ± 1a, c |
| TG (mg/dL) | 75 ± 24 | 124 ± 97 | 69 ± 21a | 81 ± 27 |

Values are mean ± SD (n = 8, except for lipoproteins obtained by ultracentrifugation of 3-4 samples, each representing combined plasma from 2-3 gerbils)
a, b, c, d . . . Means in a row sharing a common superscript are significantly different (p < 0.05) using one-way ANOVA and Fisher's PLSD test A useful comparison for Hi-PUFA diets is provided by the data from the preceding two studies for a diet incorporating a high level of palm oil (PO) versus a diet incorporating a high level of palm kernel oil (PKO), as shown in the following table.

TABLE 14

Combined Studies 4 & 5 Table 1 (4/5-1). Body and organ weights, blood glucose and plasma lipids of gerbils fed PO and PKO diets for 3 weeks (combined data of gerbil study # 4 and # 5).

| | Diet | |
|---|---|---|
| INGREDIENT | 702A/702† PO (Hi-PUFA) | 703 PKO (Hi-PUFA) |
| CHO:Fat:Protein (% E) | 41:41:18 | 41:41:18 |
| kcal/g | 4.3 | 4.3 |
| S:M:P | 13:14:13 | 13:14:13 |
| N | 24 | 18 |
| Body weight (g) | | |
| Initial | 49 ± 2 | 50 ± 1 |
| Final (after 3 wk) | 64 ± 5 | 63 ± 4 |
| Gain (g/d) | 0.71 ± 0.23 | 0.65 ± 0.21 |

TABLE 14-continued

Combined Studies 4 & 5 Table 1 (4/5-1). Body and organ weights, blood glucose and plasma lipids of gerbils fed PO and PKO diets for 3 weeks (combined data of gerbil study # 4 and # 5).

| | Diet | |
|---|---|---|
| INGREDIENT | 702A/702† PO (Hi-PUFA) | 703 PKO (Hi-PUFA) |
| Food Intake | | |
| (g/d) | 5.4 ± 0.4 | 5.3 ± 0.5 |
| (kcal/d) | 23 ± 2 | 23 ± 2 |
| Growth efficiency (kcal/g gain/d) | 35 ± 11 | 38 ± 11 |
| Water Intake (mL/d) | 6.1 ± 1.3 | 5.9 ± 1.2 |
| F. Blood Glucose at 3 wk (mg/dL) | 88 ± 19 | 90 ± 18 |
| Organ weight (% BW) | | |
| Liver | 3.40 ± 0.35 | 3.30 ± 0.30 |
| Kidney | 0.80 ± 0.04 | 0.82 ± 0.05 |
| Cecum | 2.32 ± 0.38 | 2.41 ± 0.33 |
| Adipose | | |
| Perirenal | 1.28 ± 0.22 | 1.09 ± 0.34* |
| Epididymal | 1.97 ± 0.44 | 1.73 ± 0.41 |
| Brown fat | 0.69 ± 0.16 | 0.63 ± 0.16 |
| Total adipose | 3.93 ± 0.71 | 3.45 ± 0.81* |
| Carcass | 74.7 ± 1.1 | 75.6 ± 1.3* |
| Plasma | | |
| TC (mg/dL) | 144 ± 25 | 122 ± 17* |
| VLDL-C (mg/dL) | 33 ± 11 | 24 ± 7 |
| LDL-C (mg/dL) | 42 ± 9 | 31 ± 7* |
| HDL-C (mg/dL) | 69 ± 9 | 70 ± 6 |
| LDL-C/HDL-C ratio | 0.61 ± 0.10 | 0.44 ± 0.10* |
| HDL-C (% of total) | 48 ± 3 | 57 ± 6* |
| TG (mg/dL) | 89 ± 63 | 55 ± 21* |

Values are mean ± SD (n = 18-24, except for lipoproteins obtained by ultracentrifugation of 7-10 samples, each representing combined plasma from 2-3 gerbils)
†Combined data of diet 702 and 702A (combined data for the 2 PO formula because they did not differ statistically)
*Significantly different (p < 0.05) by Student's unpaired t-test The beneficial effects of the use in diets of oil blends rich in myristic acid and/or lauric acid without the presence of excessive trisaturated triglycerides is further shown by looking at a prior study (Study 3) in which the level of palm kernel oil was at two substantially different levels (with corresponding different levels of myristic acid plus lamie acid) and in which the level of linoleic acid was varied. The following tables are similar to those previously shown. Pairs of tables (e.g., Tables 14A and 14B) should be regarded as single split tables.

The oil blends used are shown below the diet number as weight percentages of the constituent oils (e.g, diet 694 contains an oil blend of 30% PKO, 59% high oleic sunflower oil, and 11% safflower oil, while diet 696 contains 40% coconut oil, 32% canola oil, and 28% palm stearin). The composition of the American Fat Blend (AFB) fat in diet 695 is shown in the footnote for Table 16.

As seen in the data tables 17A and 17B, diets 697, 698, and 699 show that even relatively low levels of linoleic acid (18:2) are beneficial with respect to plasma cholesterol and total triglyceride levels. Further, inclusion of PKO with its advantageous levels of myristic acid and lauric acid and relatively lower levels of trisaturated triglycerides as compared to coconut oil is again shown beneficial as compared to the AFB fat (diet 695) as well as the coconut oil-containing oil blend in diet 696. Higher levels of PKO, with resulting higher levels of myristic acid and lauric acid, in diets 697, 698, and 699 are advantageous as compared to a substantially lower level as present in diet 694 in providing improved level of HDL as a fraction of total cholesterol.

TABLE 1SA

Study 3 Table 1A. Diet composition for gerbils study (PKO vs COCO vs AFB)

| | Diet (gram per 1.0 kilo) | | |
|---|---|---|---|
| INGREDIENT | 694 PKO/ HOSun/SAF 30/59/11 | 695 AFB | 696 COCO/ Canola/Palms† 40/32/28 |
| CHO:Fat:Protein (% en) | 41:41:18 | 41:41:18 | 41:41:18 |
| Kcal/g | 4.3 | 4.3 | 4.3 |
| Casein | 100 | 100 | 100 |
| Lactalbumin | 100 | 100 | 100 |
| Dextrose | 200 | 200 | 200 |
| Cornstarch | 174(+60/gel) | 174(+60/gel) | 174(+60/gel) |
| Cellulose | 100 | 100 | 100 |
| (SFA:MUFA:PUFA en %) | (13:22:6) | (18:15:6) | (24:11:5) |
| (P/S) | (0.48) | (0.32) | (0.23) |
| Fat: | | | |
| Coconut oil | 0 | 0 | 80 |
| Canola oil | 0 | 0 | 64 |
| Palm stearine | 0 | 0 | 56 |
| Butter (80% fat) | 0 | 48 | 0 |
| Tallow | 0 | 96 | 0 |
| Lard | 0 | 32 | 0 |
| Soybean oil | 0 | 32 | 0 |
| PKO | 60 | 0 | 0 |
| High oleic sunflower oil | 118 | 0 | 0 |
| Hi 18:2 Safflower oil | 22 | 0 | 0 |
| Mineral mix (Ausman - Hayes) | 50 | 50 | 50 |
| Vitamin mix (Hayes - Cathcart) | 12 | 12 | 12 |
| Choline chloride | 3 | 3 | 3 |
| Cholesterol | 0.8 | 0.6 (0.8)t | 0.8 |

Take 60 g cornstarch + 800 ml water to make gel (1.0 kg diet).
†Added cholesterol + cholesterol provided by fats

TABLE 1SB

Study 3 Table 1B. Diet composition for gerbils study (PKO vs COCO vs AFB)

| | Diet (gram per 1.0 kilo) | | |
|---|---|---|---|
| INGREDIENT | 697 PKO/ HOSun/SAF 60/37/3 | 698 PKOlHOSun/ SAF 60/26/14 | 699 PKO/ HOSun/SAF 60/15.5/24.5 |
| CHO:Fat:Protein (% en) | 41:41:18 | 41:41:18 | 41:41:18 |
| Kcal/g | 4.3 | 4.3 | 4.3 |
| Casein | 100 | 100 | 100 |
| Lactalbumin | 100 | 100 | 100 |
| Dextrose | 200 | 200 | 200 |
| Cornstarch | 174(+60/gel) | 174(+60/gel) | 174(+60/gel) |
| Cellulose | 100 | 100 | 100 |
| (SFA:MUFA:PUFA en %) | (21:17:3) | (21:14:6) | (21:11:9) |
| (P/S) | (0.14) | (0.29) | (0.43) |
| Fat: | | | |
| Coconut oil | 0 | 0 | 0 |
| Canola oil | 0 | 0 | 0 |
| Palm stearine | 0 | 0 | 0 |
| Butter (80% fat) | 0 | 0 | 0 |
| Tallow | 0 | 0 | 0 |
| Lard | 0 | 0 | 0 |
| Soybean oil | 0 | 0 | 0 |
| PKO | 120 | 120 | 120 |
| High oleic sunflower oil | 74 | 52 | 31 |
| Hi 18:2 Safflower oil | 6 | 28 | 49 |
| Mineral mix (Ausman - Hayes) | 50 | 50 | 50 |
| Vitamin mix (Hayes - Cathcart) | 12 | 12 | 12 |

TABLE 1SB-continued

Study 3 Table 1B. Diet composition for gerbils study (PKO vs COCO vs AFB)

| INGREDIENT | Diet (gram per 1.0 kilo) | | |
|---|---|---|---|
| | 697 PKO/HOSun/SAF 60/37/3 | 698 PKO/HOSun/SAF 60/26/14 | 699 PKO/HOSun/SAF 60/15.5/24.5 |
| Choline chloride | 3 | 3 | 3 |
| Cholesterol | 0.8 | 0.8 | 0.8 |

Take 60 g cornstarch + 800 ml water to make gel (1.0 kg diet).
†Added cholesterol + cholesterol provided by fats

TABLE 16A

Study 3 Table 2A. Fatty acid profile of dietary fat (Gerbils Study PKO vs COCO vs AFB)

| | Diet | | |
|---|---|---|---|
| | 694 PKO/HOSun/SAF 30/59/11 | 695 AFB* | 696 COCO/Canola/Palm st. 40/32/28 |
| | Fatty acid % | | |
| 8:0 + 10:0 | 1.8 | 1.0 | 6.4 |
| 12:0 | 14.2 | 0.6 | 18.0 |
| 14:0 | 4.8 | 4.0 | 8.4 |
| 16:0 | 5.6 | 22.9 | 19.3 |
| 18:0 | 4.1 | 14.1 | 4.5 |
| 18:1 | 54.4 | 34.4 | 25.5 |
| 18:2 | 14.7 | 12.0 | 9.0 |
| 18:3 | 0.1 | 1.7 | 3.9 |
| Total Sats | 30.5 | 42.6 | 56.6 |
| Total Monos | 54.4 | 36.7 | 25.5 |
| Total Polys | 14.8 | 13.7 | 12.9 |
| PIS | 0.48 | 0.32 | 0.23 |
| S:M:P in diet | 13:22:6 | 18:15:6 | 24:11:5 |
| PUFA % diet en | 6.1 | 5.6 | 5.2 |

*AFB = blend of 20% Butter + 48% Tallow + 16% Lard + 16% Soybean oil

TABLE 16B

Study 3 Table 2B. Fatty acid profile of dietary fat (Gerbils Study PKO vs COCO vs AFB)

| | Diet | | |
|---|---|---|---|
| | 697 PKO/HOSun/SFA 60/37/3 | 698 PKO/HOSun/SFA 60/26/14 | 699 PKO/HOSun/SFA 60/15.5/24.5 |
| | Fatty acid % | | |
| 8:0 + 10:0 | 3.6 | 3.6 | 3.6 |
| 12:0 | 28.4 | 28.4 | 28.4 |
| 14:0 | 9.6 | 9.6 | 9.6 |
| 16:0 | 6.9 | 7.3 | 7.6 |
| 18:0 | 3.4 | 3.1 | 2.8 |
| 18:1 | 40.6 | 33 | 25.7 |
| 18:2 | 7.3 | 14.8 | 22.1 |
| 18:3 | 0.0 | 0.1 | 0.1 |
| Total Sats | 51.9 | 52.0 | 52.0 |
| Total Monos | 40.6 | 33 | 25.7 |
| Total Polys | 7.3 | 14.9 | 22.2 |
| PIS | 0.14 | 0.29 | 0.43 |
| S:M:P in diet | 21:73:3 | 21:14:6 | 21:11:9 |
| PUFA % diet en | 3.0 | 6.1 | 9.1 |

TABLE 17A

Study 3 Table 3A. Body and organ weights, blood glucose and plasma lipids of gerbils fed experimental diets for 4 weeks (PKO vs COCO vs AFB)

| INGREDIENT | Diet | | |
|---|---|---|---|
| | 694 PKO/HOSun/SAF 30/59/11 | 695 AFB | 696 COCO/Canola/Palm s. 40/32/28 |
| CHO:Fat:Protein (% en) | 41:41:18 | 41:41:18 | 41:41:18 |
| Kcal/j | 4.3 | 4.3 | 4.3 |
| Body weight (g) | | | |
| Initial | 55 ± 4 | 55 ± 3 | 55 ± 3 |
| Final | 67 ± 3 | 67 ± 6 | 70 ± 4a, b, c |
| Gain (g/d) | 0.39 ± 0.13 | 0.42 ± 0.22 | 0.54 ± 0.16a, b, c |
| Food intake | | | |
| (g/d) | 5.5 ± 0.2a | 5.3 ± 0.3b | 6.2 ± 0.4 |
| (Kcal/d) | 24 ± 1a | 23 ± 1b | 27 ± 2a, b, c, d, e |
| Water intake (ml/d) | 5.6 ± 0.8 | 5.9 ± 1.1 | 6.5 ± 1.8a |
| Random B gluc 4th (mg/dl) | 88 ± 9a | 86 ± 7 | 92 ± 5b, c |
| Fast B gluc after 4 wk (mg/dl) | 114 ± 26 | 98 ± 19 | 98 ± 25 |
| Organ weight (% BW) | | | |
| Liver | 3.75 ± 0.24 | 3.67 ± 0.22 | 3.80 ± 0.67 |
| Kidney | 0.79 ± 0.05 | 0.78 ± 0.04 | 0.89 ± 0.15 |
| Cecum | 2.47 ± 0.30 | 2.65 ± 0.48 | 2.37 ± 0.60 |

TABLE 17A-continued

Study 3 Table 3A. Body and organ weights, blood glucose and plasma lipids of gerbils fed experimental diets for 4 weeks (PKO vs COCO vs AFB)

| | Diet | | |
|---|---|---|---|
| INGREDIENT | 694 PKO/HOSun/SAF 30/59/11 | 695 AFB | 696 COCO/Canola/Palm s. 40/32/28 |
| Adipose | | | |
| Perirenal | 1.35 ± 0.47a | 1.19 ± 0.49 | 1.51 ± 0.45b, c |
| Epididymal | 1.55 ± 0.45 | 1.48 ± 0.43 | 1.54 ± 0.32 |
| Omental | 0.63 ± 0.22 | 0.59 ± 0.19 | 0.61 ± 0.12 |
| Inguinal | 0.84 ± 0.34 | 0.72 ± 0.21 | 0.90 ± 0.24 |
| Brown fat | 1.54 ± 0.28 | 1.37 ± 0.50 | 1.55 ± 0.35 |
| Total adipose | 5.92 ± 1.20a | 5.34 ± 1.62 | 6.10 ± 1.10b, c |
| Carcass | 75.0 ± 0.9a | 73.7 ± 1.6a, b, c, d | 74.0 ± 0.9 |
| Plasma | | | |
| TC (mg/dl) | 158 ± 19a | 193 ± 47a, b, c, d | 180 ± 35e |
| VLDL-C (mg/dl) | 45.6 ± 11.9 | 48.6 ± 16.4 | 37.5 ± 8.4 |
| LDL-C (mg/dl) | 32.7 ± 13a | 47.2 ± 3.9 | 64.7 ± 18.8a, b, c, d |
| HDL-C (mg/dl) | 75.0 ± 7.6 | 81.1 ± 4.2 | 84.8 ± 22.3 |
| LDL-C/HDL-C ratio | 0.44 ± 0.03a, b | 0.58 ± 0.02a, c, d, e | 0.76 ± 0.03b, f, g, h |
| HDL-C (% of total) | 49 ± 3 | 46 ± 4a, b, c | 45 ± 2d, e, f |
| TG (mg/dL) | 110 ± 91 | 166 ± 204a | 76 ± 36 |

Values are mean ± SD (n = 8, except for lipoproteins obtained by ultracentrifugation of 3 samples, each representing combined plasma from 2 gerbils)
a, b, c, d . . . Means in a row sharing a common superscript are significantly different ($p < 0.05$) using one-way ANOVA and Fisher's PLSD test

TABLE 17B

Study 3 Table 3B. Body and organ weights, blood glucose and plasma lipids of gerbils fed experimental diets for 4 weeks (PKO vs COCO vs AFB)

| | Diet | | |
|---|---|---|---|
| INGREDIENT | 697 PKO/HOSun/SAF 60/37/3 | 698 PKO/HOSun/SAF 60/26/14 | 699 PKO/HOSun/SAF 60/15.5/24.5 |
| CHO:Fat:Protein (% en) | 41:41:18 | 41:41:18 | 41:41:18 |
| Kcal/ | 4.3 | 4.3 | 4.3 |
| Body weight (g) | | | |
| Initial | 55 ± 3 | 55 ± 2 | 55 ± 3 |
| Final | 64 ± 7a | 64 ± 4b | 64 ± 4c |
| Gain (g/d) | 0.32 ± 0.21a | 0.33 ± 0.13b | 0.32 ± 0.14c |
| Food intake | | | |
| (g/d) | 5.5 ± 0.4c | 5.5 ± 0.5d | 5.5 ± 0.3e |
| (Kcal/d) | 24 ± 2c | 24 ± 2d | 24 ± 1e |
| Water intake (ml/d) | 6.1 ± 1.0 | 5.8 ± 0.9 | 4.8 ± 0.9a |
| Random B glue 4th (mg/dl) | 92 ± 11d, e | 80 ± 6a, b, d | 83 ± 8c, e |
| Fast B glue after 4 wk (mg/dl) | 99 ± 19 | 99 ± 8 | 108 ± 13 |
| Organ weight (% BW) | | | |
| Liver | 3.84 ± 0.46 | 3.68 ± 0.10 | 3.48 ± 0.29 |
| Kidney | 0.85 ± 0.04 | 0.87 ± 0.13 | 0.84 ± 0.14 |
| Cecum | 2.30 ± 0.70 | 2.45 ± 0.34 | 2.21 ± 0.36 |
| Adipose | | | |
| Perirenal | 0.90 ± 0.47a, b | 1.01 ± 0.31c | 1.18 ± 0.36 |
| Epididymal | 1.08 ± 0.41 | 1.27 ± 0.28 | 1.42 ± 0.34 |
| Omental | 0.44 ± 0.17 | 0.44 ± 0.13 | 0.56 ± 0.19 |
| Inguinal | 0.80 ± 0.23 | 0.70 ± 0.24 | 0.70 ± 0.26 |
| Brown fat | 1.35 ± 0.40 | 1.32 ± 0.31 | 1.42 ± 0.42 |
| Total adipose | 4.56 ± 1.41a, b | 4.73 ± 0.88 | 5.27 ± 1.36 |
| Carcass | 75.1 ± 1.4b | 74.9 ± 1.4c | 75.6 ± 0.8d |
| Plasma | | | |
| TC (mg/dl) | 153 ± 14b | 160 ± 21c | 150 ± 32d, e |
| VLDL-C (mg/dl) | 30.0 ± 19.5 | 31.7 ± 12.1 | 28.1 ± 15.6 |
| LDL-C (mg/dl) | 39.1 ± 8.6b | 41.5 ± 9.0c | 40.1 ± 9.3d |
| HDL-C (mg/dl) | 84.7 ± 5.3 | 87.2 ± 9.1 | 83.6 ± 16.5 |

TABLE 17B-continued

Study 3 Table 3B. Body and organ weights, blood glucose and plasma lipids of gerbils fed experimental diets for 4 weeks (PKO vs COCO vs AFB)

| | Diet | | |
|---|---|---|---|
| INGREDIENT | 697 PKO/HOSun/SAF 60/37/3 | 698 PKO/HOSun/SAF 60/26/14 | 699 PKO/HOSun/SAF 60/15.5/24.5 |
| LDL-C/HDL-C ratio | 0.46 ± 0.09c, f | 0.47 ± 0.06d, g | 0.48 ± 0.02e, h |
| HDL-C (% of total) | 56 ± 8a, d | 55 ± 4b, e | 56 ± 4c, f |
| TG (mg/dL) | 63 ± 40a | 69 * 36 | 74 ± 40 |

Values are mean ± SD (n = 8, except for lipoproteins obtained by ultracentrifugation of 3 samples, each representing combined plasma from 2 gerbils)
a, b, c, d . . . Means in a row sharing a common superscript are significantly different (p < 0.05) using one-way ANOVA and Fisher's PLSD test Gerbil Studies 4 and 5. Summary Gerbil studies 4 and 5 were designed to gain further insight into which specific saturated fatty acids (SFA) containing from 12 to 18 carbon atoms (12:0 to 18:0) would be most beneficial for various aspects of lipid metabolism and body growth. By way of review, SFA are expected to raise both HDL "good" cholesterol and LDL "bad" cholesterol, while polyunsaturated fatty acids (PUFA) are expected to lower overall cholesterol levels, usually starting with LDL, but also affecting HDL. Applicant hypothesized that it may be possible to create an improved (or even optimal) natural fat blend that provides an adequate amount of certain SFA to beneficially raise HDL, plus an adequate amount of PUFA to selectively lower LDL without substantially lowering HDL. Therefore, an important objective is to raise HDL, lower LDL, and decrease the ratio of LDL to HDL cholesterol in the plasma, all while also preferably lowering total cholesterol (TC).

Tables 8-10 (Study 4 Tables 1-3 (4-1 through 4-3)) definitely reveal that high-PUFA (BE %) greatly improves several aspects of lipid metabolism compared to low-PUPA (4.5E %) within the study diets. Secondly, the study reveals that when accompanied by adequate and equal amounts of 18:2, PKO (rich in 12:0 and 14:0) is surprisingly more effective than PO (rich in 16:0 and 18:0) for lowering TC, LDL, and TG, as well as beneficially lowering the LDL/HDL ratio. The positive impact of PKO is most apparent at high-PUFA intake (especially 18:2), indicating the clear interaction between PKO and PUFA intake. For instance, it is apparent that the much reduced TC and lower LDL/HDL ratio reflects the dramatic decline in LDL. Because the level of HDL did not significantly decline even though total TC and LDL-C did, the overall percent of HDL also increased substantially with PKO. This HDL increase occurred at BOTH intakes of PUFA, which is interesting and uniquely linked to PKO intake.

Study 5 (Tables 11-13 (5-1 through 5-3)) again examines the difference between PKO and PO as the source of SFA to confirm the surprising observations in Study 4, i.e., favoring the PKO fat blends. Because the results of Studies 4 and 5 were not statistically different, it was possible to pool the two cohorts from both studies (three groups in the case of PO diets because of similar 702 and 702A diets in study 5), resulting in animal group numbers of n=18 and 24 and more powerful statistics (Table 14 (Combined Studies 4 & 5 Table 1 (4/5-1)). Again, it was confirmed that the lipoprotein profile was better with the PKO fat blend than with the PO fat blend, and that the PKO-fed gerbils accumulated less body fat, especially the undesirable perirenal fat (intra-abdominal) that is associated with the detrimental metabolic syndrome in humans.

Moreover, the PKO-fed gerbils developed healthier carcass mass (mass as % body weight, representing muscle), even as they accumulated less body fat. Growth efficiency and body fat were strikingly different between PKO and coconut oil, with PKO being substantially less efficient and potentially healthier in terms of total weight gain and fat deposited (35% less weight gained per calories consumed (Table 13 (5-3)). It is possible that PKO better allows calories to be diverted to tissue growth or dissipated as heat rather than stored as fat in the case of other fats. This phenomenon might primarily apply during the animal growth phase when 12:0+14:0 energy can be better shuttled into carcass growth. However, it is still surprising that the LDL/HDL ratio is so low with PKO, and that COCO is similarly effective, although the COCO-associated increases in adipose are not beneficial in some circumstances, especially for adults.

As mentioned above, in Study 5 the blended fat containing coconut oil (COCO) was added for comparison with the PKO and PO groups. In Study 5, all fats contained higher PUPA levels at 13% E, so that the dietary energy (E) provided by these fatty acids (EPA level) was not limiting. It is noted however, that with a lower PUPA level at only 4.5% E in study 4, the EPA level was barely adequate for this high dietary fat intake (40% E) with high SPA content. The fatty acid make-up of COCO is much like PKO except for the higher proportion (2.5× more) of oleic acid (18:1) in PKO. This increased proportion of oleic acid substantially reduces the proportion of trisaturated triglyceride molecules in PKO. Accordingly, the oleic acid also decreases the amount of triglyceride containing a saturated fatty acid at the biologically sensitive middle position (the sn-2 position) of the molecule.

Therefore, it was interesting and surprising to find a striking difference in certain aspects of fat metabolism and lean body growth comparing COCO and PKO fats as well as contrasting with PO metabolism. A slight reduction in gerbil caloric intake for PKO in Study 5 was not apparent when the Study 5 results were combined with Study 4 thereby strengthening the statistical comparison between PKO and PO. Although dietary intake of COCO produced TC values and lipoprotein profiles similar to those of PKO in Study 5, perirenal fat was greater with COCO. Interestingly, COCO-fed gerbils also accumulated a level of total fat (as a weight percentage) that was greater than that accumulated in PKO-fed gerbils. The latter gerbils accumulated the smallest amount of total body fat among all groups (Table 13 (5-3)).

Therefore, PKO unexpectedly and uniquely appears to alter energy utilization, favoring lean body mass (muscle). This finding contrasts with the fat reserves favored by COCO, and to a lesser extent by PO. This result also suggests that the triglyceride molecular structure may be a critical variable, and that a saturated fatty acid at the middle location (sn-2) in the triglyceride molecule, e.g., in COCO fat molecules, is a critical differential effector of this fat metabolism. In other words, PKO appears to contain enough 18:1 to limit the number of trisaturated triglyceride molecules, whereas COCO fat and the highly saturated forms of palm fat containing little 18:1 and abundant palmitic acid (16:0) at the sn-2 location in the triglyceride molecule may have undesirable lipoprotein consequences.

In this series of gerbil studies that compare several diverse natural fat blends, PO-rich experimental fat produce the poorest UH ratio, because it produces the highest level of LDL. This suggests that fats rich in 12:0 and 14:0 are preferable to a fat rich in 16:0 and 18:0 with regard to lipoprotein metabolism, when animals are fed an adequate proportion of PUPA (in relation to total fat intake) and limited amounts of cholesterol. For example, Applicant has previously shown that dietary cholesterol interacts with 16:0 to raise LDL more than it does with other diet fatty acids (Pronczuk et al, FASEB J 8:1191, 1994).

Applicants have found no previous nutritional study on lipoprotein metabolism in which these two fats, PO and PKO, were compared side-by-side in the same nutritional study with equal percentages of energy provided by fat, and where an adequate and equal amount of 18:2 was present in both diets to validate the comparison between saturated fatty acid exchanges. This is an important point because intake of 18:2 significantly controls all fat metabolism (Hayes, K. C., Khosla, P. Dietary fatty acid thresholds and cholesterolemia. FASEB J. Q:2600-07, 1992), and it is well established that changing any one of numerous nutritional or physiological variables in a nutritional fat study can substantially alter the lipoprotein profile obtained from a group of human subjects or animal models. Thus, changing more than one variable at a time between diets precludes accurate interpretation of how each variable might contribute to the response observed. These critical variables include, but are not limited to: (a) the age and gender of the animals, (b) the percent of dietary calories, i.e., percent energy being supplied by fat, (c) the percents of energy being supplied by each saturated fatty acid and polyunsaturated fatty acids (assuming monounsaturated fat is maintained constant), (d) the level of cholesterol supplied in the diet, (e) the daily total calorie intake, and (f) the sources and relative amounts of protein, carbohydrate and fiber in the diet.

Applicants have also not found any nutritional study in which the effects of PKO and coconut oil (COCO) on lipoprotein metabolism were compared directly in the same study. These two saturated fats (PKO and COCO) have been considered essentially "unhealthy" and have been largely ignored for several reasons. While coconut oil has been commercially available for many decades, it is relatively expensive, is available in limited supply and used more for personal care cosmetic applications than as a nutritional fat. On the other hand, PKO has been available in commercial quantities only more recently (as a secondary product from increased palm oil production since the 1980s), and has been principally utilized in nutrition as a less costly substitute for cocoa butter in confections.

Moreover, myristic acid (C14:0) (and to a lesser extent lauric acid (C12:0) as one of the principal saturated fatty acids in both PKO and coconut oil, has been considered a hypercholesterolemic fatty acid to be largely avoided, particularly if palm oil [containing predominantly palmitic acid, (C16:0)] is available as an alternative and less costly saturated fat. Applicants have made this point in U.S. Pat. Nos. 5,578,334 and 5,843,497 among others. More specifically, Applicants showed that in diets and dietary fats that are substantially free of cholesterol, palmitic acid as supplied by palm oil is a relatively "neutral" fat that does not significantly increase plasma TC (Khosla, P., K. C. Hayes. Dietary palmitic acid raises plasma LDL cholesterol relative to oleic acid only at a high intake of cholesterol. Biochim. Biophys. Acta. 1210: 13, 1993). On the other hand, Applicants showed that coconut oil providing high levels of myristic and lauric acid tends to increase plasma TC (Pronczuk et al., FASEB J. 8 (1994) 1191-1200]).

Given the above history concerning the hyperlipemic effects of fats rich in 12:0+14:0, it was not anticipated that palm kernel oil could function as a healthier dietary saturated fat than palm oil. Yet this has been demonstrated by the gerbil studies provided herein with Diets 700-704 (Studies 4 & 5) as well as the Study 3 diets. For both "low" and "high" dietary levels of polyunsaturated fat (4.5% and 13% respectively of dietary energy provided by linoleic acid), PKO outperformed PO with regard to lowering the plasma levels of TC, VLDL, LDL, and TG, as well as beneficially increasing or at least maintaining the proportion of HDL (as a percentage of TC) when the same amount of 18:2 was made available in the two diets.

Of additional significance, the gerbils (the most sensitive of all mammals in their cholesterol response to diet fat) were challenged with a relatively high level of dietary cholesterol, that reflects the amounts consumed (on a caloric basis) in a Western diet by many Americans and Europeans. Diet cholesterol is important because the present study indicates that animals consuming lauric and myristic acid as their principal saturated fatty acids (in a PKO-containing diet) are more resistant to the adverse effects of moderate to high dietary cholesterol on their lipoprotein profile than animals consuming palmitic acid as their principal saturated fatty acids (in a palm oil or palm stearin-containing diet). This would be consistent with previous studies by Applicants [see diets 13-15 compared to 10-12 in Table 3, Pronczuk et al., FASEB J. 8 (1994) 1191-1200 and FIG. 1] in which plasma TC levels in gerbils increased relatively less in a coconut oil (lauric and myristic acid)-rich diet compared to a palm oil/palm stearin (palmitic acid)-rich diet when dietary cholesterol was increased from 0.02% to 0.08% of the diet (47-189 mg cholesterol/1000 kcal).

In fact, at the highest level of dietary cholesterol (0.08%), the coconut oil and the palm oil-based diets produced essentially the same plasma levels of TC in gerbils, because the incremental increase due to diet cholesterol was less with coconut oil than the increase in the presence of palm oil. (See also FIG. 1.) Nonetheless, there was no reason to believe that in the present study that PKO, like coconut oil with its high levels of lauric and myristic acids, would provide a natural saturated fat or hard stock that would be superior to palm oil and/or palm stearin in the final level of TC produced.

However, with the present gerbil study lipoprotein results (see especially diets 700 through 703), it is apparent that PKO is indeed surprisingly superior to palm oil in direct comparison when additionally challenged with dietary cholesterol. In that sense, PKO performed quite differently from coconut oil (that was not superior to palm oil in Pronczuk et al) in spite of a remarkably similar saturated fatty acid profile (see Table 1, Dubois et al., Eur. J. Lipid Sci. Technol. 109 (2007) 710-732). These comparisons of PKO vs. palm oil and coconut oil vs. palm oil and PKO vs. coconut oil were conducted in comparable gerbil studies by Applicants in which dietary cholesterol, the percent energy from fat, and other critical parameters were essentially the same. From a comparison of the fatty acid profiles of coconut and palm kernel oils in Dubois et al., it is evident that coconut oil contains an 11% higher overall level of saturated fatty acids (93% vs. 82%), while the relative population distribution of other saturated carbon chain lengths (from C8:0 to C18:0) is quite similar. There is a preponderance oflauric acid (48% and 46%) and myristic acid (19% and 18%) respectively for coconut oil compared to PKO.

Accompanying its lower level of saturated fatty acids, PKO contains almost 20% of unsaturated fatty acids (18:1+ 18:2) while coconut oil contains only 7%. Thus, PKO is expected to contain an approximately 2.8-fold (2017) lower level of trisaturated triglyceride molecules than coconut oil by virtue of the inclusion of these extra unsaturated fatty acids. Or stated another way, more than half the triglyceride molecules in PKO would appear to be beneficially non-trisaturated triglycerides, whereas no more than 20% would have that attribute in coconut oil with its much lower level of unsaturated fatty acids. The structure of coconut oil with lauric and myristic acids occupying almost all sn-2 or middle positions (as well as most sn-1,3 positions) on the triglyceride molecule is not surprising (see FIG. 1 in Suzuki et al., Nutrition Research 28 (2008) 258-262).

Figure 2:
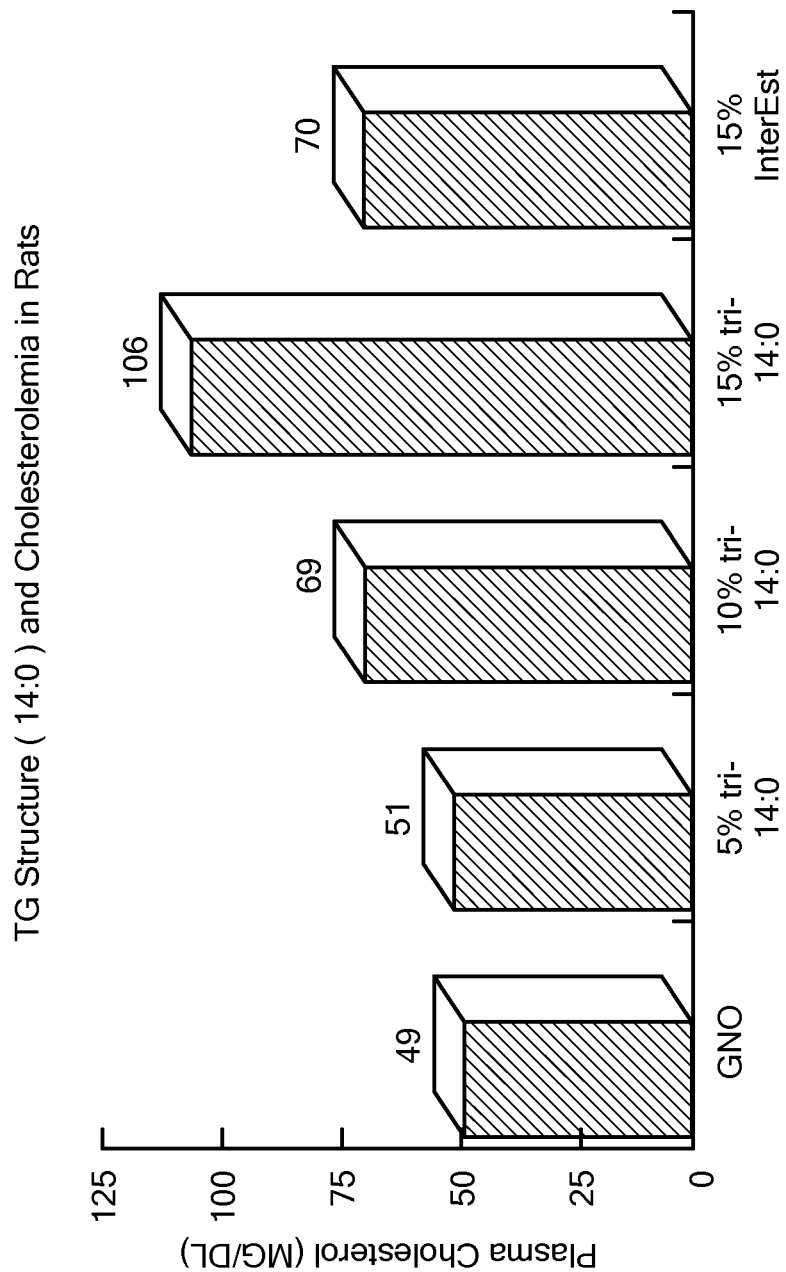
FIG. 2 is a graph showing the cholesterolemic effects in rats of increasing amounts of dietary tri-myristin and the effect of reducing tri-myristin by interesterification.

Finally, the data of Mukerjee et al., J. Athero. Res. 10 (1969) 51, are compelling when viewed in conjunction with the present studies because they clearly show the benefit of interrupting the trimyristin molecular structure of added 14:0 provided in a blend that incorporates peanut oil (aka, groundnut oil or GNO). By disrupting the tlimyristin structure by interesterification using the unsaturated fatty acids provided in GNO, the cholesterol-raising capacity of the trimyristin component was decreased by 34%. (See article FIG. 2.)

Collectively, these observations are a significant discovery in understanding how to adjust and improve the types of dietary fats consumed, with regard to lipoprotein metabolism. Applicant's findings help explain the benefit and superiority of PKO over coconut oil because trisaturated triglycerides are generally known to promote hypercholesterolemia (Hayes. Synthetic and modified glycerides: effects on plasma lipids. Current Opinions in Lipidology !2: 55-60, 2001). It is apparent from our data in gerbils, that the disruption by unsaturated fatty acids (i.e., oleic and linoleic acids) of trisaturated triglyceride structures that still contain substantial levels of lauric and/or myristic acid, presumably in the central, i.e., sn-2 position, has beneficial effects in lowering TC, LDL, VLDL and TG while beneficially increasing the ratio of HDL to TC.

In addition to the plasma triglyceride profile advantages (lower TG) provided by the present dietary fats, an advantageous increase in the growth of muscle and bone (indicated as carcass weight as percent of body weight) and/or decrease in total adipose and/or perirenal adipose tissue. That is, it was observed that the combination of 12:0 and 14:0 saturated fatty acids was able to increase the growth of muscle and bone (measured as carcass weight) in the presence of adequate 18:2 (Diet 703), a discovery which is both surprising and potentially significant.

In other animal model studies (Chaabo et al. 2010, Noda et al. 2010), Applicants have found that diabetes develops in African grass rats whose lean carcass mass increases more slowly than rats with more rapid carcass growth (for rats of the same gender, age, and energy intake). The lean carcass weight is defined as the weight obtained after all organs are removed, essentially reflecting muscle, bone and skin. At the same time the blood lipids, especially the TG, in the same slower growing rats become elevated as diabetes develops. In the present gerbil study described herein, just the opposite effect is observed, i.e., increasing muscle mass (carcass) allowed the animals to more metabolize blood lipids, i.e., TG, VLDL, and LDL are decreased in Diet 701 versus 700, and in Diet 703 versus 702, thereby removing these two lipoproteins from circulation. It is noteworthy that HDL did not decrease as a function of increased levels of C12:0 and C14:0 fatty acids (in keeping with the fact that catabolism of VLDL enhances HDL formation), and that the percent of HDL and even the HDL:TC ratio was increased by the PKO diets.

It is not clear how the above-described improvement in lipoprotein profile is achieved by the C12:0 and C14:0 fatty acids, or why these fatty acids appear to function best with an apparent abundance of polyunsaturates, i.e., C18:2linoleic acid (Diets 702 and 703). Most likely the explanation lies in the fact that C18:2 is required (as an essential fatty acid) for phospholipid and cell membrane synthesis and functioning that accompanies rapid growth in animals. This expanded synthesis and growth, in turn, leads to increased removal of circulating LDL cholesterol, also needed for cell membrane formation. In addition, it is likely that an undefined cell signal derived from C12:0 and C14:0-Lich molecules, such as DAG, initially stimulates cell growth. It is worthwhile noting that all nurturing fats (milks in all mammals) are rich in C12:0 and C14:0. Similarly, tropical seed fats (like PKO and coconut oil) contain high levels of these two fatty acids, presumably to assure rapid growth in these germinating plants where heat stress is an environmental factor and rapid growth is necessary for competitive survival.

As indicated above, when incorporating myristic and lauric acid, it is beneficial to balance the levels of these fatty acids in a manner which reflects the relative levels at which they occur in natural sources of these oils. It should be recognized that humans and other animals are adapted to utilize food sources that include triglycerides containing a mixture of different fatty acids, especially covering chain lengths from about C6 to CIS. For myristic acid (C14:0) and lauric acid (C12:0) the practical sources are palm kernel oil, milk fat, and coconut oil. In general and consistent with these natural sources of myristic acid and lauric acid, it is desirable for the ratio of myristic acid to lauric acid in the present fat composition to be in a range from 4:1 to 1:4, or more narrowly 3:1 to 1:3, 2:1 to 1:2, or about 1:1. Further, it should be recognized saturated fatty acid residues of triglycerides are metabolized differently depending, in part, on their chain lengths, including being metabolized at differing rates, and in some cases being transported and/or metabolized, at least in part, by different mechanisms. As a result, it can be beneficial to include appreciable but limited levels of other saturated fatty acids in addition to myristic acid and lauric acid in order to smooth out fatty acid metabolism over time and to invoke the different pathways. That is, heterogeneity of chain length is desirable. Thus, shorter chain and/or longer chain fatty acids can be included within the limitations of this invention. In many case, C6, C8, C10, C16, and/or C18 saturated fatty acids will be present at individual levels of about 1, 2, 3, 4, 5, 7, 8, 9, or 10% by weight (or in a range defined by taking any two of the just specified values), although in some cases one or more of these fatty acids may be present at a higher level still within the overall limit on saturated fatty acids in the present compositions. Additionally, beneficial limitations on the level of palmitic acid (C16:0) are discussed elsewhere herein.

The present dietary fats rich in myristic acid and lauric acid can be used in a variety of edible compositions and incorporated in diets in many different ways, e.g., in compositions and diets as indicated in Sundram et al., U.S. Pat. No. 5,578,334, U.S. Pat. No. 5,843,497, U.S. Pat. Nos. 6,630,192 and 7,229,653 each of which is incorporated herein in its entirety.

In preparing some dietary fats (e.g., in certain margarines and other spreads, as well as in shortenings), it is desirable to increase the melting point (often the Mettler drop point is used as a measure of melting point). To do so, an amount of a higher melting point fat or combination of fats can be incorporated, e.g., about 4 to 25%. Preferably the higher melting point fat has a Mettler drop point higher than PKO, e.g., at least 30, 32, 35, 38, or 40 degrees C. It is also preferable to use natural fats rather than interesterified or hydrogenated fats.

In some cases, the higher melting point fat will be or include a higher stearic acid content fat, preferably from a vegetable source or sources. Examples of such high stearic acid content fats include shea butter and/or natural high stearic fat (such as soybean oil from a high stearic acid soybean variety). High stearic acid content soybean oil is available from an engineered soybean variety in which the stearic acid is to a significant extent present in the form of di-saturated triglycerides, with the two stearic acid residues at the sn-1,3 positions. Inclusion of such high stearic acid content fat is largely neutral in cholesterolemic effect; this is consistent with stearic acid being a poorly metabolized fat. Less desirably because it is not a natural fat, fully hydrogenated soybean oil can be used.

In other applications, it is desirable to harden the fat composition while retaining the beneficial fatty acid composition profiles based on natural oils, using hardstock fats which include large fractions of other saturated fatty acids. Examples include palm oil and palm stearin, which can be used singly as hardening oils, or in combination and/or in combination with a high stearic acid content oil. Palm oil is beneficial as it is comparatively low in tri-saturated triglyceride molecules. Instead it has a high content of sn-1,3 palmitate, many with oleic acid or linoleic acid at the sn-2 position. While palm stearin can be used for hardening, it is less desirable to use only palm stearin (or primarily palm stearin) as the hardening component due to its high content of trisaturated triglycerides, primarily tri-palmitin.

For many spreads or other higher melting point compositions, about 4-8% by weight (as a percentage of the total fat/oil portion of the spread or other composition) palm stearin will provide sufficient hardening and about 10-25% by weight palm oil will provide approximately equivalent hardening. As indicated above, hardening can be accomplished using palm oil, palm stearin, a high stearic acid content fat (e.g., shea butter, fully hydrogenated soybean oil, and high stearic acid content soybean oil), or any combination of these components (e.g., a combination of palm oil and palm stearing, or a combination of palm oil and a high stearic acid content oil, or a combination of palm oil, palm stearin, and a high stearic acid content fat). As a result, examples of advantageous spreads can include a hardening fat, for example, 5-25% by weight palm oil with 0-10 percent palm stearin and 0-10 percent of a high stearic acid content oil (e.g., shea butter, fully-hydrogenated soybean oil, natural high-stearic fat soybean oil from a high-stearic acid soybean variety (or high stearic acid fat from another vegetable source), preferably where the total percentage of hardening fat does not exceed 25% by weight of the blended fat composition. In particular blends, the blend includes 5-10%, 5-15%, 5-25%, 10-15%, 10-20%, 10-25%, or 15-25% palm oil. In further particular blends, in addition to a percentage of palm oil as just specified, the oil blend includes 1-3, 1-5, 2-3, 2-4, 2-5, 3-5, 3-7, 3-10, or 5-10% by weight palm stearin or 1-3, 1-5, 2-3, 2-4, 2-5, 3-5, 3-7, 3-10, or 5-10% by weight high stearic acid content fat (e.g, shea butter, fully hydrogenated soybean oil, high stearic acid content soybean oil, or a combination of 2 or 3 of these fats) or percentages of palm stearin and high stearic acid content fat respectively as just specified, in which preferably the total percentage of palm oil, palm stearin, and high stearic acid content fat does not exceed 25% of the fat/oil portion of the composition, and more preferably does not exceed, 20, 17, 15, 12, or 10% by weight of the fat/oil portion of the composition.

In utilizing hardening fats, it is desirable to select fats which contain a high percentage of symmetrical disaturated triglycerides, i.e., the triglycerides have a SOS configuration (the saturated fatty acids are at the sn-1 and sn-3 positions with a monounsaturated fatty acid (usually oleic acid) or a polyunsaturated fatty acid (usually linoleic acid) at the sn-2 position. Such a fat can, for example, desirably contain at least 50, 60, 70, or 80, or 90% of sn-1,3 disaturated triglycerides. At the same time it is desirable the selected hardening fat contain a comparatively low percentage of trisaturated triglycerides (i.e., having the SSS configuration) . For example, desirable hardening fats may contain no more than 10, 8, 7, 6, 5, 4, 3, 2, or even 1% by weight trisaturated triglycerides. Particularly desirable hardening fats will contain sn-1,3 disaturated triglycerides at one of the percentages or percentage ranges specified in this paragraph and trisaturated triglycerides at a percentage or percentage range as also specified in this paragraph. For example, a desirable hardening fat may contain at least 60% by weight disaturated triglycerides and no more than 5% by weight trisaturated triglycerides.

Most commonly the saturated fatty acids in desirable hardening fats for this invention will be palmitic acid and/or stearic acid, with the result that the symmetrical disaturated triglycerides will most commonly have POP, POSt, and/or StOSt configurations, where "P" refers to a palmitate ester, "O" refers to an oleate ester, and "St" refers to a stearate ester. Some, most, or substantially all of the oleate ester can be replaced with linoleic acid moieties. In some cases, it is useful to utilize oil fractions which are enriched in the disaturated triglycerides, and reduced in the trisaturated triglycerides, and often reduced in low melting point triglycerides such as triglycerides which contain one or no saturated fatty acids. Some useful hardening fats of these types are referred to as "cocoa butter equivalents" or "CBE's", and can, for example, include palm oil, cocoa butter, shea butter, sal fat, illipe fat, kokum fat, or mango kernel fat, or mid-melting fractions and/or combinations of those fats/oils and/or fractions. Persons familiar with CBE's will recognize a variety of CBE's with a range of physical properties can be prepared using different blends of fats/oils having high disaturated triglyceride content. Persons skilled in preparing edible oil fractions will readily understand how to control the compositions of the fractions by controlling the fractionation conditions (e.g., melting or freezing separation temperatures used) to provide a desirable oil fraction high in the disaturated triglycerides and low in the trisaturated triglycerides.

Dietary Fat Testing

While it is recognized a variety of procedures and test systems may be used to evaluate the effects of different dietary fat compositions, the procedure described below using gerbils as the model system (substantially as used for the gerbil studies described herein and as described in Hayes et al., 2004, 1 Nutr 134:1395-1399) can advantageously be used to determine the effects on lipid profile, adipose deposition, and blood glucose levels of particular dietary fats, including dietary fats within the present invention.

Gerbils are obtained from a qualified vendor (eg, Charles River Labs, Wilmington, Mass.) at 50-55 g body weight. Animals are housed individually in a laboratory facility with conditioned air maintained between 68-72 degrees F. with 12 h light/dark cycle. Gerbils are fed a purified diet as described for the gerbil studies above, where total nutrients including carbohydrate, fat, and protein are standardized and held constant with an appropriate vitamin and mineral mixes. Only the fat composition is manipulated, while fat itself should be fed at approximately 40% of the calories, as described in tables herein. Food is fed ad libitum and weighed daily, while gerbils are given free access to water. Body weights are measured weekly for 4 wks, at which time animals are exsanguinated under anesthesia.

The plasma is separated by conventional methods, and lipoproteins are isolated by density-gradient ultracentrifugation as VLDL, LDL, and HDL, preferably using the method described in Chapman et al., 1981, J Lipid Res 22:339-358. Total plasma and isolated lipoprotein fractions are assayed for cholesterol with a standard enzymatic kit. Plasma TG is similarly measured with a conventional enzymatic kit configured for that purpose.

Appropriate control diets should be included, e.g., diets providing extremes in levels of saturated fatty acids versus linoleic acid, thereby providing standards for determining the effects in lipid/lipoprotein levels in response to test dietary fat compositions. At least a high saturated fat, low linoleic acid control diet should be included, but other controls can also be beneficial. For example, in one control diet the dietary fat can be provided by an oil high in saturated fatty acids and low in linoleic acid, eg. coconut oil, and in a second control diet the dietary fat can be provided by an oil low in saturated fatty acids but rich in linoleic acid (18:2), e.g., safflower oil. If desired, and additional intermediate control diets can be utilized, e.g., diet in which the dietary fat is provided by a high oleic acid oil with approximately equal levels of linoleic acid and saturated fatty acids, for example, olive oil.

An improved fat intended for consumption, e.g., human consumption, is one that reduces the LDL/HDL ratio and/or increases the HDL cholesterol as a percentage of total cholesterol compared to the high saturated fat control diet, preferably lowering LDL cholesterol without significantly decreasing, and preferably even increasing HDL. In cases where olive oil or similar intermediate control oil is used, preferably the improved fat results in a lower LDL/HDL ratio and/or increased HDL cholesterol as a percentage of total cholesterol than the intermediate control oil, e.g., olive oil.

H. Definitions

In the context of the present invention and the associated claims, the following terms have the following meanings:

As used herein in connection with this invention, the terms "fat" and "oil" are used interchangeably to refer to an edible triglyceride-based composition. Such fats and oils can be obtained from a variety of sources, such as plant, microbial, and animal sources.

The term "nutritional fat" or "dietary fat" or "triglyceride-based dietary fat" as used herein means any predominantly triglyceride molecule-based edible oil or fat, regardless of whether it is derived or purified from vegetable or animal sources, or is synthetic or semi-synthetic in origin, or some combination of these. A nutritional or dietary fat may also contain other constituents of choice such as monoglycerides, diglycerides, flavorings, fat-soluble vitamins, phytosterols and other edible ingredients, food additives, dietary supplements and the like. As taught in the present invention, certain of the dietary fat or oil-based composition can be formulated by chemically or genetically engineering a fat or oil using chemical or enzymatic interesterification to attach certain fatty acids (or remove certain fatty acids and attach others) to the glyceryl backbone of the fat. A nutritional or dietary fat can be interesterified by chemical and/or enzymatic methods known in the art using defined ratios of carefully controlled ingredients to produce certain predicted triglyceride products as taught herein.

The terms "natural fat" and "natural oil" refer to edible fats and oils which are extracted from animal, microbial, or preferably plant sources, or a fraction of such oil (e.g, a high melting or mid-melting fraction), that does not contain a significant level of triglyceride molecules which have been artificially structurally modified (e.g., by chemical or enzymatic interesterification), and preferably no such artificially structurally modified triglyceride molecules. The edible fat or oil may be from a single source or may be a blend from multiple sources.

As used in connection with structural changes to triglycerides, the term "chemically modified" means a structural change has been caused that changed (i.e., modified) the chemical structure of the triglyceride molecule. Such structural changes may, for example, be accomplished by synthetic chemical and/or by enzymatic processes.

An objective of the present invention is to provide at least one of the following beneficial effects: increase HDL "good" cholesterol, decrease total cholesterol (TC), decrease LDL "bad" cholesterol, and/or decrease the ratio of LDL to HDL cholesterol ratio in human plasma. Other beneficial effects can, for example, be to reduce VLDL cholesterol levels and/or fasting blood glucose levels and/or TG levels.

For some, but not all, of the fat compositions described herein it is beneficial that the resulting fat-based composition is substantially cholesterol-free because the presence of cholesterol degrades the lipoprotein profile, undesirably increasing LDL cholesterol and increasing the LDL/HDL ratio in the plasma. The term "substantially free" in reference to cholesterol level means that the dietary fat contains less than 10 mg cholesterol per serving of a food containing the dietary fat, more preferably less than 5 mg per serving, and most preferably less than 2 mg per serving to qualify as "cholesterol-free" under current U.S. FDA regulatory standards.

In reference to fatty acids and their attachment to the glyceryl moiety of the triglyceride molecule, there are three hydroxyl positions for esterification of the fatty acids. These positions allow for different triglyceride structural isomers, i.e., stereoisomers to be formed. The three points of attachment known as the sn-1, sn-2 and sn-3 positions have metabolic significance. While the physical properties of the fat (e.g., hardness, melting point crystal structure) are affected by each fatty acid attached at each position, the fatty acid at the middle or sn-2 position has the greatest impact on affecting the level of different plasma lipoproteins. This is because digestion and enzymatic hydrolysis by pancreatic lipase removes the sn-1 and sn-3 esterified fatty acids, leaving the sn-2 fatty acid monoglyceride to be absorbed into the bloodstream.

Use herein of the term "fatty acids" refers to such fatty acids esterified to a glycerol backbone. Primarily the fatty acids will be present as triglycerides, although appreciable amounts of di- and mono-glycerides may also be present, along with small amounts of free fatty acids.

Indication that a fat composition is "substantially free of tri-saturated triglycerides" or that "substantially none of the triglycerides are tri-saturated" and similar phrases means no more than 1% by number of the triglyceride molecules in the composition contain three saturated fatty acids. In some cases, the percentage will be lower, e.g., no more than 0.7, 0.5, 0.4, 0.3, or 0.2% by number.

As used herein, unless otherwise specified or clear from the context, percentages and their specified ranges are provided as weight percentage compositions such as "between 10% and 40% by weight linoleic acid" or from "10% to 40% linoleic acid"

Unless clearly indicated to the contrary, all range references specified herein include the endpoints of the range.

As used herein in the context of specification of percentages or ratios of types of fatty acids in a dietary fat composition, the term "and/or" means that the specification refers to either one of a pair, or to both of the pair individually, or to a combination of the pair of specific types or classes of fatty acids. Each distinct combination of composition levels is specifically included. For example, specifying that a composition contains at least 5 or 10% by weight myristic acid and/or lauric acid means that the composition may, for example, contain at least 10% myristic acid, or at least 5% lauric acid, or at least 10% myristic acid and at least 5% lauric acid, or contains a total at least 5% or 10% myristic acid plus lauric acid. As indicated, the other combinations of percentage compositions are also specifically included in this description example, e.g., with myristic acid and lauric acid each at the same level (i.e., at least 5% of each or at least 10% of each) or with at least 5% myristic acid and at least 10% lauric acid.

Dietary fat compositions as provided and calculated herein are expressed in terms of their fatty acid make-up on a weight percentage basis. For simplicity, the total weight percentage of fatty acids in triglyceride-based fats described herein is set to 100% (not ~95% as used in USDA tables). Thus, the ester-linked glyceryl carbon attached to each fatty acid is effectively added to that fatty acid because it facilitates calculations. This concept is described elsewhere herein by the following alternative words: "the sum of weight percentages for saturated, polyunsaturated and monounsaturated fat (and fatty acids) equals 100% (based upon the weights of esterified fatty acids in the composition)."

Current methods of chemical and enzymatic interesterification are not described herein because they are well known in the art and are described in the published literature.

The term "unsaturated fatty acids" as used herein refers to fatty acids containing at least one carbon-carbon double bond, and as such, includes all fatty acids except the saturated fatty acids. The most common unsaturated fatty acids include the monounsaturated fatty acid, oleic acid (18:1), and the polyunsaturated fatty acid, linoleic acid (18:2). The polyunsaturates also include the omega-3 fatty acids a-linolenic acid (18:3, n-3 or ALA), and the so-called long chain omega-3 polyunsaturated fatty acids, eicosapentaenoic acid (EPA) and docosahexaenoic acid (DHA). EPA (20:5, n-3) and docosahexaenoic acid (22:6, n-3) contain 5 and 6 double bonds in carbon chains of 20 and 22 carbon atoms.

As used in reference to components in the present compositions, the terms "principally" and "primarily" mean that the referenced component constitutes more than 50% of the indicated composition or combination of components, and in some cases may be significantly greater, e.g., at least 60, 70, 80, or 90%.

In reference to the present fat compositions, the term "balanced fat" and similar terms refer to a fat in which saturated fats, monounsaturated fats, and polyunsaturated fats constitute roughly equal amounts by weight of the fat composition, e.g, between about 0.5 and 2 for each of the pairwise weight ratios.

Indication that an edible oil is "rich in myristate" or "rich in laurate", or "rich in myristate and/or laurate" and similar terms means that the oil contains at least 10% by weight, and often at least 15, 20, 25, 30, 40, or 50% by weight of the specified fatty acids or combination of fatty acids.

As used herein, the term "livestock animal" refers to a vertebrate animal which is farmed or ranched or kept as a companion animal to a significant extent. In particular, livestock animals include bovines (such as cattle), equines, cap lines (such as domestic goats), ovines (such as domestic sheep), avians (such as chickens, turkeys, and ducks), picines (such as salmon, catfish, and tilapia), as well as canines and felines, including companion animals such as domestic dogs and cats.

EXAMPLES

Interesterified dietary fats were prepared by the Stepan Company (Northfield, Ill.) using random chemical interesterification to combine the following fats or fatty acids and vegetable oils:

Example 1

One part by weight trimyristin and three parts by weight high oleic sunflower oil. The sunflower oil (Cargill Inc., Minneapolis, Minn.) contained approximately 82% oleic acid, 8-9% linoleic acid and 8-9% saturated fatty acids. This interesterified fat closely mirrors the interesterified "olive+ 14" (75:25) fat of McGandy et al. listed in Table 1 (panel 3). Most of the myristic acid in these triglycerides is found in monomyristin-diolein molecules (liquid oil) whose beta-crystalline melting point is 14° C., i.e., well below room temperature.

Example 2

Same as Example 1 except 3.9 parts trimyristin and 6.1 parts high oleic sunflower oil are incorporated into the interesterified dietary fat. The resulting fat contains approximately 5% by weight linoleic acid and approximately 39% myristic acid, one-third of which (13%) is sn-2 myristic acid. Some of the resulting triglycerides will contain two saturated fatty acids (disaturates) providing a component of fat solids at room temperature.

Example 3

Same as Example 1 except one part trimyristin and one part high oleic sunflower oil are incorporated into the interesterified dietary fat. The resulting fat contains only 4% by weight linoleic acid and approximately 50% myristic acid, one-third of which is sn-2 myristic acid. If the sunflower oil contains approximately 82% by weight oleic acid (as currently available from Cargill Inc., Minneapolis, Minn.), the resulting triglyceride structures with myristic and oleic acids produced by random chemical interesterification/rearrangement include 8 principal stereoisomer structures, 4 of which contain sn-2 myristic acid, i.e., MMM, MMO, MOM, OMM, MOO, OMO, OOM, OOO. Approximately 40% of the myristic acid resides are found in monomyristin-diolein triglycerides while approximately 40% are found in dimyristin-monoolein triglycerides. The remaining myristate (only about 10% of the interesterified triglyceride molecules) is found in trimyristin triglyceride. The dimyristin-monoolein triglycerides have a convenient beta-prime crystalline melting point of 20-23° C., providing a very useful hard fat for refrigerated table spreads that will easily melt in ones mouth.

Example 4

Same as Example 3 except one part tripalmitin (instead of trimyristin) and one part high oleic sunflower oil are incorporated into an interesterified dietary fat. The palmitin-containing interesterified fat products can be compared with the myristin-containing homologue products of Example 3. Used as dietary fats in a controlled nutritional setting, these two products are used to critically test the hypothesis that sn-2 myristate-containing triglycerides rather than the homologous sn-2 palmitate triglycerides preferentially increase HDL cholesterol and reduce the LDL/HDL cholesterol ratio in human plasma.

As described above, equal amounts of tripalmitin and high oleic sunflower oil are incorporated into an interesterified dietary fat. The resulting fat contains only 4% by weight linoleic acid and approximately 52% palmitic acid, one-third (17%) of which is sn-2 palmitic acid. If the sunflower oil contains approximately 82% by weight oleic acid (as currently available from Cargill Inc., Minneapolis, Minn.), the resulting triglyceride structures with palmitic and oleic acids produced by random chemical interesterification/rearrangement include 8 principal stereoisomer structures, 4 of which contain sn-2 palmitic acid, i.e., PPP, PPO, POP, OPP, POO, OPO, OOP, OOO. Approximately 40% of the palmitic acid resides are found in monopalmitin-diolein triglycerides while approximately 40% are found in dipalmitin-monoolein triglycerides. The remaining palmitin (only about 10% of the interesterified triglyceride molecules) is found in tripalmitin triglyceride. The dipalmitin-monoolein triglycerides have a beta-prime crystalline melting point of 20-230 C.

Example 5

Same as Example 3 except one part trimyristin and one part regular safflower oil (Cargill Inc.) are interesterified. The safflower oil provides a high level of linoleic acid, i.e., 78% by weight, and also 13% oleic acid and 9% saturated fatty acids. The result of random interesterification is much the same as in Example 3 except that the sunflower's oleic acid is replaced by the safflower's linoleic acid (L) to produce principally MMM, MML, MLM, LMM, MLL, LML, LLM, and LLL.

Example 6

A further analysis of the first four exemplary fats described above is provided below in Table 18, in which these interesterified fats are subsequently blended, i.e., mixed, with natural safflower oil to increase the level of linoleic acid in the dietary fat to achieve final levels of 10%, 15% and 20% by weight linoleic acid.

Dietary Fat Blends with Interesterified Triglycerides
Ingredients
Trimyristin triglyceride (14:0)
Tripalmitin triglyceride (16:0)
Sunflower oil (hi oleic) [8% SFA (4% 16:0, 4% 18:0), 82% MUFA (18:1), 8% PUFA (18:2)
Safflower oil (regular) [9% SFA (7% 16:0, 2% 18:0), 12% MUFA (18:1), 78% PUFA (18:2)]
Interesterified Fats
IE1: 25% Trimyristin: 75% Sunflower (31% SATS, 63% MONOS, 6% POLYS) Triglycerides: mostly monomyristin
IE2: 39% Trimyristin: 61% Sunflower (44% SATS, 50% MONOS, 5% POLYS) Triglycerides: intermediate mixture of mono- and dimyristin
IE3: 50% Trimyristin: 50% Sunflower (54% SATS, 41% MONOS, 4% POLYS) Triglycerides: approximately 40% monomyristin, 40% dimyristin, 10% trimyristin
IE4: 50% Tripalmitin: 50% Sunflower (54% SATS, 41% MONOS, 4% POLYS) Triglycerides: approximately 40% monopalmitin, 40% dipalmitin, 10% tripalmitin

TABLE 18

| BLENDS | PERCENTAGES BY WEIGHT | | | | | | |
|---|---|---|---|---|---|---|---|
| | Myr | Sn-2M | Palm | SATS | Oleic | Lino | P/S |
| 1. 100% IE1 | 25 | 8 | 3 | 31 | 62 | 6 | 0.19 |
| 2. 94% IE1 + 6% Saff | 24 | 8 | 3 | 30 | 60 | 10 | 0.33 |
| 3. 87% IE1 + 13% Saff | 22 | 7 | 4 | 28 | 57 | 15 | 0.54 |
| 4. 80% IE1 + 20% Saff | 20 | 7 | 4 | 27 | 53 | 20 | 0.74 |
| 5. 100% IE2 | 39 | 13 | 2 | 44 | 50 | 5 | 0.11 |
| 6. 93% IE2 + 7% Saff | 36 | 12 | 3 | 42 | 47 | 10 | 0.24 |
| 7. 86% IE2 + 14% Saff | 34 | 11 | 3 | 39 | 45 | 15 | 0.38 |
| 8. 79% IE2 + 21% Saff | 31 | 10 | 3 | 37 | 42 | 20 | 0.54 |
| 9. 100% IE3 | 50 | 17 | 2 | 54 | 41 | 4 | 0.07 |
| 10. 92% IE3 + 8% Saff | 46 | 15 | 2 | 51 | 39 | 10 | 0.20 |
| 11. 85% IE3 + 15% Saff | 43 | 14 | 3 | 47.5 | 37 | 15 | 0.32 |
| 12. 78% IE3 + 22% Saff | 39 | 13 | 3 | 44 | 35 | 20 | 0.45 |
| 13. 100% IE4 | — | 17 | 52 | 54 | 41 | 4 | 0.07 |
| 14. 92% IE4 + 8% Saff | — | 15 | 48 | 51 | 39 | 10 | 0.20 |
| 15. 85% IE4 + 15% Saff | — | 14 | 46 | 47.5 | 37 | 15 | 0.32 |
| 16. 78% IE4 + 22% Saff | — | 13 | 42 | 44 | 35 | 20 | 0.45 |

Unless otherwise defined herein, all terms have their ordinary meanings as understood by one of ordinary skill in the field to which the invention pertains. The use of the article "a" or "an" is intended to include one or more.

All patents and other references cited in the specification are indicative of the level of skill of those skilled in the art to which the invention pertains, and are incorporated by reference in their entireties, including any tables and figures, to the same extent as if each reference had been incorporated by reference in its entirety individually.

One skilled in the art would readily appreciate that the present invention is well adapted to obtain the ends and advantages mentioned, as well as those inherent therein. The methods, variances, and compositions described herein as presently representative of preferred embodiments are exemplary and are not intended as limitations on the scope of the invention. Changes therein and other uses will occur to those skilled in the art, which are encompassed within the spirit of the invention, are defined by the scope of the claims.

It will be readily apparent to one skilled in the art that varying substitutions and modifications may be made to the invention disclosed herein without departing from the scope and spirit of the invention. For example, in addition to the natural, synthetic and semisynthetic dietary fats listed herein, others that are not listed may be incorporated into the compositions described herein. Likewise, other sources of myristic acid, lamie acid, linoleic acid and other fatty acids and fats not listed herein that increase plasma levels of HDL-C, decrease plasma levels of LDL-C and decrease the ratio of LDL-C/HDL-C, may be incorporated into the compositions described herein, and used in combinations and concentrations not described herein, to produce natural fat blends as well as synthetic and semisynthetic fats that fall within the scope of the present invention. Genetically engineered and naturally selected plant species that produce fats whose triglycerides are structured and whose fatty acid levels are in accordance with the present invention also fall within the scope of the present invention. Thus, such additional embodiments are within the scope of the present invention and the following claims.

The invention illustratively described herein suitably may be practiced in the absence of any element or elements, limitation or limitations which is not specifically disclosed herein. Thus, for example, in each instance herein any of the terms "comprising", "consisting essentially of" and "consisting of" may be replaced with either of the other two terms. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In addition, where features or aspects of the invention are described in terms of Markush groups or other grouping of alternatives, those skilled in the art will recognize that the invention is also thereby described in terms of any individual member or subgroup of members of the Markush group or other group.

Also, unless indicated to the contrary, where various numerical values or value range endpoints are provided for embodiments, additional embodiments are described by taking any 2 different values as the endpoints of a range or by taking two different range endpoints from specified ranges as the endpoints of an additional range. Such ranges are also within the scope of the described invention. Further, specification of a numerical range including values greater than one includes specific description of each integer value within that range.

Example 7

Based on the promising gerbil results, a modest study was designed for humans to test the efficacy of the 12:0-rich margarine developed and then studied in gerbils. Accordingly the new margarine rich in 12:0 provided by palm kernel oil (PKO) and supplemented with 18:2 provided by vegetable oil was compared to an average American fat blend rich in the more traditional 16:0 and 18:0 SFAs, with a lower level of 18:2 as PUFA.

Subjects and Study Design

Twenty-four human adults, 18 years or older, were recruited from a screened population of thirty-seven Brandeis University staff and students. Subjects had total cholesterol levels of between 160 mg/dL and 260 mg/dL and LDL cholesterol levels of greater than 80 mg/dL. Subjects were omnivorous eaters, indicating their willingness to consume the specially prepared foods supplied to them for meals and snacks.

Meals Developed Using a Three Day Rotating Menu

Carefully constructed three day-rotating food menus were prepared with the help of a caterer experienced in preparation of meals and sandwiches. The caterer prepared various meal menus incorporating fats (provided as margarines) for use in cooking of the 3 main dinners, which included pan-fried tilapia, sauteed chicken breast, or pastas with meat sauce served with fresh steamed vegetables. Sandwiches preparation included cold cuts of turkey breast, roast beef, and canned tuna fish in water.), Baked deserts and fat-rich breads were also incorporated. Prepared meals were frozen for later distribution, along with prepared sandwiches for lunch. Breakfasts were provided with a choice of oatmeal or cold cereals (Cheerios™ or Total™) consumed with fat-free milk (Smart Balance, Inc., Paramus, N.J.). Several varieties of fresh fruit (bananas, apples, oranges, and raisins) were also part of the diet. Fat-free yogurt was used as a snack. Desserts included specially prepared cookies, cakes, and breads baked with the appropriate test fat as the exclusive fat used for the recipes. Desserts were baked weekly and frozen in standard size servings. Portions were assigned to the various meals and snacks for each of the subjects according to caloric need. The daily menu was based on an intake of 2000 kcal/day. Subjects ate essentially the same total menus, with small variations in quantity depending on their individual caloric requirements. Fat was incorporated into the menus at 35% of total dietary energy for the 2000 kcal/day menu. Analysis of the total daily calories indicated that the test fats (provided in margarines containing only unmodified natural fats and oils) provided 68% by weight of the total daily fat intake (calculated as fatty acids) with the remaining 32% of the fat being compositionally identified from foods listed in USDA Handbook 8. Each fat source was carefully monitored and controlled. Within this 32% "background" of dietary fat (constant across the three menus), approximately 20% was present in the 3 lean meats provided in the 3-day rotating menu, with the remaining 13% from mayonnaise and other miscellaneous food products. Overall, greater than 97% of the fat calories consumed were accounted for in the foods provided, with ⅔ of those fatty acids provided by the test fat blends alone. Table 19 provides the fatty acid profiles for the American fat blend and the PKO-blend, as well as the fatty acid profile after these blends were incorporated into the total daily menus.

Both females and males in good health were recruited, roughly in equal numbers, with no history of current disease. These subjects, often concerned about blood cholesterol (usually alerted from family history of high cholesterol or recent physical exam by their primary physician), were eligible for screening. Subjects were recruited with ads posted in offices and bulletin boards on campus, and by word of mouth. Screened subjects were taking no medications affecting blood lipids nor supplements targeted at lowering blood lipids nor other medications known to influence energy metabolism. Subjects were agreeable to consuming the three daily menus selected from the Smart Balance Food Plan (see www.smartbalance.com/foodplan) in steady rotation for the 21 days required for each test fat. Fat was incorporated into the menu foods to provide 35% of the dietary energy or total calories (i.e., the US national average) with about 15% energy provided as protein and 50% energy as carbohydrate (approximately 120 g sugars in the 2000 kcal/day menu). Two fats that had been incorporated into margarine were studied and used in the preparation of the menu foods, one being an 18:2-enriched palm kernel oil and the other (as control) being the so-called American fat blend (aka "AFB") described in Table 19. Cholesterol intake was somewhat greater with the AFB fat (233 mg/d for menus with the AFB and 165 for menus with the PKO-blend) owing to the content of animal fats in AFB. This difference amounted to 68 mg cholesterol per day, which was considered nutritionally negligible.

These dietary energy intakes are typical of the current American diet. Calories were initially assigned to individual subjects based on the Harris-Benedict energy requirement equation (see www-users.med.cornell.edu/~spon/picu/calc/beecalc.htm) and adjusted according to need as the study progressed. Most individuals fit the calculated caloric intake with the exception of 3 young men who were the most physically active, requiring about 3300 kcal/day. Subjects were weighed before and during the study to make sure they kept their weights steady. They also kept a daily notebook to record all foods consumed and when the foods were eaten, so that patterns could be detected and adjusted if needed.

Details of Study

As outlined above, a total of 37 subjects were screened for total plasma cholesterol (TC) and triglycerides (TG) to identify 24 subjects who fit all criteria for the study and who agreed to the terms for the testing. Blood samples were taken at the time of recruitment for screening of blood lipids and glucose to identify non-diabetic adult men and women, with slightly to moderately elevated fasting cholesterol levels (between 160 and 260 mg/dL), to participate in the study. Substantially elevated cholesterol was not mandatory for selection because the relative effect of dietary fat compositions impact blood cholesterol independent of the initial TC value. The final selection included 13 males and 11 females, with a mean age of 34 years for males and 35 years for females, with an overall age range of 19 to 62 years. The average BMI was 26.6 for males and 25.2 for females. The mean BP was 125/80 for males and 120/79 for females. Waist circumference mean was 35.6 inches for males and 31.8 for females.

Study Protocol

Once enrolled, only 20 of the 24 subjects selected successfully completed all study rotations, consuming the 3-day rotating diets prepared with each test fat for the 21 d periods. Thus, they consumed each meal approximately 7 times in the test period before crossing over to the second test fat (with a 3 to 4 week intermission between the two test diets). New baseline screening was performed to ascertain their return to original baseline values before the subjects were allowed to restart the second diet. Subjects were blinded to the type of fat consumed. Only one type of fat blend (supplied in the form of margarine) was utilized and fed during a given test period to prevent mixing and/or confusion of test fats during menu preparation by the caterer. Again, each test period was limited to 3 wks to avoid monotony and to bolster compliance, with subjects being bled 2-3 times during the $3^{rd}$ wk of each period to ascertain an accurate measure of response to fatty acids exchanged. Dietary fat studies are often severely compromised by noncompliance when subjects sneak foods outside those assigned. Significantly, one needs to control almost all daily fat intake, i.e., fatty acids, to obtain an accurate assessment of the relative impact of each fatty acid. Otherwise the fat(s) in any noncompliant foods contribute unwanted fatty acids that obscure the effect of the test fat and its fatty acid profile. Thus, a delicate balance exists between the controlled fatty acid profile of a test fat, acceptance of a limited menu of the controlled foods provided, and the length of time that subjects must comply with the protocol.

Concerned that dietary compliance during a second 3 wk dietary test period might be inferior to the first test period, it was decided that the baseline period should be followed by the 18:2-enriched PKO test fat to increase the chance of differentiating the new test fat from the baseline diet. By the same reasoning, the American fat blend-containing diet (fat blend described in Table 19) was selected as the second diet following a 3-4 wk wash-out period (during which subjects reverted to their regular diet). The rationale was that the American fat blend diet would more closely approximate the normal diet being consumed by subjects outside the study. Thus, the study sequence intentionally positioned the PKO test fat between baseline and the American fat blend, and included four assessment periods consisting of: (1) free choice diet first (baseline), (2) new 18:2-enriched PKO fat blend next, (3) free choice baseline again, and (4) finally the American fat blend last, reflecting the baseline diet fat profile again. The two free choice baseline data sets were averaged to generate a single baseline value for the entire data set.

Results and Discussion

The results from this human study (Table 20) were surprisingly strong (i.e., statistically significant) in demonstrating the ability to improve the human lipoprotein profile by altering specific dietary fatty acid components. More specifically, the study demonstrated the benefits to be derived from a new margarine or shortening containing a substantial amount of palm kernel oil (PKO) with high levels of 12 carbon lauric acid and 14 carbon myristic acid balanced with a substantial amount of C18:2 linoleic acid as the polyunsaturated fatty acid. As detailed earlier in the previous section on gerbil studies, PKO-rich blended fat-containing compositions were uniquely constructed and tested in that fat-sensitive animal model before being fed to human subjects.

Twenty human subjects that entered this study remained for all four assessment periods. Four of the original 24 subjects did not complete the final period for various reasons. The twenty subjects that completed both of the controlled 3 wk dietary sessions with test margarines, adhered to the protocol well, based on oral communications and food intake diaries. As can be seen in Table 20, the baseline average fasting blood glucose level was normal at 78 mg/dL and unchanged by the new linoleic acid-balanced PKO-rich margarine, whereas the American fat blend increased blood glucose by 6% over the baseline value and 5% over the PKO margarine, both of which were significantly lower than the American fat blend. This human data, coupled with a similar benefit from PKO-rich diets in gerbils, suggests that the influence of C12:0 and C14:0 fatty acids are also potentially important to glucose metabolism, worthy of additional study.

With regard to the data in Table 20, the total cholesterol value for all subjects from two separate baseline values was normal at 177 mg/dL. This value did not change when consuming the American fat blend (margarine B) as might be anticipated since both fats essentially represented the average American dietary fat composition. On the other hand, the PKO-rich margarine decreased total cholesterol by about 10% (to 158 mg/dL), which was a statistically significant decrease. Thus, the trend seen with 12:0+14:0-rich high oleic sunflower oil-containing fats consumed by gerbils was supported by the human clinical findings. Interestingly, the PKO-rich fat blend diet also lowered plasma triglyceride by about 7% compared to the American fat blend which was similar to baseline. The lower TG supports the decreased blood glucose results, as well.

HDL and LDL Cholesterol Levels

The most interesting and important aspect of this clinical study appeared within the lipoprotein profile, where dietary intake of the American fat blend resulted in a 4% decrease in HDL cholesterol from baseline, whereas the PKO-rich margarine produced no such detrimental effect, leaving HDL unchanged from baseline. However, relative to the American fat blend, dietary substitution of the PKO-rich margarine resulted in a 4% increase in HDL cholesterol, which was statistically significant by the repeated-measures ANOVA applied. On the other hand, the LDL-cholesterol measured following the American fat blend was unchanged from baseline whereas the new PKO-rich margarine decreased LDL by 15% relative to both the baseline and the American fat blend, a change that was statistically significant and clinically important. Finally the LDL/HDL and TC/HDL cholesterol ratios also revealed remarkable changes, with the PKO-rich margarine beneficially decreasing the first ratio by 14% when compared to the baseline value, and by 19% compared to the American fat blend. The TC/HDL cholesterol ratio, which is considered the best predictor of CHD risk based on blood lipids, was decreased by 0.48 comparing the American fat blend to the PKO-rich margarine, a truly substantial and remarkable decrease. In fact, a decrease of 1.0 in the TC/HDL ratio is predicted to reduce risk for myocardial infarction by 53% (Stampfer et al. NEJMed 325:373-81, 1991, A Prospective Study of Cholesterol, Apoproteins, and the Risk of Myocardial Infarction). Therefore, the present data and results predict that an approximate 25% reduction in CHD risk could be achieved if the typical American dietary fat intake providing 35% of the dietary energy were changed from the American fat blend composition described herein to the linoleic acid-enriched PKO-containing margarine under the dietary regimen described.

Thus, the overall metabolic impact of the new PKO fat blend-containing margarine tested in humans and gerbils, when compared to the American fat blend (and in gerbils compared also to the earlier palm oil blends, see Tables 14 and 17A) was to substantially improve both the glucose and the lipoprotein profile. The results are in keeping with the concept that polyunsaturated fat intake, which was higher in the PKO blend than in the American fat blend, when strategically coupled with selected saturated fatty acids from specific natural saturated fats, has a surprisingly beneficial impact on both HDL and LDL cholesterol with improvement in both the clinically important LDL/HDL cholesterol ratio and the TC/HDL cholesterol ratio. As shown previously in an earlier human clinical study using regular palm oil (see U.S. Pat. No. 5,578,334) rather than PKO in a margarine, a suitable blend of saturated fat and polyunsaturated fat can provide a balanced mixture of saturated and polyunsaturated fatty acids producing an important and significant clinical impact on the LDL/HDL and TC/HDL cholesterol ratios and on cholesterol metabolism in general.

Interestingly, the new PKO-rich fat produced a greater impact on LDL cholesterol than the more conventional palmitic acid-rich palm oil blend previously tested in humans (U.S. Pat. No. 5,578,334). However, it is now evident from these new data from both gerbils and humans that an improved blend utilizing 12:0 laurate and 14:0 myristate saturated fatty acids from PKO (together with ample 18:1 and 18:2 fatty acids from high oleic sunflower oil and soybean oil, respectively) are able to lower LDL cholesterol more than the previously formulated 16:0 palmitic acid-rich margarine. Although the HDL cholesterol level was relatively unchanged by the new PKO formulation in the present clinical study, HDL-C tended to be higher than with the original 16:0-rich margarine when the two blends were tested side by side in the gerbil feeding studies described herein.

The literature contains three widely acknowledged compilations of clinical studies providing predictive regression equations for estimating the human lipoprotein response (LDL and HDL) to changes in dietary fat compositions. In two cases, these regressions are based on a highly selective subset of publications (approximately 60 reports each detailing specific dietary fatty acids. The third publication is much more inclusive with about 350 reports that also includes studies where the classes of fatty acids are documented, without necessarily providing individual fatty acid effects on LDL-C and HDL-C. All compilations include the responses in terms of total lipids as well as lipoprotein profiles. The first published report is the most inclusive [Hegsted et al (AJCN 57:875-83, 1993)] in which regressions were based on approximately 250 metabolic studies and approximately 100 less detailed field studies. Those regressions would predict that the PKO fat blend described herein would lower TC by 12 mg/dL (compared to our result of 16 mg/dL). However, the Hegsted equation for the LDL-C response predicts only a 5 mg/dL decrease (compared to the observation herein of 15 mg/dL). Furthermore, his predictive equation for HDL-C would suggest an increase of 1 mg/dL compared to the actually observed rise of 2 mg/dL. Hegsted's basic conclusion was that SFAs will increase TC and LDL levels, while PUFA will decrease them, without confidence in the prediction on how the HDL level would change (except that the response would typically be modest). While this has some similarity to the findings described herein, the new finding herein that the physiologically important ratio of TC to HDL is robustly and beneficially decreased for the fatty acids fed in the PKO margarine is unique to date among published data with natural fats.

The second predictive equation was published by Yu et al (AJCN 61: 1129-39, 1995). Their regression is based on approximately 50 comparisons and would predict that the PKO margarine described herein should lower TC by only approximately 3 mg/dL with a 3 mg decrease in LDL-C and a 1 mg increase in HDL-C.

The third predictive equation was published by Mensink et al (AJCN 77:1146-55, 2003) based upon a compilation of 60 published reports. Their data would predict an approximate 6 mg decline in TC with about a 5 mg decrease in LDL-C and no change in HDL-C.

These published regressions for predicting the effect on lipoproteins caused by altering the dietary intake of specific fatty acids, are limited by the specific test fats and the lipoprotein responses that were entered into computer programs at the time. It would appear that these early calculations cannot predict the response to new fat blend compositions. For example, when used to compare the presently described AFB and the unique PKO fat blend described herein, the outcome of using these regressions highlights their weakness in predicting lipoprotein levels. More specifically, in comparing the present fat blends, the relative proportion of 12:0 and 16:0-18:0 have been altered together with a major increase in the proportion of 18:2. Thus, the actual results of the present clinical study are surprising in light of any predictions based upon theoretical regression calculations aimed at predicting LDL-C, HDL-C and TC levels.

TABLE 19

Fatty acid profile of American fat blend (AFB) and PKO blend alone and in daily menu for human study

| | Fats blends alone | | Fats in daily menu | |
|---|---|---|---|---|
| | AFB* | PKO blend* | AFB | PKO blend |
| | | Fattty acid % | | |
| 8:0 + 10:0 | 0.9 | 1.8 | 0.8 | 1.6 |
| 12:0 | 0.8 | 13.0 | 0.7 | 10.4 |
| 14:0 | 4.1 | 4.5 | 3.8 | 4.1 |
| 16:0 | 22.3 | 11.2 | 21.6 | 13.0 |
| 16:1 | 2.8 | 0.1 | 2.5 | 0.5 |
| 18:0 | 13.2 | 3.0 | 12.3 | 4.3 |
| 18:1 | 35.3 | 34.7 | 35.5 | 35.3 |
| 18:2 | 14.5 | 25.1 | 16.2 | 24.9 |
| 18:3 | 2.0 | 5.1 | 2.1 | 4.3 |
| Others | 4.1 | 1.5 | 4.5 | 1.6 |
| Total Sats | 41.3 | 33.5 | 39.2 | 33.4 |
| Total Monos | 38.1 | 34.8 | 38.0 | 35.8 |
| Total Polys | 16.5 | 30.2 | 18.3 | 29.1 |
| P/S | 0.40 | 0.90 | 0.47 | 0.87 |

*American fat blend (AFB) composition: 24% Milkfat + 40% Tallow + 20% Chicken Fat + 16% Soybean Oil
**PKO blend composition: 27% Palm Kernel Oil (PKO) + 31% Soybean Oil + 32% Canola Oil + 10% Palm Oil

TABLE 20

Blood glucose and plasma lipids for all subjects consuming diets with PKO blend or American fat blend (AFB), for 3 wk each in crossover design

| | Blood glucose mg/dL | TC mg/dL | TG mg/dL | HDL-C mg/dL | LDL-C mg/dL | LDL-C/HDL-C ratio | TC/HDL-C ratio |
|---|---|---|---|---|---|---|---|
| Baseline | 78 ± 6$^a$ | 177 ± 22$^a$ | 77 ± 30 | 50 ± 12$^a$ | 112 ± 20$^a$ | 2.35 ± 0.78$^a$ | 3.68 ± 0.91$^a$ |
| PKO-blend | 77 ± 8$^b$ | 158 ± 26$^{a,b}$ | 67 ± 21$^a$ | 50 ± 13$^b$ | 94 ± 22$^{a,b}$ | 1.97 ± 0.65$^{a,b}$ | 3.26 ± 0.75$^{a,b}$ |
| AFB | 82 ± 7$^{a,b}$ | 174 ± 23$^b$ | 76 ± 28$^a$ | 48 ± 11$^{a,b}$ | 110 ± 18$^b$ | 2.41 ± 0.69$^b$ | 3.74 ± 0.79$^b$ |
| | | | % change | | | | |
| PKO-blend vs Baseline | −1 ± 7 | −11 ± 9* | −8 ± 24 | 0 ± 12 | −15 ± 15* | −14 ± 20* | −10 ± 14* |
| AFB vs Baseline | 6 ± 8* | −2 ± 7 | 1 ± 23 | −4 ± 9 | 0 ± 13 | 5 ± 20 | 3 ± 13 |
| PKO-blend vs AFB | −5 ± 8* | −9 ± 7* | −7 ± 28 | 5 ± 6* | −15 ± 11* | −19 ± 11* | −13 ± 8* |

Values are mean ± SD (n = 20)
$^{a,b,c}$Means in the column sharing a common superscript are significantly different (p < 0.05) using "repeated measures ANOVA" and Fisher's PLSD test
*Percent change significant (p < 0.05)

The invention claimed is:

1. A method of improving serum lipid parameters of a human subject, the method comprising the step of administering to the subject a dietary composition having a fatty acid composition consisting essentially of:
   (i) polyunsaturated fatty acids including linoleic acid, wherein said linoleic acid is at a concentration of 5 to 40% by weight of the fatty acid composition;
   (ii) monounsaturated fatty acids at a concentration of at least 10% by weight of the fatty acid composition; and
   (iii) saturated fatty acids at a concentration of 15 to 55% by weight of the fatty acid composition; wherein said saturated fatty acids include myristic acid at a concentration of at least 3% by weight of the fatty acid composition and lauric acid at a concentration of at least 3% by weight of the fatty acid composition, wherein 10 to 40% by weight of the fatty acid composition is myristic acid and/or lauric acid, and wherein the weight ratio of myristic acid to lauric acid in the fatty acid composition is 3:1 to 1:4;
   whereby one or more serum lipid parameters of the subject selected from the group consisting of total cholesterol, triglycerides, and LDL-cholesterol are decreased and whereby said total cholesterol, triglycerides, and/or LDL-cholesterol are decreased more than would be obtained by administering an equivalent dietary composition including myristic acid at a concentration of less than 3% by weight of the fatty acid composition and lauric acid at a concentration of less than 3% by weight of the fatty acid composition.

2. The method of claim 1, wherein the dietary composition is a cooking oil, oil spread, shortening, margarine, salad dressing, mayonnaise, dairy product, baked good, or fried good.

3. The method of claim 1, wherein the fatty acid composition comprises linoleic acid at a concentration of 10 to 35% by weight of the fatty acid composition.

4. The method of claim 1, wherein the weight ratio of linoleic acid to saturated fatty acids in the fatty acid composition is 0.3 to 2.

5. The method of claim 1, wherein the fatty acid composition comprises at least 5% by weight of myristic acid.

6. The method of claim 1, wherein the fatty acid composition comprises at least 7% by weight of lauric acid.

7. The method of claim 1, wherein the fatty acid composition further comprises stearic acid at a concentration of about 4 to 20% by weight of the fatty acid composition and/or palmitic acid at a concentration of about 4 to 20% by weight of the fatty acid composition.

8. The method of claim 1, wherein the saturated fatty acids include stearic acid and palmitic acid, and wherein the weight ratio of (myristic acid+lauric acid) to (stearic acid+palmitic acid) is at least 1.0.

9. The method of claim 1, wherein the dietary composition contains no more than 50% by weight of tri-saturated triglycerides.

10. The method of claim 1, wherein the monounsaturated fatty acids include oleic acid at a concentration of at least 25% by weight of the fatty acid composition.

11. The method of claim 1, wherein the weight ratio of polyunsaturated fatty acids to monounsaturated fatty acids in the fatty acid composition is 0.3 to 2.0, the weight ratio of polyunsaturated fatty acids to saturated fatty acids in the fatty acid composition is 0.3 to 2.0, and the weight ratio of monounsaturated fatty acids to saturated fatty acids in the fatty acid composition is 0.3 to 2.0.

12. The method of claim 1, wherein the subject's fasting blood glucose level is decreased.

13. The method of claim 12, wherein the subject's fasting blood glucose level is decreased by about 5%.

14. The method of claim 1, wherein the subject's serum total cholesterol is decreased.

15. The method of claim 14, wherein the subject's serum total cholesterol is decreased by about 10%.

16. The method of claim 1, wherein the subject's serum triglyceride level is decreased.

17. The method of claim 16, wherein the subject's serum triglyceride level is decreased by about 10%.

18. The method of claim 1, wherein the subject's serum HDL cholesterol is increased.

19. The method of claim 18, wherein the subject's serum HDL cholesterol is increased by about 4%.

20. The method of claim 1, wherein the subject's serum LDL cholesterol is decreased.

21. The method of claim 20, wherein the subject's serum LDL cholesterol is decreased by about 15%.

22. The method of claim 1, wherein the subject's serum LDL cholesterol is decreased and the subject's serum LDL cholesterol to HDL cholesterol ratio is decreased.

23. The method of claim 22, wherein the subject's serum LDL cholesterol is decreased and the subject's serum LDL cholesterol to HDL cholesterol ratio is decreased by about 14 to 19%.

24. The method of claim 1, wherein the subject's serum total cholesterol is decreased and the subject's serum total cholesterol to HDL cholesterol ratio is decreased.

25. The method of claim 1, wherein the subject's serum total cholesterol is decreased and the subject's serum total cholesterol to HDL cholesterol ratio is decreased by about 0.48.

26. The method of claim 1, wherein the subject's risk of coronary heart disease is reduced by about 25%.

27. The method of claim 1, wherein the dietary composition provides about 35% of the dietary energy or daily calories for the subject.

28. The method of claim 1, wherein the dietary composition is administered for three weeks.

29. The method of claim 1, wherein said equivalent diet comprises palm oil, optionally combined with palm olein or palm stearin, as principal source of saturated fatty acids.

30. The method of claim 1, wherein said equivalent diet comprises palmitic acid as principal saturated fatty acid.

31. The method of claim 1, wherein said dietary composition comprises a vegetable oil selected from the group consisting of palm kernel oil, coconut oil, and combinations thereof.

* * * * *